United States Patent [19]

Yokoi

[11] Patent Number: 5,682,171
[45] Date of Patent: Oct. 28, 1997

[54] STEREOSCOPIC IMAGE DISPLAY DEVICE AND STORAGE DEVICE USED THEREWITH

[75] Inventor: Gunpei Yokoi, Kyoto, Japan

[73] Assignee: Nintendo Co., Ltd., Kyoto, Japan

[21] Appl. No.: 555,828

[22] Filed: Nov. 9, 1995

[30] Foreign Application Priority Data

Nov. 11, 1994 [JP] Japan .................... 6-277936

[51] Int. Cl.$^6$ ........................................ G09G 5/00
[52] U.S. Cl. .......................... 345/7; 345/139; 348/51
[58] Field of Search ............................... 345/7, 8, 9, 139; 348/51, 52, 53

[56] References Cited

U.S. PATENT DOCUMENTS

| | | | |
|---|---|---|---|
| 4,600,200 | 7/1986 | Oka et al. | 273/313 |
| 4,962,422 | 10/1990 | Ohtomo et al. | 348/51 |

FOREIGN PATENT DOCUMENTS

| | | |
|---|---|---|
| A-0 301 801 | 2/1989 | European Pat. Off. . |
| 63-127777 | 5/1988 | Japan . |
| 63-314990 | 12/1988 | Japan . |
| A-63-306795 | 12/1988 | Japan . |
| 1-206798 | 8/1989 | Japan . |
| 2-42476 | 2/1990 | Japan . |
| 2-63379 | 3/1990 | Japan . |
| A 03 116093 | 5/1991 | Japan . |
| 6-38246 | 2/1994 | Japan . |
| A-06038246 | 2/1994 | Japan . |
| A-06 238064 | 8/1994 | Japan . |

Primary Examiner—Mark R. Powell
Assistant Examiner—Matthew Luu
Attorney, Agent, or Firm—Nixon & Vanderhye P.C.

[57] ABSTRACT

A program cartridge 4 is detachably attached to a body device 2. The game cartridge 4 stores a game program and certain data. The body device 2 reads the game program from the game cartridge 4 and executes the game program, and reads the certain data and refers to the data to display OBJ images and BG images provided with parallax in left and right display systems. That is to say, the body device 2 displays in the left and right display systems planar OBJ images having no parallax themselves shifted in the opposite directions in the right and left by the amount corresponding to provided parallax information. Also, the body device 2 cuts out left and right two BG images from a planar source image having no parallax by itself with the two images shifted in the opposite directions in the left and right by the provided parallax amount and displays the cut out left and right BG images at the same positions in the left and right display systems. Furthermore, the body device 2 displays planar BG images having no parallax themselves in the left and right display systems while shifting them by an amount corresponding to the provided parallax information in the left and right opposite directions. This way, an OBJ image and a BG image are displayed with parallax provided by a novel method.

10 Claims, 48 Drawing Sheets

BACK-UP MEMORY 42

GAME DATA AT SAVE POINT
(VARIOUS VALUES INDICATING
STATE OF GAME)

FIG. 7

WORK MEMORY 222

VARIOUS VALUES INDICATING STATE OF GAME
(THE NUMBER OF MACHINES, STATES OF MACHINES, POSITIONS OF MACHINES, POSITIONS OF ENEMIES, NUMBER OF STAGES, THE NUMBER OF ITEMS, ETC.)

OTHERS

FIG. 8

IMAGE WORK MEMORY 225

| BGMM | 2251 |
| WAM | 2252 |
| OAM | 2253 |
| COLUMN TABLE | 2254 |
| VARIOUS PARAMETERS | 2255 |

FIG. 17

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 0 | BGMAP BASE | | | | | | | | | 0 | 0 | | | | | |
| 1 | | | | | | | | | | 0 | 0 | | | | | |
| 2 | | | | | | | | | | 0 | 0 | | | | | |
| 3 | | | | | | | | | | 0 | 0 | | | | | |
| 4 | 0 | 0 | | | | | | | | | | | | | | |
| 5 | OVER | END | 0 | 0 | | | | | | | | | | | | |
| 6 | SCY | | GX (0 << 383) | | | | | | | | | | | | | |
| 7 | | | GP (−256 << 255) | | | | | | | | | | | | | |
| 8 | | | GY (0 << 223) | | | | | | | | | | | | | |
| 9 | | | MX (0 << 4095) | | | | | | | | | | | | | |
| 10 | SCX | | MP (−256 << 255) | | | | | | | | | | | | | |
| 11 | | | MY (0 << 4095) | | | | | | | | | | | | | |
| 12 | BGM | | W | | | | | | | | | | | | | |
| 13 | | | H | | | | | | | | | | | | | |
| 14 | RON | | PARAM_BASE | | | | | | | | | | | | | |
| 15 | LON | | OVERPLANE_CHARACTER | | | | | | | | | | | | | |
| | | | WRITING FORBIDDEN | | | | | | | | | | | | | |
| | | | WRITING FORBIDDEN | | | | | | | | | | | | | |
| | | | WRITING FORBIDDEN | | | | | | | | | | | | | |
| | | | WRITING FORBIDDEN | | | | | | | | | | | | | |
| | | | WRITING FORBIDDEN | | | | | | | | | | | | | |

FIG. 18
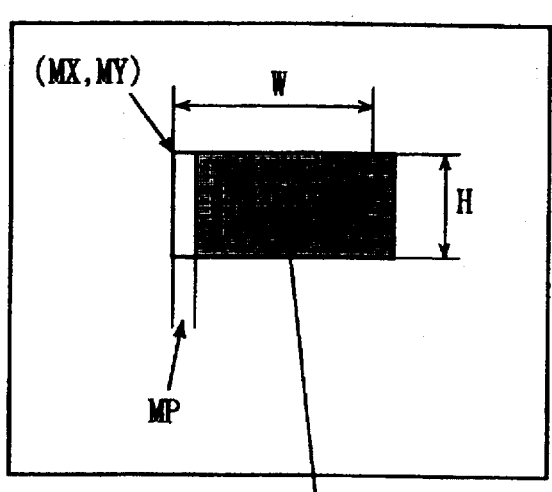
BG MAP
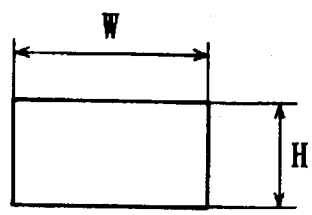
AREA TO BE DISPLAYED ON SCREEN
AREA ACTUALLY CUT OUT FROM BG MAP, SHIFTED BY PARALLAX AMOUNT MP
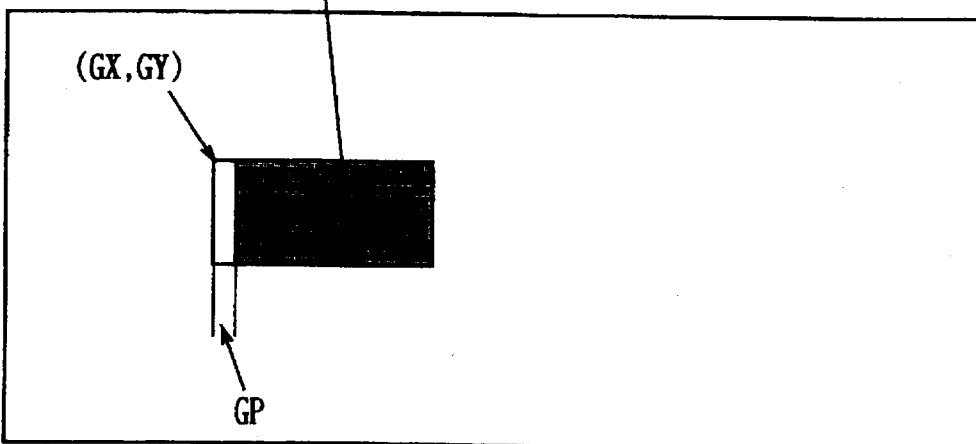
DISPLAYED IMAGE (LEFT OR RIGHT)

FIG. 19
DOT PATTERN　　　　OBJ ATTRIBUTES
(a) 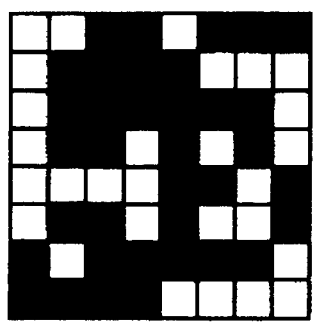
No. 20
JX = 8
JY = 4
JP = 0
JLON = 1
JRON = 1
JCA = 20
(b) 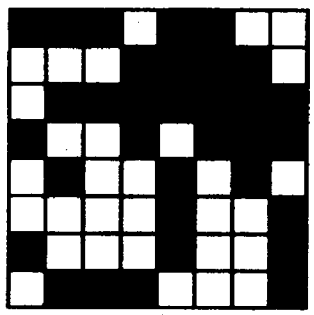
No. 8
JX = 16
JY = 4
JP = 0
JLON = 1
JRON = 1
JCA = 8
(c) 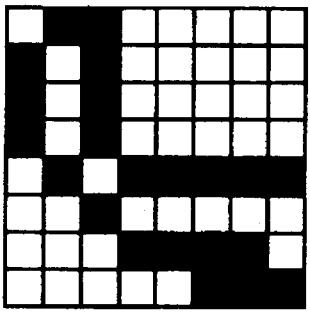
No. 10
JX = 8
JY = 12
JP = 0
JLON = 1
JRON = 1
JCA = 10
(d) 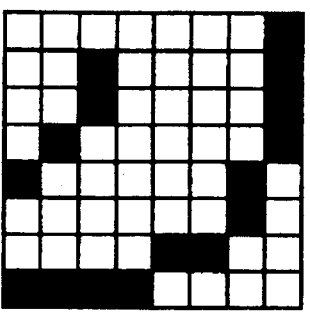
No. 1023
JX = 16
JY = 12
JP = 0
JLON = 1
JRON = 1
JCA = 1023

FIG. 21
| | DOT PATTERN | OBJ ATTRIBUTES |
|---|---|---|
| (a) | 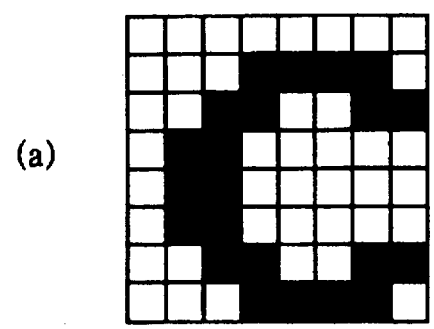 | JX = 8<br>JY = 4<br>JP = −1<br>JLON = 1<br>JRON = 1<br>JCA = 20 |
| (b) | 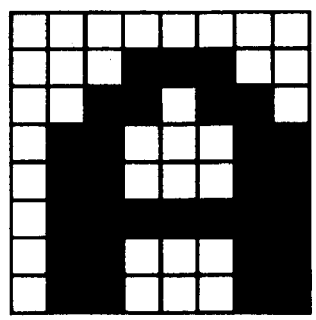 | JX = 20<br>JY = 4<br>JP = 0<br>JLON = 1<br>JRON = 1<br>JCA = 8 |
| (c) | 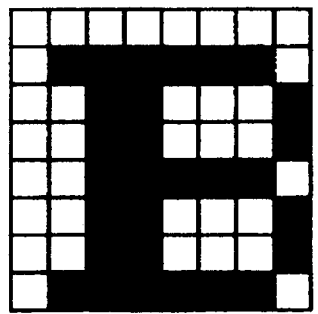 | JX = 8<br>JY = 18<br>JP = 1<br>JLON = 1<br>JRON = 1<br>JCA = 10 |
| (d) | 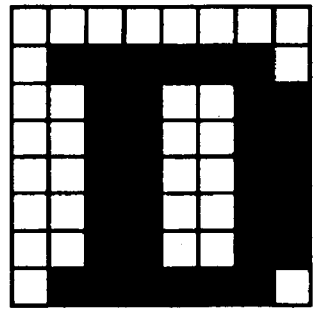 | JX = 20<br>JY = 18<br>JP = 2<br>JLON = 1<br>JRON = 1<br>JCA = 1023 |

FIG. 22
DISPLAY PICTURE COORDINATES FOR LEFT EYE
(a)
(9,4) No.20 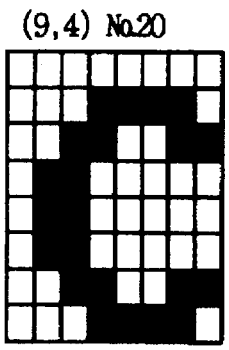  (20,4) No.8 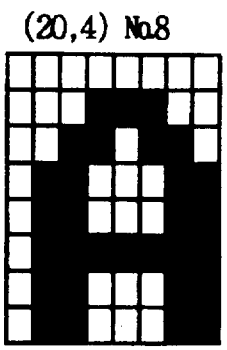
(7,18) No.10 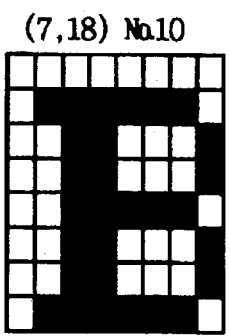  (18,18) No.1023 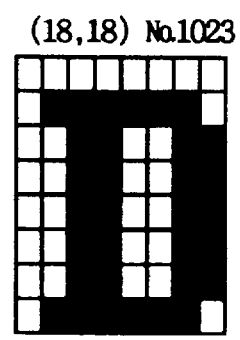
DISPLAY PICTURE COORDINATES FOR RIGHT EYE
(b)
(7,4) No.20 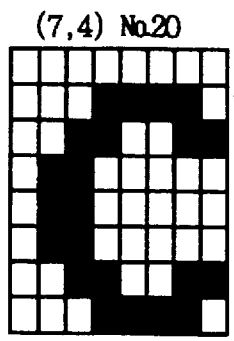  (20,4) No.8 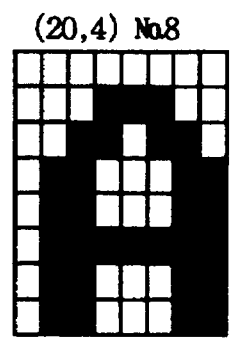
(9,18) No.10 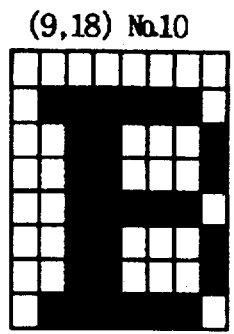  (22,18) No.1023 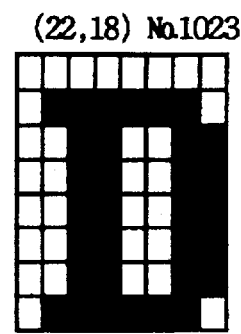

FIG. 27
LEFT EYE SCREEN
RIGHT EYE SCREEN
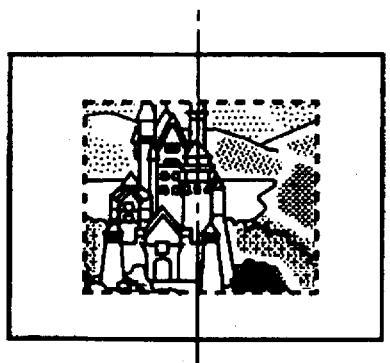
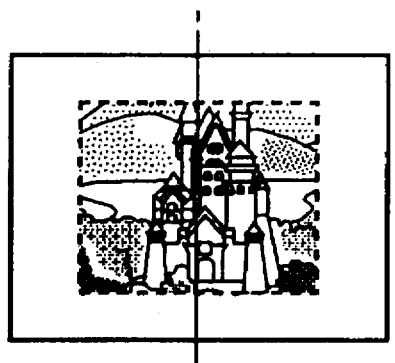
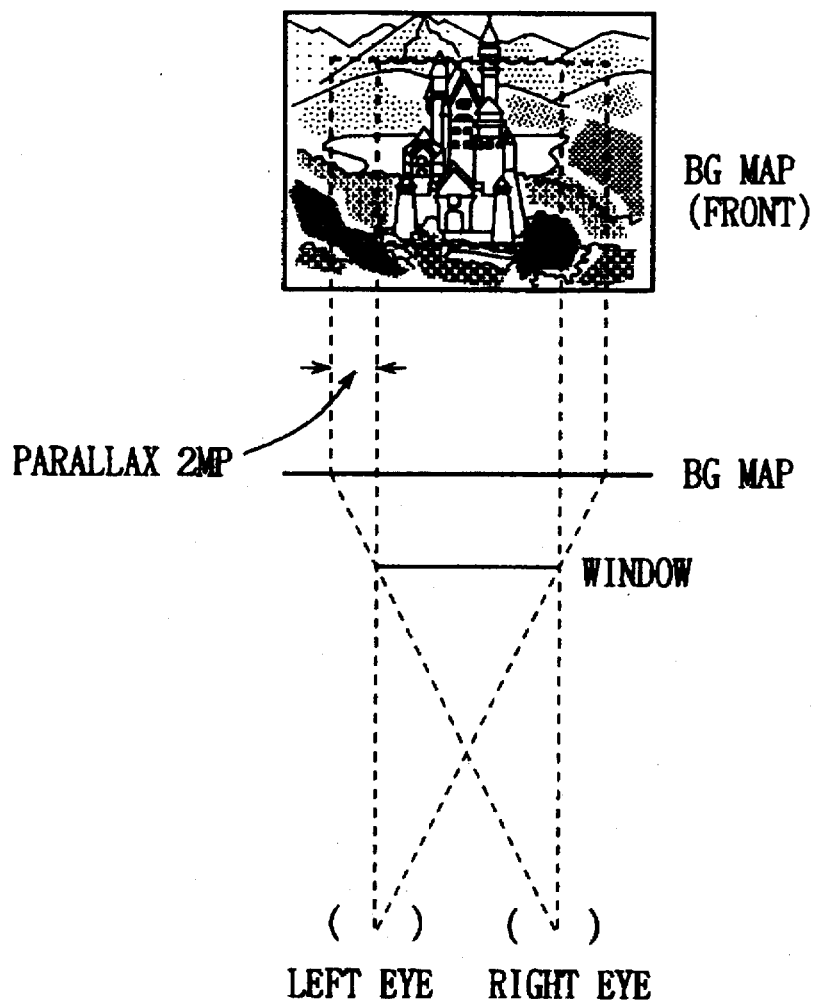

PICTURE DRAWING WORK OF NORMAL BG

PICTURE DRAWING WORK OF H-BIAS BG

PICTURE DRAWING WORK OF AFFINE BG

FIG. 43

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| CTA_L | | | | | | | | CTA_R | | | | | | | |

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| COLUMN_LENGTH | | | | | | | | REPEAT | | | | | | | |

223b

STEREOSCOPIC IMAGE DISPLAY DEVICE AND STORAGE DEVICE USED THEREWITH

BACKGROUND OF THE INVENTION

1. Field of the Invention

The present invention relates to stereoscopic image display devices, and more particularly to a stereoscopic image display device which is used in various electronic equipment with display units such as electronic game devices, training devices, educational equipment, guiding devices, etc.

2. Description of the Background Art

In conventional electronic game devices (for example, devices with Super NES" manufactured and sold by the applicant assignee of the present application), when a hero moves in the lateral direction, a plurality of background pictures, such as mountains, clouds, etc., are scrolled in the direction opposite to the movement of the hero and the scrolling speeds of the background pictures are respectively changed in accordance with the respective distances to represent apparent perspective. That is to say, the perspective is represented by setting a moving speed of an object more distant than the hero lower than the moving speed of the hero. (This method is called multiple scrolling.) However, the conventional multiple scrolling method has had a problem that the perspective disappears when the scrolling is stopped.

A variety of stereoscopic image display devices which enable virtual observation of stereoscopic images have been proposed until now. (For example, refer to Japanese Patent Laid-Open No. 6-38246, Japanese Patent Laid-Open No. 63-127777, Japanese Patent Laid-Open No. 63-314990, Japanese patent Laid-Open No. 1-206798.) These conventional stereoscopic image display devices realize stereoscopic display by showing two pictures with parallax separately to the left and right eyes of an observer.

However, the conventional stereoscopic image display devices require a larger amount of information as compared with devices for displaying planar images. This is due to the fact that two different pictures with parallax are necessary to display one image. Accordingly, the processing for picture drawing is complicated.

If such a stereoscopic image display device as described above is applied to an electronic game device, an internal ROM (or CD-ROM) in its program cartridge will be mostly occupied with storage of image information. This is a problem especially since; recent games are increasingly becoming more complex, and the programs are becoming more and more of larger scale. Accordingly, storage capacity of about several tens to hundreds megabits can not satisfactorily store image information for stereoscopic display. If a storage device with large capacity is used, the price of the program cartridge will considerably increase, which will result in an impractical price of the game software package as an amusement product. It also requires high speed processing devices (such as a CPU etc.), and then the price of the device itself will also increase.

SUMMARY OF THE INVENTION

Accordingly, it is an object of the present invention to provide a low price stereoscopic image display device capable of displaying stereoscopic images with simple structure and a small amount of information.

It is another object of the present invention to provide a low price portable storage device for being connected in use to an electronic game device capable of displaying stereoscopic images with simple structure and a small amount of information.

A first aspect of the present invention is directed to a stereoscopic image display device for displaying a stereoscopic image with parallax in a display portion, which includes:

an image data storing portion for storing source image data on which a plurality of pictures are based to produce a planar image having no parallax;

a writable/readable first temporarily storing portion including at least a storage area with dots corresponding to the number of pixels for one picture of the display portion for temporarily storing first display image data for displaying a first display image for the left;

a writable/readable second temporarily storing portion including at least a storage area with dots corresponding to the number of pixels for one picture of the display portion for temporarily storing second display image data for displaying a second display image for the right;

a parallax information storing portion for storing parallax information for specifying an amount of shifting the first and second display images in a lateral direction with each other;

a writing control portion for converting planar image data for one picture in the source image data into the first and second display image data and writing the first display image data into the first temporarily storing portion and writing the second display image data into the second temporarily storing portion on the basis of the parallax information so that the first and second display images are shifted by the number of dots corresponding to the parallax in the lateral direction with each other when the first and second display images am displayed by the display portion;

a reading control portion for reading the first or second display image data temporality stored in the first or second temporarily storing portion when the writing controlling portion is not performing writing operation to the first or second temporarily storing portion; and a supply portion for supplying the first and second display image data read by the reading control portion to the display portion.

As stated above, in the first aspect, image data for producing a planar picture having no parallax is converted into the first and second display image data and then the first display image data is written into the first temporarily storing portion and the second display image data is written into the second temporarily storing portion. The writing is controlled on the basis of the parallax information so that the first and second display pictures are shifted by the number of dots corresponding to the parallax in the lateral direction with each other when the first and second display images are displayed in the display portion. The first and second display image data written into the first and second temporarily storing portions are alternately read out and supplied to the display portion and displayed as a stereoscopic image having parallax. In this way, since a stereoscopic image with parallax can be displayed from image data for one planar picture having no parallax, the structure can be simplified and the amount of used data can be considerably reduced as compared with the conventional stereoscopic image display devices.

In the first aspect above, writing of the first and second display image data may be controlled on the basis of the parallax information so that at least one of the first and second display images is shifted in the lateral direction when the first and second display images are displayed in the display portion. This enables display of a stereoscopic image with parallax from image data for one image completely the same on the left and on the right.

Furthermore, in the first aspect above, image data in an area larger in the left and right directions than the display area in the left and right directions of one of the first and second display images displayed in the display portion may be stored as image data for one picture in the source image data, and image data in a certain area may be cut out from the image data for one picture on the basis of the parallax information and may be written into the first temporarily storing portion as first display image data, and image data in an area shifted in the lateral direction from the cut-out area may be cut out and may be written into the second temporarily storing portion as second display image data. Then, a stereoscopic display image having parallax can be obtained by slightly varying the areas from which the left and right display image data are cut out in the lateral direction in the source image data.

Furthermore, in the first aspect above, source image data configured in character units may be stored for a plurality of pictures and parallax information in the character units may be used as an amount of shifting the first and second display images in the lateral direction with each other. This structure allows the amount of change in parallax to be changed in character units, and then the parallax can be provided in a more complicated and fine manner.

Furthermore, in the first aspect above, source image data for background constituted in character units may be stored for a plurality of pictures, and the first and second display image data for a distant view may be written into the first and second temporarily storing portions in the case of distant view image data so that the shifted amount is decreased, and in the case of close-range view image data, the first and second display image data for a close-range view may be written into the first and second temporarily storing portion so that the shifted amount is increased. Then, the amount of change in parallax can be varied for each layer of background displayed being superposed, and a background image with more perspective can be obtained.

Furthermore, in the first aspect above, motion picture characters and background characters may be stored as the source image data and the first and second display image data for a distant view may be written into the first and second temporarily storing portions in the case of distant view image data so that the shifted amount is decreased, and in the case of close-range view image data, the first and second display image data for a close-range view may be written into the first and second temporarily storing portions so that the shifted amount is increased, and the shifted amount may be varied when writing the image data of the motion picture characters into the first and second temporarily storing portions. Then, the amount of change of parallax can be changed for each character in the case of the motion picture characters and for each layer in the case of the background characters, and a wider variety of provision of parallax can be achieved according to natures of the characters.

Furthermore, in the first aspect above, in a preferred embodiment, the display portion includes two sets of, left and right, display units used adjacent to a face. Each of the display units includes display elements with a plurality of dots arranged in one column in the vertical direction and a mirror reflecting display of each display element and turned in a certain angle range, and the supply portion supplies data for one column in the vertical direction in the first display image data to the plurality of display elements included in the left display unit and supplies data for one column in the vertical direction in the second display image data to the plurality of display elements included in the right display unit, the supplied data for one column in the vertical direction being shifted by every one column in the lateral direction in a time sequential manner.

Furthermore, in the first aspect above, in another preferred embodiment, the display portion is a raster scan type display which scans first and second electron beams in the horizontal direction and repeats the scanning in the horizontal direction in a line by line sequentially shifting manner in the vertical direction. The supply portion supplies the first display image data for generation of the first electron beam and supplies the second display image data for generation of the second electron beam.

A second aspect of the present invention is directed to a storage device used in a stereoscopic image display device including first and second temporarily storing portions, a writing control portion, a reading control portion, and a supply portion, for displaying a stereoscopic image with parallax in a display portion, and configured to be attachable/detachable to and from the stereoscopic image display device, wherein the first temporarily storing portion includes at least a storage area with dots corresponding to the number of pixels for one picture of the display portion and temporarily stores first display image data for displaying a first display image for the left, and configured to be writable/readable, the second temporarily storing portion includes at least a storage area with dots corresponding to the number of pixels for one picture of the display portion and temporarily stores second display image data for displaying a second display image for the right, and configured to be writable/readable, the writing control portion is configured to write the first display image data into the first temporarily storing portion and write the second display image data into the second temporarily storing portion, the reading control portion is configured to read the first or second display image data temporarily stored in the first or second temporarily storing portion when the writing control portion is not operating to write into the first or second temporarily storing portion, the supply portion is configured to supply the first and second display image data read by the reading control portion to the display portion, and the storage device includes, an image data storing portion for storing source image data for a plurality of pictures to generate a planar image having no parallax, a parallax information storing portion storing parallax information for specifying an amount of shifting the first and second display images in a lateral direction with each other, and a display control program storing portion providing the parallax information to the writing control portion and storing a display control program for specifying display coordinate positions of the first and second display images, whereby the writing control portion converts planar image data for one picture in the source image data stored in the image data storing portion into the first and second display image data on the basis of the display control program and writes the first display image data into the first temporarily storing portion and writes the second display image data into the second temporarily storing portion on the basis of the parallax information so that the first and second display images are shifted by the number of bits corresponding to parallax in the lateral direction with each other when the first and second display images are displayed by the display portion.

As described above, in the second aspect, the image data storing portion stores source image data for a plurality of pictures to generate planar images having no parallax. The parallax information storing portion stores parallax information for specifying an amount of shifting the first and second display images in the lateral direction with each other. Further, the display control program storing portion supplies the parallax information to the writing control portion and stores a display control program for specifying display coordinate positions of the first and second display images. The writing control portion in the stereoscopic image display device operates on the basis of the display control program to convert the planar image data for one picture in the source image data stored in the image data storing portion into the first and second display image data, and to write the first display image data into the first temporarily storing portion and write the second display image data into the second temporarily storing portion on the basis of the parallax information so that the first and second display images are shifted by the number of bits corresponding to the parallax in the lateral direction with each other when the first and second display images are displayed in the display portion.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a diagram showing a memory map of the work memory 222 in FIG. 2.

FIG. 8 is a diagram showing a memory map of the image work memory 225 in FIG. 2.

FIG. 17 is a diagram showing an example of data format of world attributes.

FIG. 18 is a diagram showing the relation between a position at which a BG is cut out developed on the BG map and a position at which the BG is displayed developed on the display screen, according to the world attributes.

FIG. 19 is a diagram showing an example of character blocks and object attributes prepared to display a certain OBJ.

FIG. 21 is a diagram showing examples of character blocks prepared to display a plurality of OBJs with parallax to each other.

FIG. 22 is a diagram showing the character blocks shown in FIG. 21 displayed on the left eye screen and the right eye screen according to the respective OBJ attributes.

FIG. 27 is a diagram showing an BG cut out from the BG map and the BG displayed on the left and right screens when parallax MP is provided on the BG map.

FIG. 43 is a diagram showing a register for storing the column table reference start address CTA provided in the image processing IC.

FIG. 44 is a diagram showing a register for storing timing data provided in the image processing IC.

DESCRIPTION OF THE PREFERRED EMBODIMENTS

Human beings can see two pictures with parallax separately with left and right eyes and fuse the two pictures in the brain to sense the depth. An electronic game device of an embodiment described hereinafter is configured to display stereo-scopic images to an observer by utilizing the image fusion action.

Generally speaking, a display screen for the game includes two general kinds of displayed components. The first components include displayed objects having relatively large display areas and which do not move finely on the screen, such as mountains, rivers, forests, sky, buildings, etc. The second components include displayed objects having relatively small display areas and which move finely and rapidly on the screen, such as a hero character, enemies, bullets, missiles, etc. In the electronic game device of the embodiment described hereinafter, displayed objects which belong to the first displayed components are called backgrounds (referred to as BG, hereinafter) and displayed objects which belong to the second displayed components are called objects (referred to as OBJ, hereinafter).

Figure 1:
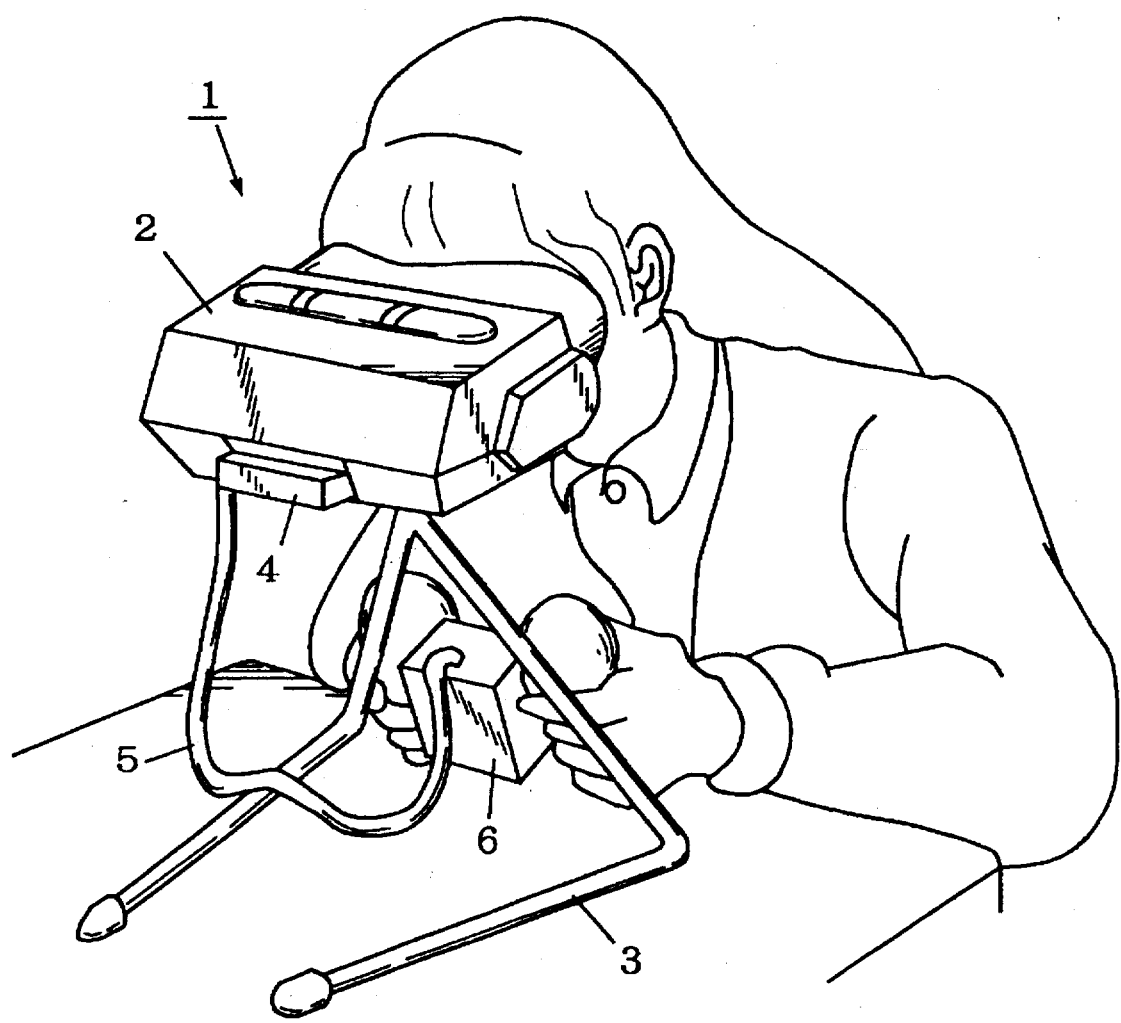
FIG. 1 is a perspective view showing an electronic game device in use according to an embodiment of the present invention.
Figure 2:
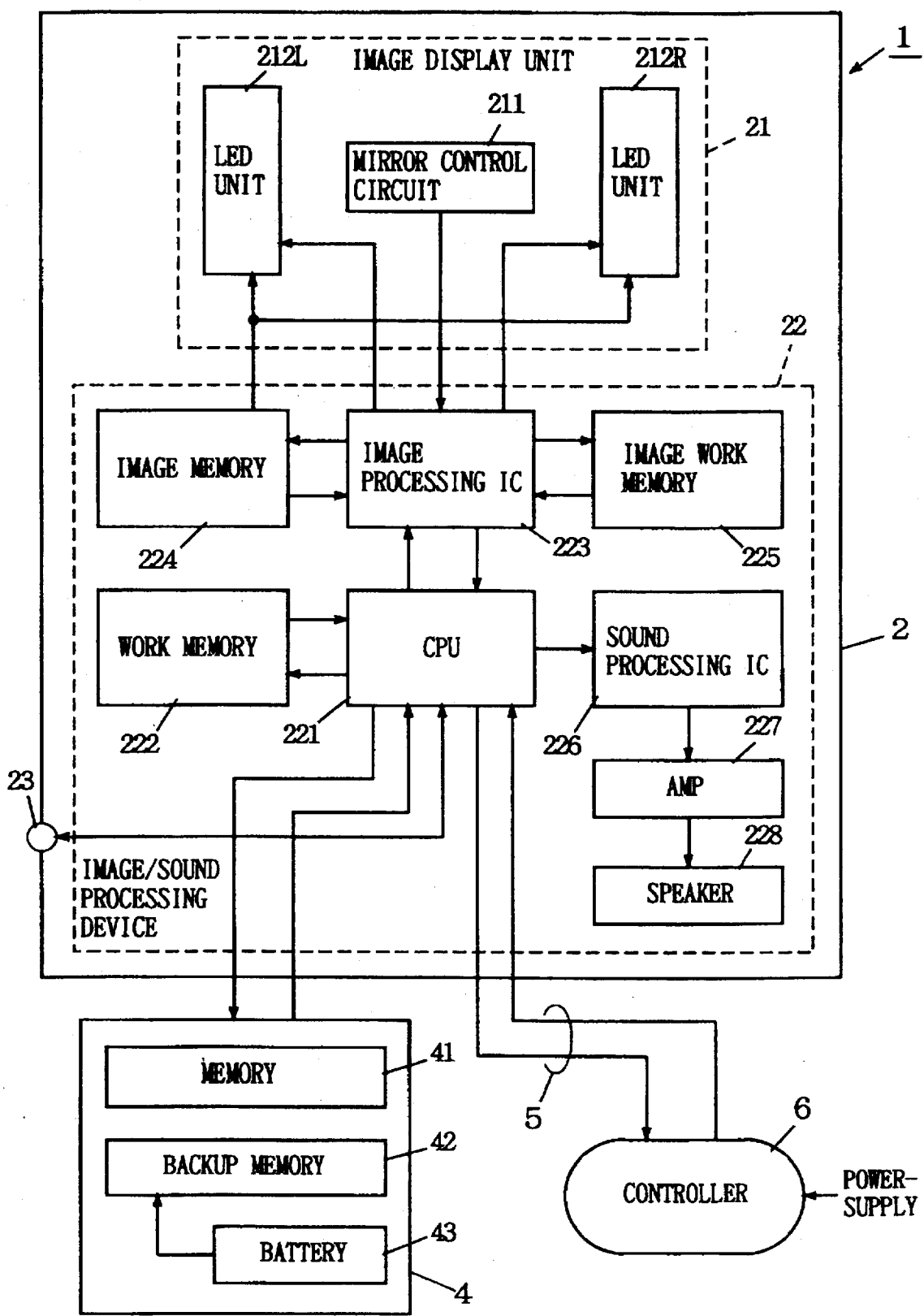
FIG. 2 is a block diagram showing the electric structure of the electronic game device according to the embodiment of the present invention.

FIG. 1 is a perspective view showing an electronic game device in use according to one embodiment of the present invention. FIG. 2 is a block diagram showing the electronic structure of the game device shown in FIG. 1. Referring to FIG. 1 and FIG. 2, the structure of this embodiment is described below.

An electronic game device 1 includes a console body device 2, a support stand 3 coupled to the bottom of the body device 2, a program cartridge 4 attached to the body device 2 in an attachable/detachable manner, and a controller 6 connected to the body device 2 through a cord 5. The console body device 2 is supported on a desk or the like by the support stand 3. A player looks into the supported body device 2 to see a game display.

Figure 3:
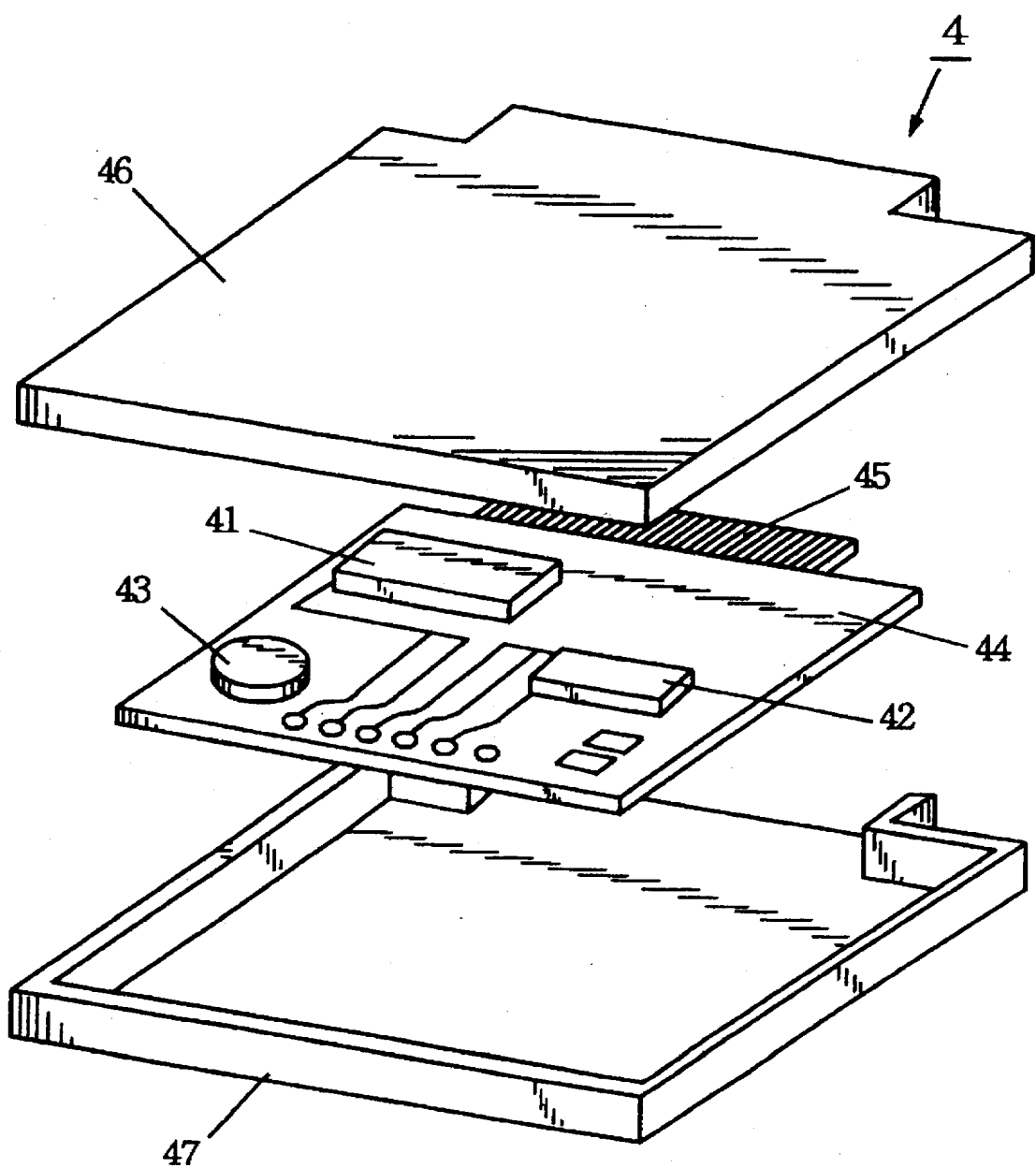
FIG. 3 is an exploded perspective view showing an example of the structure of the program cartridge 4 in FIG. 1.

The program cartridge 4 includes a memory 41 formed of a non-volatile storage medium, such as ROM and CD-ROM, a backup memory 42 formed of a rewritable storage element, such as RAM, and a battery 43 formed of a lithium battery or the like. As shown in FIG. 3, the memory 41, the back-up memory 42 and the battery 43 are packaged on a substrate 44 having a terminal 45, for example. The substrate 44 is accommodated in a case formed of an upper housing 46 and a lower housing 47.

Preferably, the controller 6 is equipped with a battery pack which is attachable and detachable. This battery pack has a battery accommodated therein for spontaneously supplying driving power to the console body device 2. Accordingly, the electronic game device of this embodiment can be used in places where no commercial power is supplied (outdoors, on vehicles, etc.) A power-supply adapter may be attached to the controller 6 to supply external commercial power to the body device 2.

The console body device 2 includes an image display unit 21, an image/sound processing device 22, and a transfer port 23. The image/sound processing device 22 includes a CPU 221, a work memory 222, an image processing IC 223, an image memory 224, an image work memory 225, a sound processing IC 226, an amp 227 and a speaker 228. The CPU 221 executes a game program stored in the memory 41 of the program cartridge 4. The transfer port 23 is connected to the CPU 221.

Figure 4:
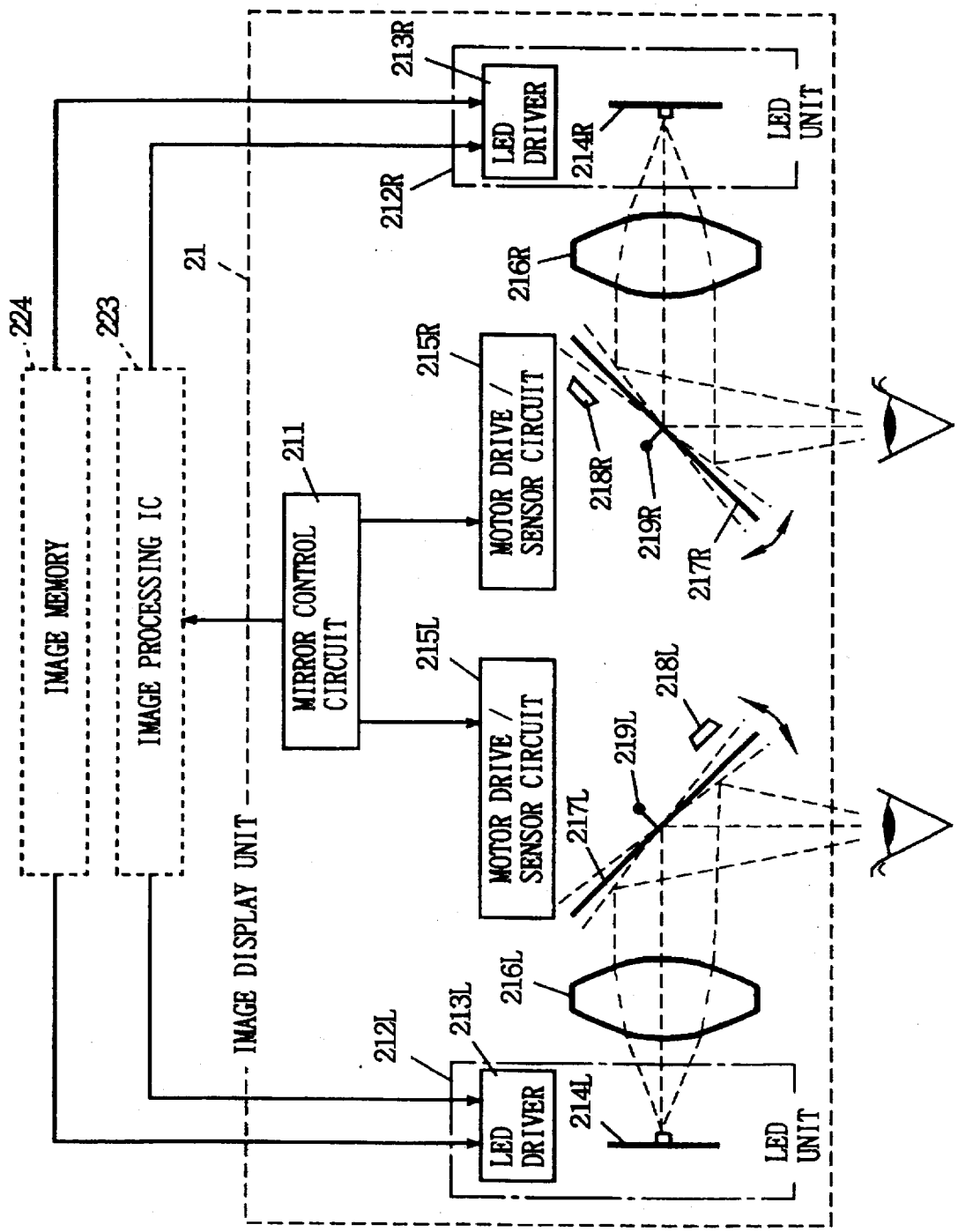
FIG. 4 is a diagram showing more detailed structure of the image display unit 21 in FIG. 2.

The image display unit 21 generally includes a mirror control circuit 211 and a pair of LED (light emitting diode) units 212L and 212R on the left and right. More detailed structure of the image display unit 21 is shown in FIG. 4. As shown in FIG. 4, the image display unit 21 further includes a pair of, left and right, motor drive/sensor circuits 215L and 215R, a pair of, left and right, lens systems 216L and 216R, a pair of, left and right, mirrors 217L and 217R and a pair of, left and right, voice coil motors 218L and 218R. The LED units 212L and 212R include LED drivers 213L and 213R and LED arrays 214L and 214R, respectively.

The image display unit 21 displays one picture with 384 dots in the X-axis direction (in the horizontal direction with respect to the visual field) and 224 dots in the Y-axis direction (in the vertical direction with respect to the visual field). Accordingly, the LED arrays 214L and 214R am formed of 224 LEDs placed in a row in the Y-axis direction, respectively. Light beams in columns emitted from the LED arrays 214L and 214R impinge upon the mirrors 217L and 217R through the lens systems 216L and 216R, respectively, and are reflected by the mirrors 217L and 217R, and then enter the left and right eyes of the player. The mirror control circuit 211 drives the voice coil motors 218L and 218R, using the motor drive/sensor circuits 215L and 215R. Thus, the mirrors 217L and 217R reciprocatively pivot with a certain period about the supporting points 219L and 219R. As a result, the light beam in columns emitted from each LED array is scanned in the horizontal direction, respectively. The image processing IC 223 transfers image data for 384 columns from the image memory 224 to the LED driver 213L or 213R while the mirror 217L or 217R turns once. Accordingly, the player recognizes an image formed of 384 (transverse)×224 (vertical) dots due to the after image phenomenon.

An image display unit having a similar principle of display to that of the image display unit 21 of this embodiment has been developed by Reflection Technology in the United States (refer to Japanese Patent Laying-Open No. 2-42476, Japanese Patent Laying-Open No. 2-63379), which is sold under the commercial name "The Private Eye". The display device developed by the Reflection Technology is mainly for displaying planar images, however, and none of the above-cited references disclose the way of providing parallax. In this embodiment, parallax is provided between a left eye image formed by light emitted from the LED array 214L and a right eye image formed by light emitted from the LED array 214R by a newly developed novel method to display stereoscopic images with the sense of depth.

Figures 5, 6:
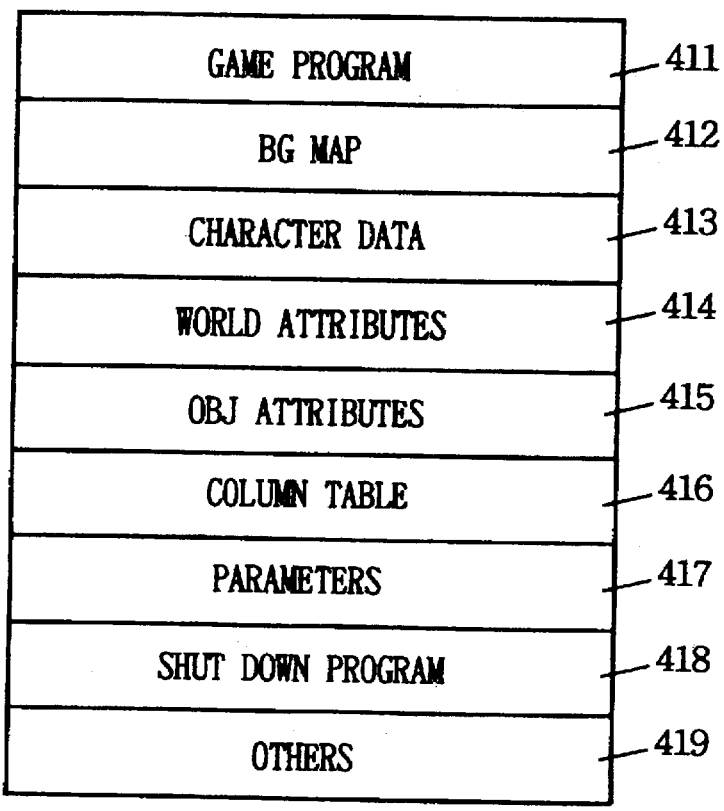
FIG. 5 is a diagram showing a memory map of the memory 41 in FIG. 2.
FIG. 6 is a diagram showing a memory map of the backup memory 42 in FIG. 2.

FIG. 5 is a diagram schematically showing the structure of the memory 41 in FIG. 2. In FIG. 5, the memory 41 includes areas 411-419. The area 411 stores a game program. BG maps are stored in the area 412. In the BG maps, data for character codes (codes corresponding to character data shown below) for BG (background) display are described. A plurality (tens of thousands, for example) of character data are stored in the area 413. Each character data is 8×8 dot bit map data. By combining such character data all BG's and OBJ's (objects) maybe represented. One dot is represented with 2 bits to represent a 4-gradation display. World attributes are stored in the area 414. As will be described later, the electronic game device of this embodiment forms one image by superposing 32 a maximum of planes of worlds. The world attributes are attribute information necessary to draw each world. OBJ attributes are stored in the area 415. The OBJ attributes are attribute information necessary to draw OBJ's . A column table is stored in the area 416. This column table includes timing information described therein for correcting unevenness of dot pitch in the X-axis direction caused by sine-wave vibration of the mirrors 217L and 217R in the image display unit 21. Stored in the area 417 are various parameters necessary to execute the game (e,g., parameters used in special display modes, such as H-bias, affine, etc.) Shut-down program is stored in the area 418. The shut-down program is a program for automatically shut down the progress of the game to prevent accumulation of fatigue of the player when a certain time period passes after the game is started. The area 419 stores other data which are necessary to execute the game.

Although data of character codes are described in the BG map in the embodiment, bit map data may be directly stored in the BG map without using character codes.

FIG. 6 is a diagram schematically showing structure of the back-up memory 42 in FIG. 2. In FIG. 6, game data (various values indicating states of the game) at each save point are stored in the back-up memory 42. The back-up memory 42 is formed of RAM and is backed up by the battery 43. Accordingly, the game data stored in the back-up memory 42 are held even after the power of the body device 2 is turned off.

FIG. 7 is a diagram schematically showing structure of the work memory 222 in FIG. 2. In FIG. 7, the work memory 222 stores various values indicating states of the game (the number of machines on the player's side, states of the player's machines, positions of the machines on the player's side, positions of enemies, a number of stages, the number of items, etc.) and other data.

FIG. 8 is a diagram schematically showing the structure of the image work memory 225 in FIG. 2. In FIG. 8, the image work memory 225 includes areas 2251-2255. The area 2251 is used as a BGMM (BG map memory) for storing BG maps selectively read from the area 412 of the memory 41 (refer to FIG. 5). The area 2252 is used as a WAM (World Attribute Memory) for storing world attributes for 32 worlds. The area 2253 is used as an OAM (OBJ Attribute Memory) for storing OBJ attributes selectively read from the area 415 of the memory 41. Stored in the area 2254 is a column table read from the area 416 in the memory 41. Stored in the area 2255 are various parameters necessary to execute the game (e.g., parameters used in special display modes, such as H-bias, affine, etc.)

Figure 9:
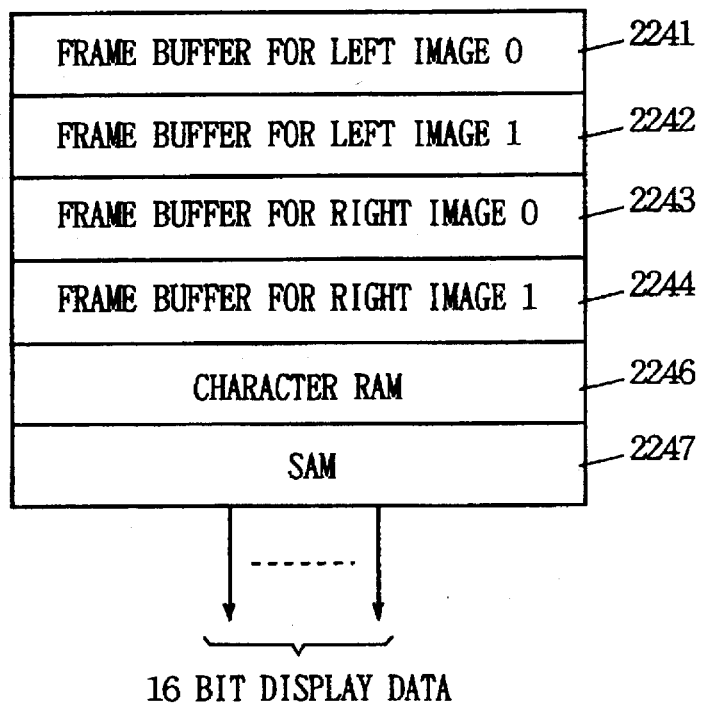
FIG. 9 is a diagram showing a memory map of the image memory 224 in FIG. 2.

FIG. 9 is a diagram schematically showing the structure of the image memory 224 in FIG. 2. In FIG. 9, the image memory 224 includes areas 2241-2247. The area 2241 is used as a frame buffer (0) for the left image. The area 2242 is used as a frame buffer (1) for the left image. The area 2243 is used as a frame buffer (0) for the right image. The area 2244 is used as a frame buffer (1) for the right image. Each frame buffer stores display data for one picture (display data of 384×224 dots, each bit having a depth of 2 bits). The area 2246 is used as a character RAM. Stored in the character RAM am the maximum of 2048 character data read from the area 413 of the memory 41 (refer to FIG. 5). The area 2247 is used as a SAM (Serial Access Memory). Display data stored in each frame buffer are stored in the SAM 2247 by every four vertical columns (for every 224×4×2=1792 bits). The SAM 2247 outputs accumulated display data to the image display unit 21 in units of 16 bits (8 dots).

Figure 10:
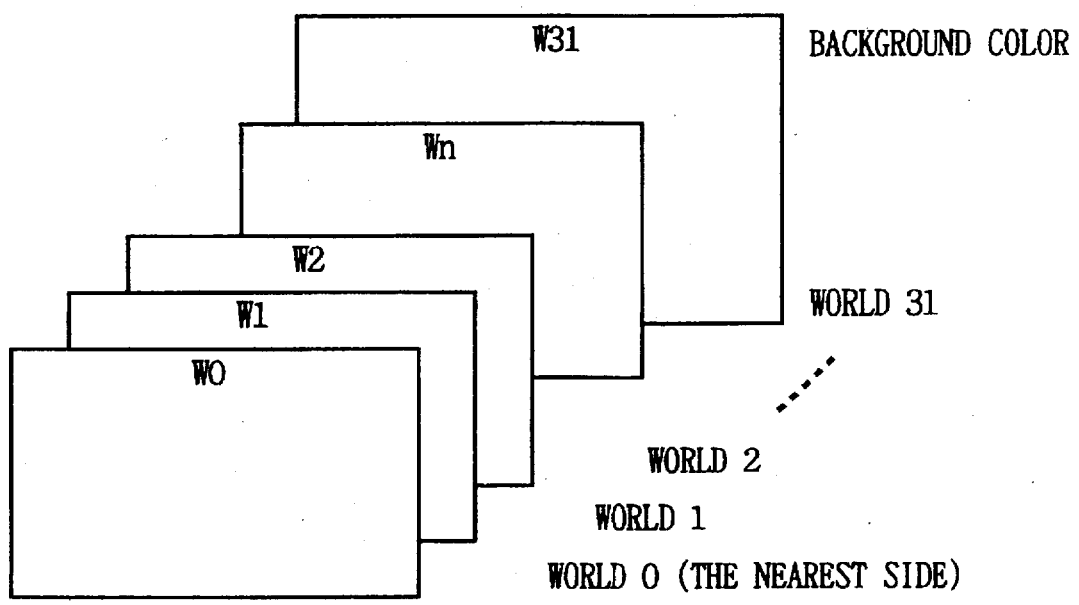
FIG. 10 is a schematic diagram for describing the concept of worlds.

Although this embodiment adopts the parallax providing method which is simplified to reduce the amount of information, it introduces the concept called worlds to obtain images with more sense of depth. The worlds mean virtual planes (W0–W31) formed of 32 layers for controlling picture drawing which exist from this side toward the depths on the screen as shown in FIG. 10. In this embodiment, the maximum of 32 planes of worlds can be set, and one BG, or OBJ's formed of characters up to 1024 can be placed in each plane. When a BG is placed, it is possible to regard the world as a background layer or battery. The image processing IC 223 (refer to FIG. 2) sequentially refers to attribute information (world attributes) set for each world from the deepest world W31 to perform picture drawing processing of each world to the image memory 224. That is to say, one image is formed by superposing the maximum of 32 planes of worlds.

In this embodiment, it is possible to determine the display priority order between BG/BG, OBJ/BG, OBJ/OBJ by setting the worlds. That is to say, a BG or an OBJ placed on a world on the relatively nearer side (with a smaller number) has a higher order of display priority than a BG or an OBJ on a world on the relatively deeper side (with a larger number). For example, a BG or an OBJ placed on the N-th world is written over a BG or an OBJ placed on the N+1-th world adjacent in the depth direction. Accordingly, if the BG or OBJ has an overlapping portion between adjacent worlds, the BG or OBJ on the deeper world is covered with the BG or OBJ on the nearer world in the overlapping portion and is not visible on the screen, unless the BG or OBJ on the nearer world has a transparent portion. The display priority order is set according to the write order of OBJ attributes on the OAM 2253 also between OBJ/OBJ placed on the same world, but the display priority order among worlds has a higher degree of priority.

In this embodiment, the BG and OBJ are displayed by different methods, considering differences in nature between the BG and the OBJ. The methods of displaying the BG and OBJ will now be described.

First, a description will be made on a method of displaying the BG. The BG is displayed by cutting a picture in a necessary area out of a BG map developed in the BGMM 2251 (refer to FIG. 8) and pasting the cut-out picture in an arbitrary position on the display screen. It is possible to cut out a picture in units of one dot in a range from the minimum of 1 (transverse)×8 (vertical) dots to the maximum of 384 (transverse)×224 (vertical) from the BG map. The coordinates at which cutting-out is started can also be specified in units of one dot in both X and Y coordinates.

Figure 11:
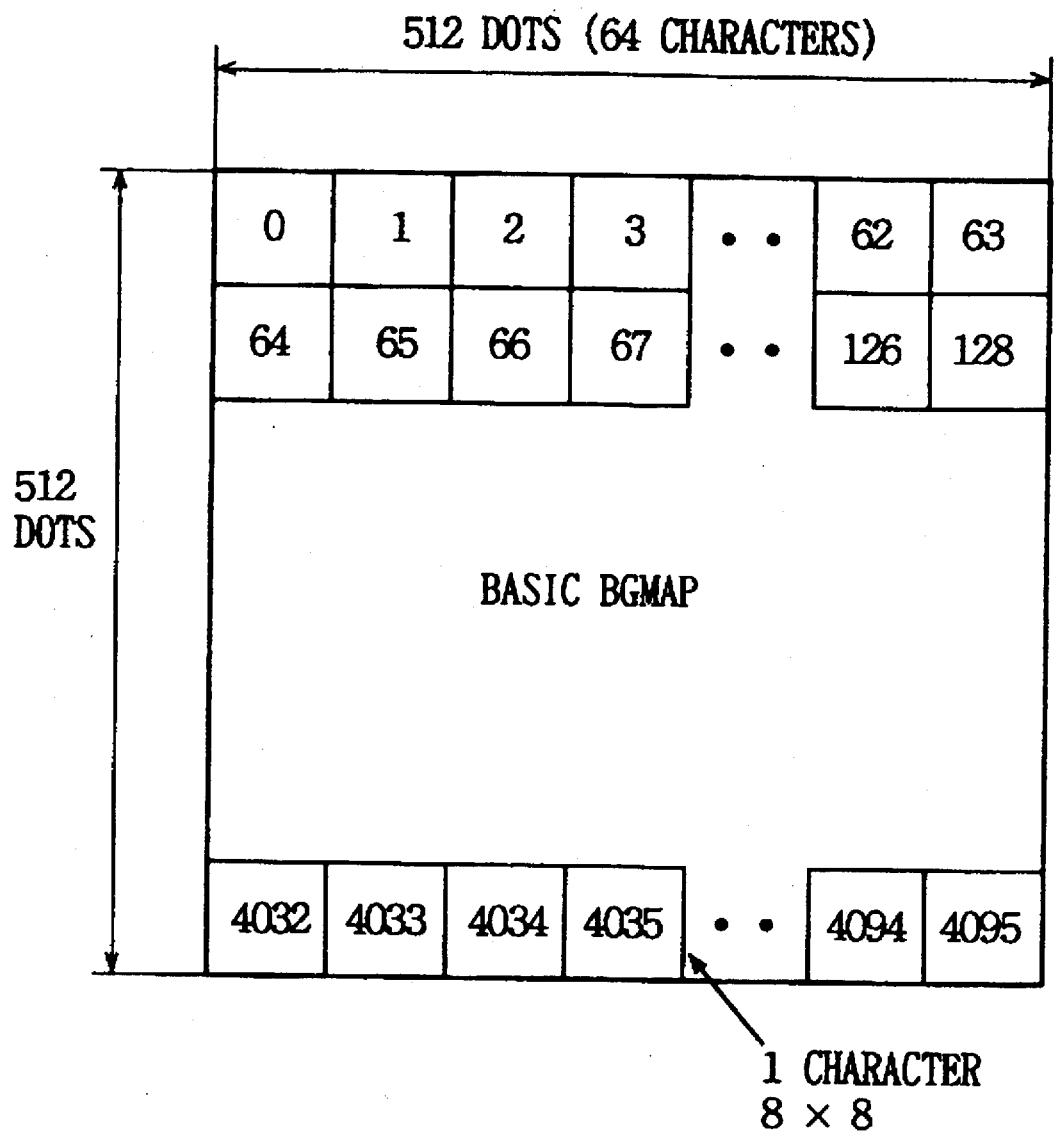
FIG. 11 is a schematic diagram of a basic BG map.
Figure 12:
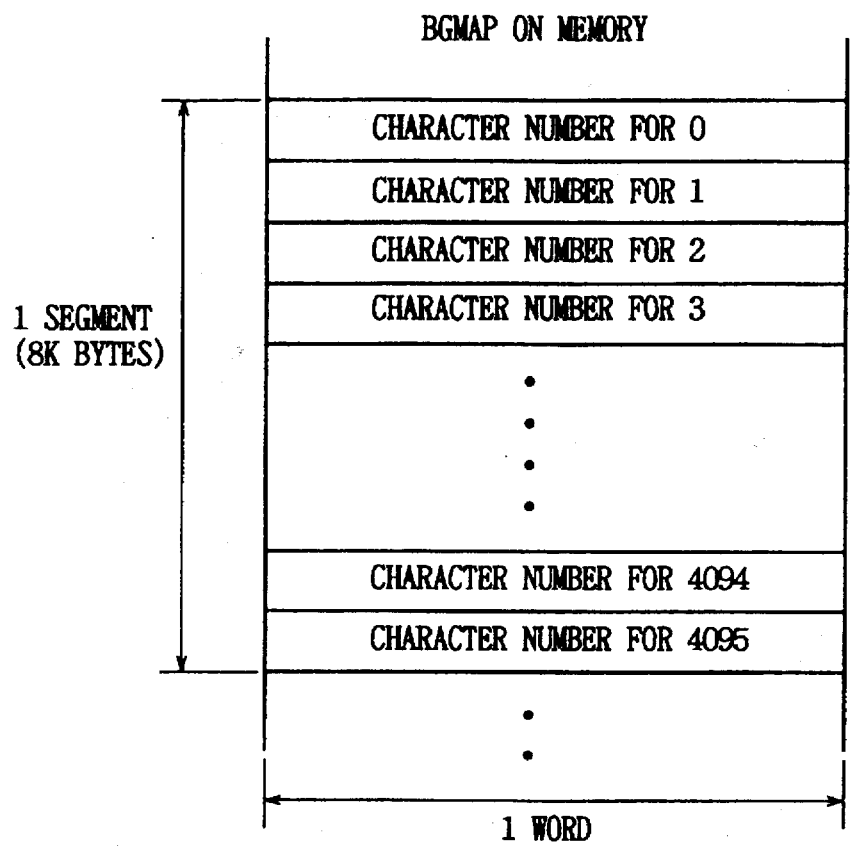
FIG. 12 is a diagram showing the structure of the BG map on the memory.

The BG map has a BG image for 512×512 dots as a basic unit, as shown in FIG. 11. In this embodiment, the basic unit of the BG is referred to as a segment. One segment is formed by collecting 64×64 character blocks of 8×8 dots, i.e. 4096. FIG. 11 schematically shows the BG map, and on the actual BGMM 2251, as shown in FIG. 12, numbers of the respective characters are stored in the order of the position numbers (0–4095) on the BG map in FIG. 11. The numbers are allotted to the respective characters on the character RAM 2246 in the image memory 224 (refer to FIG. 9). That is to say, the character RAM 2246 stores 2048 character data selectively transferred from the area 413 of the memory 41 (refer to FIG. 5), each character data having a character number selected from 0 to 2047. Accordingly, on the BG map, the BG image is represented using the 2048 kinds of characters.

In this embodiment, the BGMM 2251 has an area which can store BG maps for 14 segments. Hence, the electronic game device of this embodiment can use the maximum of 14 BG maps to create one picture. It is also possible to handle a combination of a plurality of segments as one BG map. The maximum number of combinable segments is 8.

Although the image display method called a character method for forming the BG map by specifying numbers of characters is shown in this embodiment, the present invention may use the bit map method of forming the BG map with groups of dots.

Figure 13:
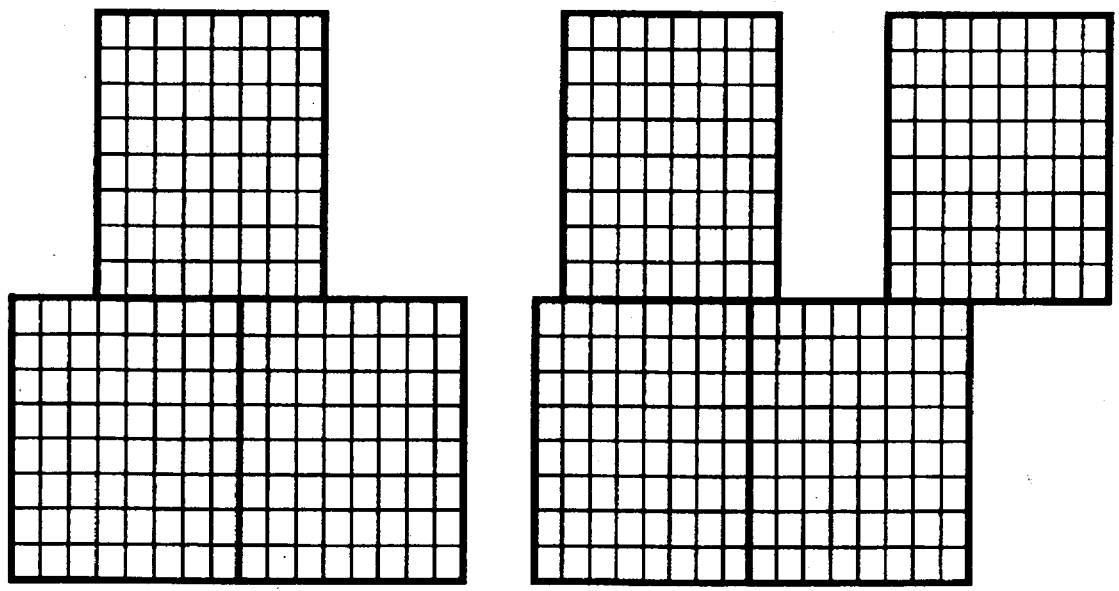
FIG. 13 is a diagram showing an example of OBJ created by combining character blocks.

Next, a method of displaying an OBJ will now be described. The OBJ is formed by freely combining 8×8 dots character blocks, as shown in FIG. 13. In other words, by well controlling display coordinates of selected character blocks, the selected character blocks are connected on the display screen. The maximum number of characters usable on one display screen is 1024. The 1024 characters are selected from the 2048 characters registered in the character RAM 2246 (refer to FIG. 9) of the image memory 224 and used.

The OBJs as displayed objects have a property that a large number of small objects are disposed discontinuously on the display screen. Accordingly, controlling coordinate positions of character blocks required for display and appropriately disposing the character blocks on the screen provide efficient use of memory. If the OBJ is to be displayed by cutting rectangular pictures out of the BG map and pasting them on the display screen, like the BG, a lot of undisplayed character blocks must be disposed on the map, which will wastefully consume memory capacity. However, a basic size of the OBJ is 8×8 dots, and no objects smaller than that can be displayed. Also, when displaying an object larger than that, the size increases in units of 8 dots. However, this invention does not restrict the size of OBJ, and the size of OBJ does not necessarily have to be 8×8 dots.

On the other hand, the BG has a large display area on the display screen and has a property that they are continuously disposed with few changes in state. Accordingly, the method of cutting out rectangular blocks from a previously prepared BG map and pasting them at arbitrary positions on the display screen is suitable. If coordinates of a BG are to be controlled for each display character, like the OBJ, attribute information increases so much that overload will be put on the picture drawing processing.

Figure 14:
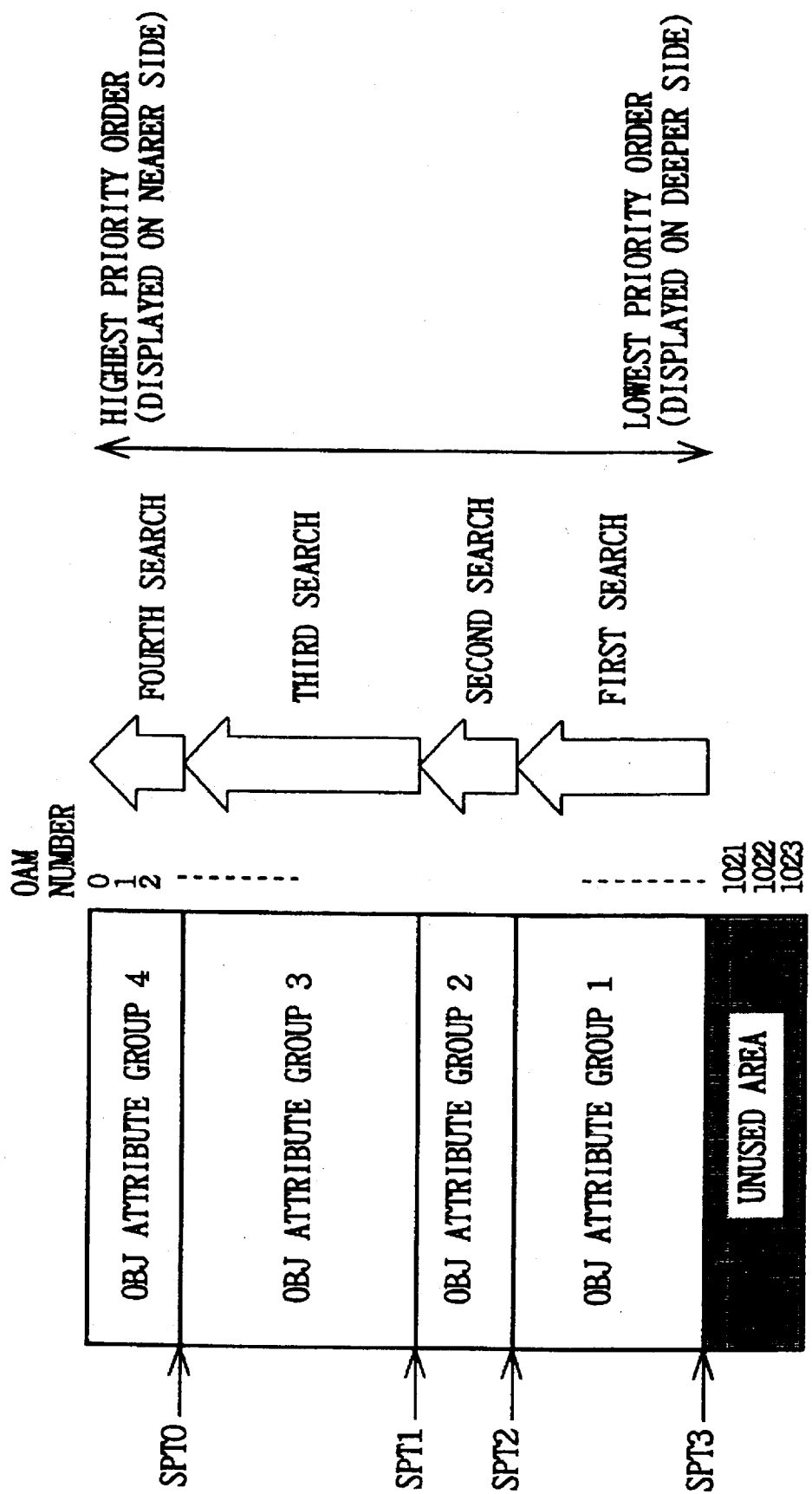
FIG. 14 is a schematic diagram for describing arrangement of OBJ attribute groups in the OAM and the order of searching them.

FIG. 14 schematically shows arrangement of OBJ attributes stored in the OAM 2253 (refer to FIG. 8). As stated before, the OBJ can be set in the maximum of four planes in the 32 worlds. Hence, OBJ attributes are registered while being divided into the maximum of four groups in accordance with planes in which they are set, as shown in FIG. 14. The image processing IC 223 (refer to FIG. 2) searches the world attributes, and when it finds a world in which the OBJ is set, it searches the OAM 2253 to draw the OBJ registered therein. The search of the OAM 2253 is performed in the order starting from an OBJ registered in a position with a larger OAM number (0-1023), and a corresponding OBJ is drawn. An OBJ drawn later has a higher display priority order in the worlds. The boundaries between the four groups are specified by OBJ controlling registers SPT0, SPT1, SPT2 and SPT3 (not shown). Set in an OBJ controlling register SPTx (x=0–3) is an OAM number (0 to 1023) at a position with the lowest priority order (with a larger address) in each group. If the OAM number 1023 is set in the OBJ controlling register SPT3, no unused area exists in the OAM.

Figure 15:
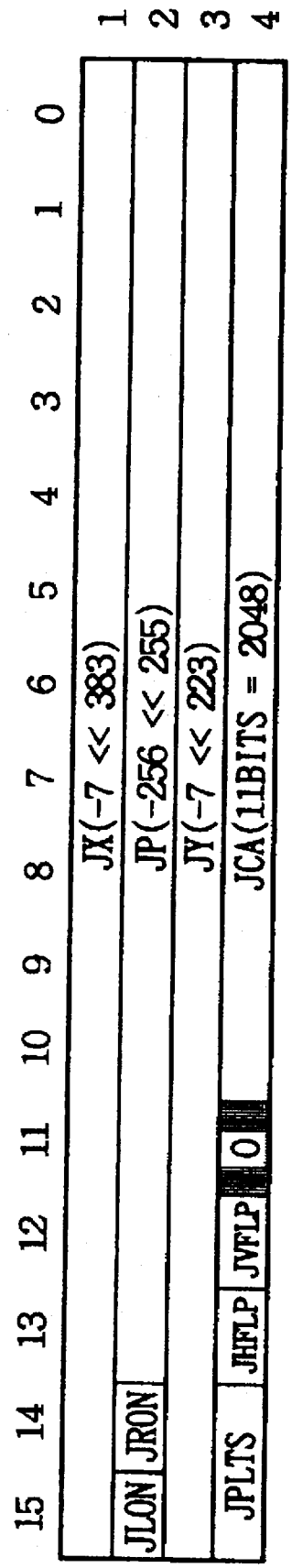
FIG. 15 is a diagram showing an example of data format of the OBJ attributes.

FIG. 15 is a diagram showing structure of the OBJ attributes for one character block written in the OAM 2253. The OBJ attributes are formed of four words (one word includes 2 bytes 16 bits). In FIG. 15, JX is a 16-bit integer with a sign (positive or negative), which indicates a display position (−7 to 383) of the OBJ in the X-axis direction on the display screen. JY is a 16-bit integer with a sign, which indicates a display position of the OBJ in the Y-axis direction (−7 to 223) on the display screen. JP is a 14-bit integer with a sign, which indicates the quantity of parallax (−256 to 255) in the coordinate system in which the OBJ is displayed. JLON is a 1-bit flag, which indicates whether the OBJ is to be displayed in the left screen or not. JRON is a 1-bit flag, which indicates whether the OBJ is to be displayed on the right screen or not. JCA is a 11-bit integer, which indicates a character number from 0 to 2047. Other attribute information in FIG. 15 have no direct relation with the present invention, so that a description thereof is not made herein.

Figure 16:
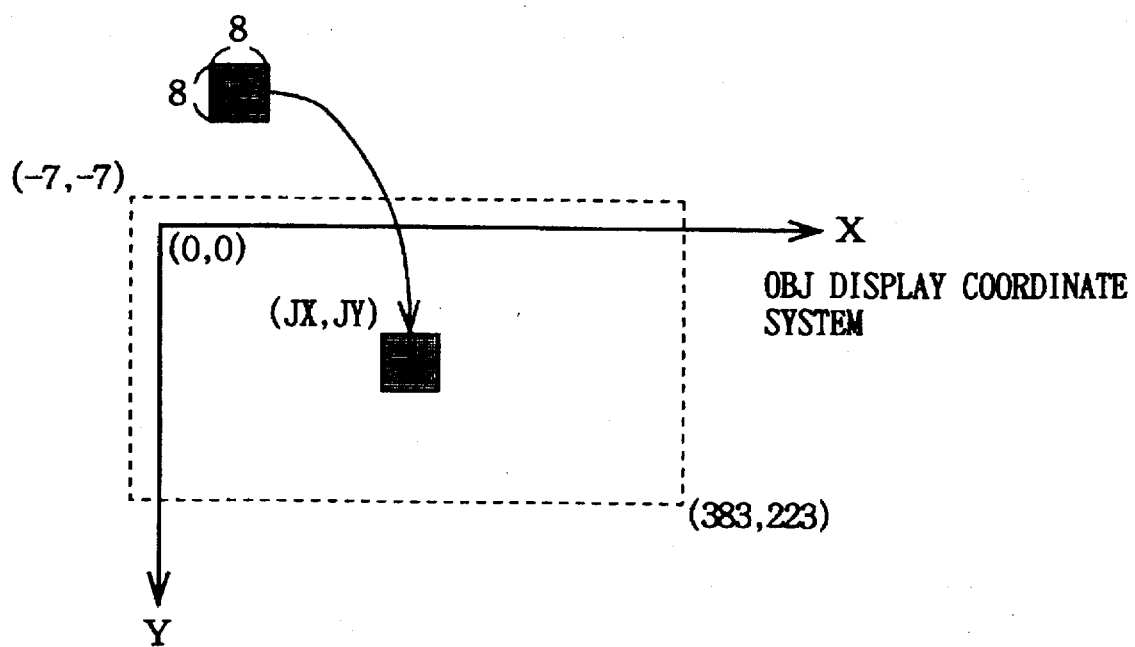
FIG. 16 is a diagram showing an OBJ display coordinate system on the display screen.

FIG. 16 shows an OBJ display coordinate system in each frame buffer 2241–2244 (refer to FIG. 9) or on the display screen. The OBJ display coordinate system has an area from (0, 0) to (383, 223). The origin (0, 0) is chosen to be at the uppermost point on the left end on the display screen. On the other hand, the space represented by JX, JY of the OBJ attributes has an area from (−7, −7) to (383, 223). This is due to the fact that when a hero appears from the left end on the screen and walks to the right, for example, it is necessary to display the character so that the contents gradually appear on the left end on the screen. The same is true in the case where a hero appears from the upper end on the screen and walks downward. The image processing IC 223 of FIG. 2 reads character data corresponding to the JCA (character number) in the OBJ attributes of FIG. 15 from the character RAM of FIG. 9 and draws the read character data in a predetermined position or predetermined positions (the position defined by JX, JY, JP) on the frame buffer or buffers for the left image and/or the right image. At this time, the image processing IC 223 subtracts or adds the value of the parallax amount JP from or to the JX to determine the X coordinates of display on the left and right screens (i.e. the X coordinates of picture drawing in the right and left frame buffers). Concerning the JY, the quantity of parallax JP is not subtracted nor added. The description above can be represented in more detail using equations as;

JXL=JX−JP (JXL=X coordinate on the left screen)

JXR=JX+JP (JXR=X coordinate on the right screen)

JYL=JYR=JY (JYR, JYL=Y coordinate on the right and left screens)

FIG. 17 is a diagram showing the structure of world attributes for one world written in the WAM 2252 of FIG. 8. Now, the structure of the world attributes will be described referring to FIG. 17. As shown in FIG. 17, each world attribute is set on an attribute table of 16 words. The 32 worlds from W0 to W31 (refer to FIG. 10) can be set in the WAM 2252. By setting the world attributes, setting can be made as to whether a BG is to be drawn, an OBJ is to be drawn, a BG or an OBJ is to be drawn on both of the right and left screens, or to be drawn one of them, etc. Either one of, 1: one BG (BG world)

2: one to 1024 OBJ(s) (OBJ world)

3: nothing (dummy world: nothing displayed)

4: controlling world (end world)

can be set in each world. As has been stated hereinabove, the image processing IC 223 of FIG. 2 draws pictures on worlds set in the order from an image existing in the deepest in the screen, as W31→W30→W29 ... W0. The world W0 has the highest display priority order, followed by W1, W2 ... W31. Depending on the software, when all the worlds are not required, controlling worlds can be set to efficiently draw required worlds only. For example, when three worlds are used, setting as follows is possible.

W31, W30, W29→used as worlds for picture drawing

W28→set as an end world

W31: a distant view

W30: a middle view (a scene in the middle of the distant view and a close-range view)

W29: a close-range view

Setting as above allows the middle view image to be displayed on this side of the distant view image, and the close-range view image to be displayed on this side of the middle view image according to the priority order of worlds, which enables picture drawing with images superposed on one another according to the priority order corresponding to the perspective. The image processing IC 223 skips processing for W28-W0 and the processing speed is increased.

Of course, if the processing speed permits, the three worlds can be set on arbitrary worlds. In this case, unused worlds are set as dummy worlds.

In FIG. 17, the world attributes include attribute information GX, GY, GP for defining where in the display screen the BG image taken out of the BG map is to be displayed. The GX is a 16-bit integer with a sign (positive or negative), which indicates a position in the X-axis direction (0–383) in the coordinate system in which the BG is displayed. The GY is a 16-bit integer with a sign, which indicates a position in the Y-axis direction (0–223) in the coordinate system in which BG is displayed. The GP is a 16-bit integer with a sign, which indicates the quantity of parallax (−256 to 255) in the coordinate system in which the BG is displayed. The image processing IC 223 calculates coordinate positions for actual display on the display screen as;

X coordinate for the left eye (dstXL)=GX−GP

X coordinate for the right eye (dstXR)=GX+GP

The world attributes also include attribute information MX, MY, MP for defining a starting position of image data taken out from the BG map. The MX is a 16-bit integer with a sign (positive or negative), which indicates a position in the X-axis direction (0 to 4095) in the source coordinate system of the BG. The MY is a 16-bit integer with a sign, which indicates a position in the Y-axis direction (0 to 4095) in the source coordinate system of BG. The MP is a 16-bit integer with a sign, which indicates the quantity of parallax (−256 to 255) in the source coordinate system of the BG. The image processing IC 223 calculates a coordinate position of data actually taken out from the BG map as;

Y coordinate for the left eye (srcYL)=MY−MP

Y coordinate for the right eye (srcYR)=MY+MP

Furthermore, the world attributes include attribute information W, H for defining the BG size (window size) on the display screen. The W indicates the number of bits in the X-axis direction of the BG on the display screen. The H indicates the number of bits in the Y-axis direction of the BG on the display screen. For the left eye, the BG is cut out in the area of (srcXL, MY) to (srcXL+W, MY+H), and displayed from the position of (dstXL, GY) on the display screen. For the right eye, the BG is cut out in the area from (srcXR, MY) to (srcXR+W, MY+H) and displayed from the position of (dstXR, GY) on the display screen.

Furthermore, the world attributes include attribute information LON, RON for defining in which of the left image frame buffer (2241 or 2242) and the right image frame buffer (2243 or 2244) the BG image cut out from the BG map is to be drawn, or whether it is to be drawn in both, that is, for which of the left eye and the right eye it is to be displayed, or, whether it is to be displayed for both. The LON, RON are 1-bit flags, respectively, which indicate states below according to set values.

LON=0: not draw in the frame buffer for the left image

LON=1: draw in the frame buffer for the left image

RON=0: not draw in the frame buffer for the right image

RON=1: draw in the frame buffer for the right image

When the LON and RON are both 0, nothing is drawn on that world.

Furthermore, the world attributes include attribute information BGM for defining a display mode of the BG image. The BGM is formed of 2 bits and represents four modes below, according to the set values.

BGM=00 the normal BG display mode

BGM=01 the H-bias BG display mode

BGM=10 the affine BG display mode

BGM=11 the OBJ display mode

The normal BG display mode is a mode for displaying an usual BG image. The H-bias display mode is a mode for displaying a BG image with each line in the X-axis direction having offset for each line. The affine BG display mode is a mode for displaying a BG image while being enlarged/reduced/rotated. The OBJ display mode is a mode for displaying an OBJ, in which case the image processing IC 223 refers to the OBJ attributes set in the OAM 2253.

Furthermore, the world attributes include attribute information SCX, SCY for defining a screen size of the target BG map. The SCX is formed of 2 bits, and defines the size of the BG map in the X-axis direction as follows. The SCY is formed of 2 bits, and defines the size of the BG map in the Y-axis direction according to the set values as follows.

```
SCX: Screen Size X
    SCX = 00  512 dots (1 segment)
        = 01 1024 dots (2 segments)
        = 10 2048 dots (4 segments)
        = 11 4096 dots (8 segments)
SCY: Screen Size Y
    SCY = 00  512 dots (1 segment)
        = 01 1024 dots (2 segments)
        = 10 2048 dots (4 segments)
        = 11 4096 dots (8 segments)
```

A combination of the SCX and SCY above defines the size of one BG map combined in the range of 1 to 8 segments.

Moreover, the wold attributes include attribute information END for defining whether that world is a final world (an end world) or not. The END is a 1-bit flag, which defines two states below according to its set value.

END=0 The world to be processed this time is not a final world

END=1 The world to be processed this time is a final world

Furthermore, the world attributes include 4-bit attribute information BGMAP_BASE. A base address of the BG map, i.e. a number (0 to 13) of a head segment of the target BG map is set in the BGMAP_BASE.

Furthermore, the world attributes include attribute information PARAM_BASE. Base addresses of a parameter table in which parameters used in the H-bias BG display mode, the affine BG display mode are stored in the attribute information PARAM_BASE.

Other attribute information in FIG. 17 have no direct relation with the present invention, and therefore a description thereof is not made herein.

A picture registered on the BG map is cut out in an arbitrary size (1×8 to 384×224) from an arbitrary position according to setting in the world attributes and drawn. When the normal BG display mode is set in the attribute information BGM, the quantity of parallax MP is referred to when cutting out the picture from the BG map, in addition to the quantity of parallax GP on the display screen. The quantity of parallax MP is for considering that different areas of a picture are seen through the left eye and the right eye if the cut out BG is supposed as a window. As shown in FIG. 18, a picture is cut out from a position (MX±MP, MY) which is shifted from the cut out start point (MX, MY) by the quantity of parallax MP in the X-axis direction. Also, on the display screen, the picture cut out from the BG map is displayed being shifted by the quantity of parallax GP in the X-axis direction from the display start point (GX, GY).

Now, the area 412 in the memory 41 stores a large number of BG maps which are necessary to configure all the BGs appearing in the game. When the displayed contents change considerably as the game progresses (e.g., when a stage or a scene changes), BG maps required for the BG to be displayed in that stage or scene (the maximum of 14 segments) are selected from the area 412 and transferred to the BGMM 2251.

Stored in the area 414 in the memory 41 are a plurality of world attributes required to draw initial images of stages and scenes where displayed contents considerably change. When the stage or scene changes, world attributes necessary to draw an initial image of that stage or scene are selected from the area 414 and transferred to the BGMM 2251. The world attributes set in the BGMM 2251 are rewritten by the CPU 221 and used according to the game program till the next change of stage or scene comes.

The present embodiment adopts two kinds of newly developed parallax providing methods to display stereoscopic images with a less amount of information. Basically, an attempt is made to reduce the amount of information by producing two pictures provided with parallax from one picture. The novel methods of providing parallax adopted in this embodiment will now be described.

First, the method of providing parallax for the OBJ will be described. Generally, the OBJ is provided with parallax by displaying the same picture on the screens on both sides while shifted by a distance corresponding to the parallax quantity JP in the opposite directions along the X axis (horizontally).

Figure 20:
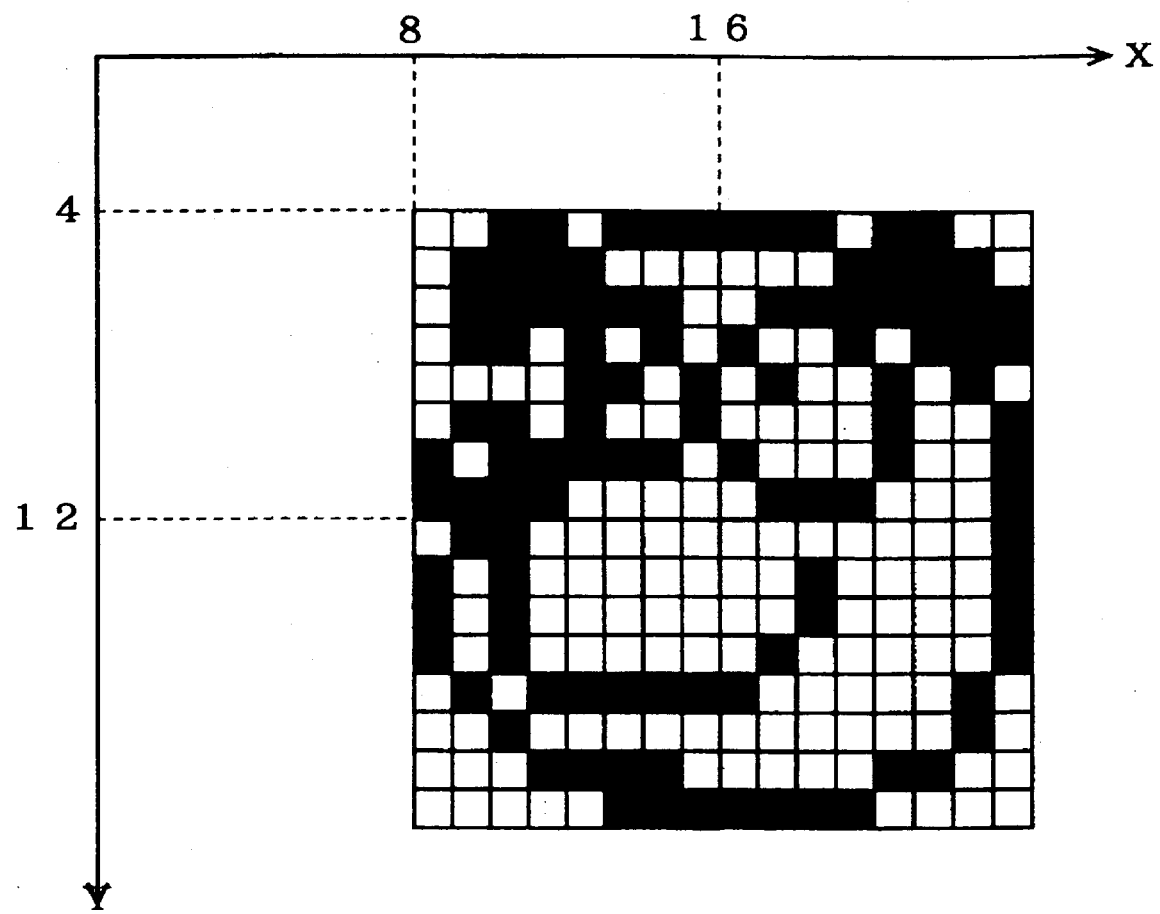
FIG. 20 is a diagram showing an OBJ without parallax displayed using the character blocks in FIG. 19.

Now, suppose that an OBJ is displayed using four characters having dot patterns as shown in FIG. 19(a)–(d). The respective characters (a)–(d) are provided with character numbers (JCA) 20, 8, 10, 1023, respectively. The respective characters (a)–(d) are set with OBJ attributes as shown on the fight side of the dot patterns, respectively. In the case of FIG. 19, as the quantities of parallax JP of the respective characters are 0, the characters are displayed at the positions themselves defined with (JX,JY) on the display screen. Accordingly, an OBJ as shown in FIG. 20 appears on the display screen.

Figure 23:
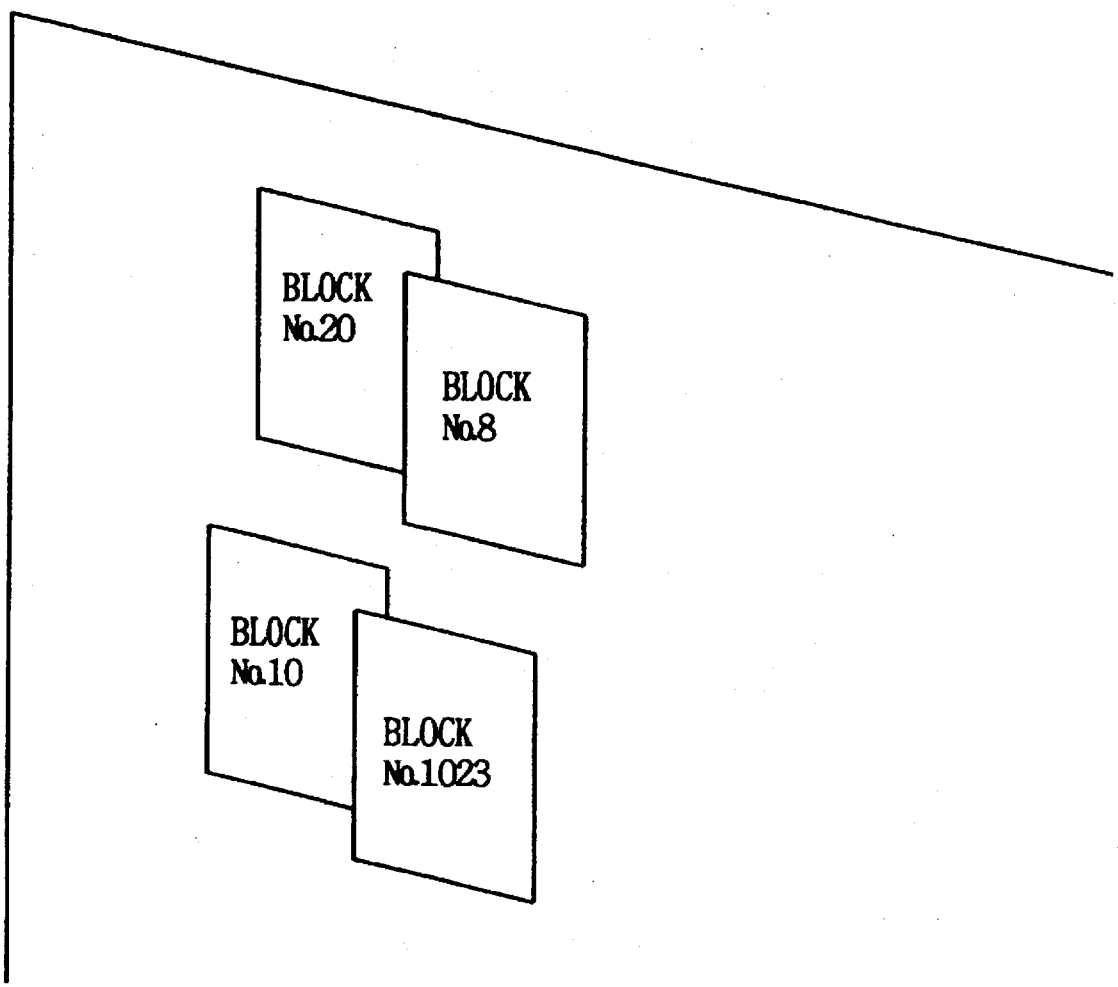
FIG. 23 is a schematic diagram for describing the stereoscopic sense when the left and right images shown in FIG. 22 am seen at the same time.

On the other hand, as shown in FIG. 21 (a)–(d), when parallax is set to the respective characters, the characters are displayed with display positions in the X-axis direction being shifted as (JX–JP) on the left screen (refer to FIG. 22(a)), and shifted as (JX+JP) on the right screen (refer to FIG. 22(b). In this way, as the display positions in the X-axis direction are shifted in the opposite directions by a distance corresponding to the quantity of parallax JP on the left and right screens, the object looks as if it were protruding or distant. If the images shown in FIG. 22(a) and (b) are seen with the left and right eyes, respectively, they are seen in the order of the block with the character number 20, the block with the character number 8, the block with the character number 10 and the block with the character number 1023 from this side, as shown in FIG. 23.

Figure 24:
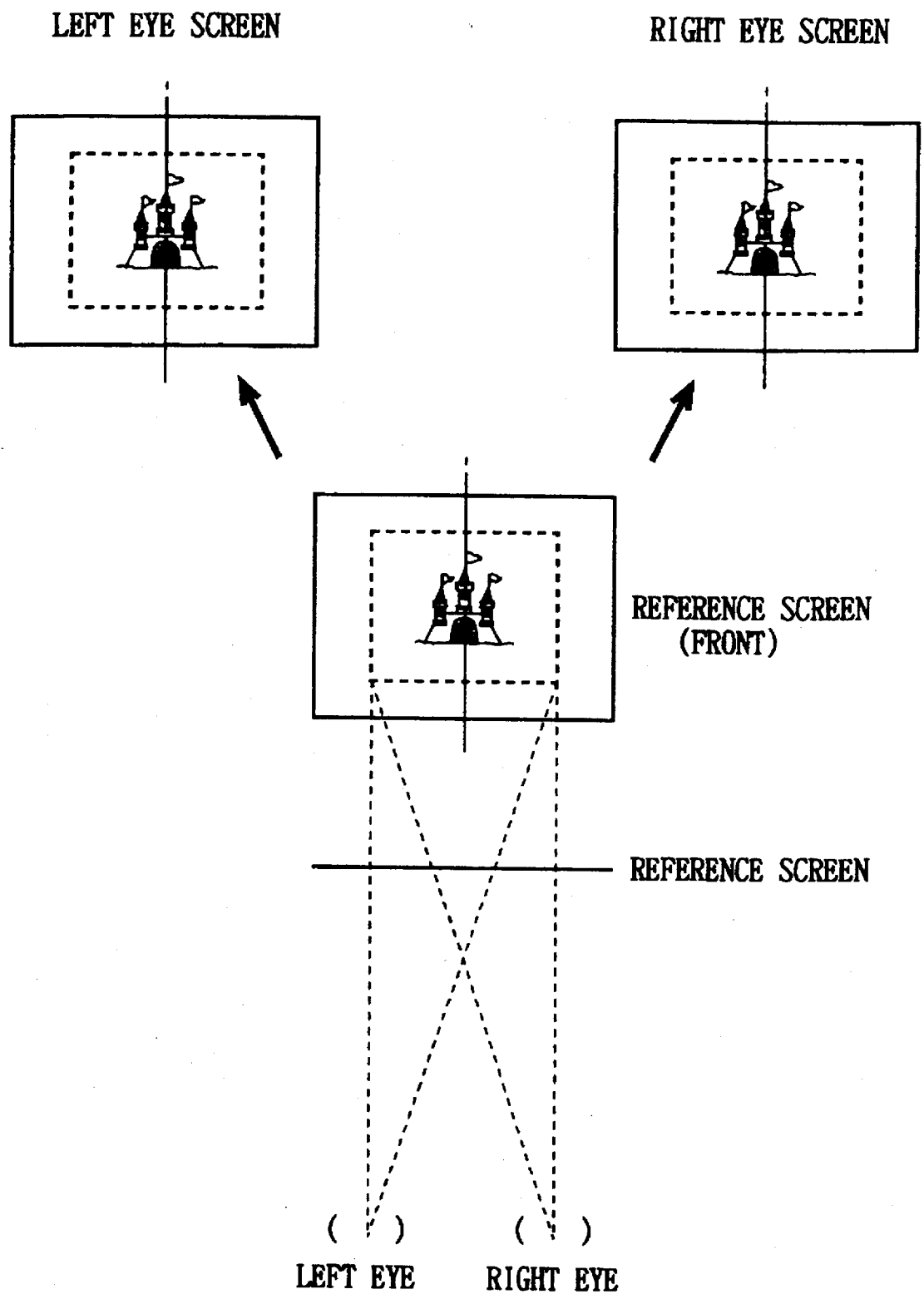
FIG. 24 is a diagram showing a BG displayed on the left and right screens when parallax on the screen is 0.
Figure 25:
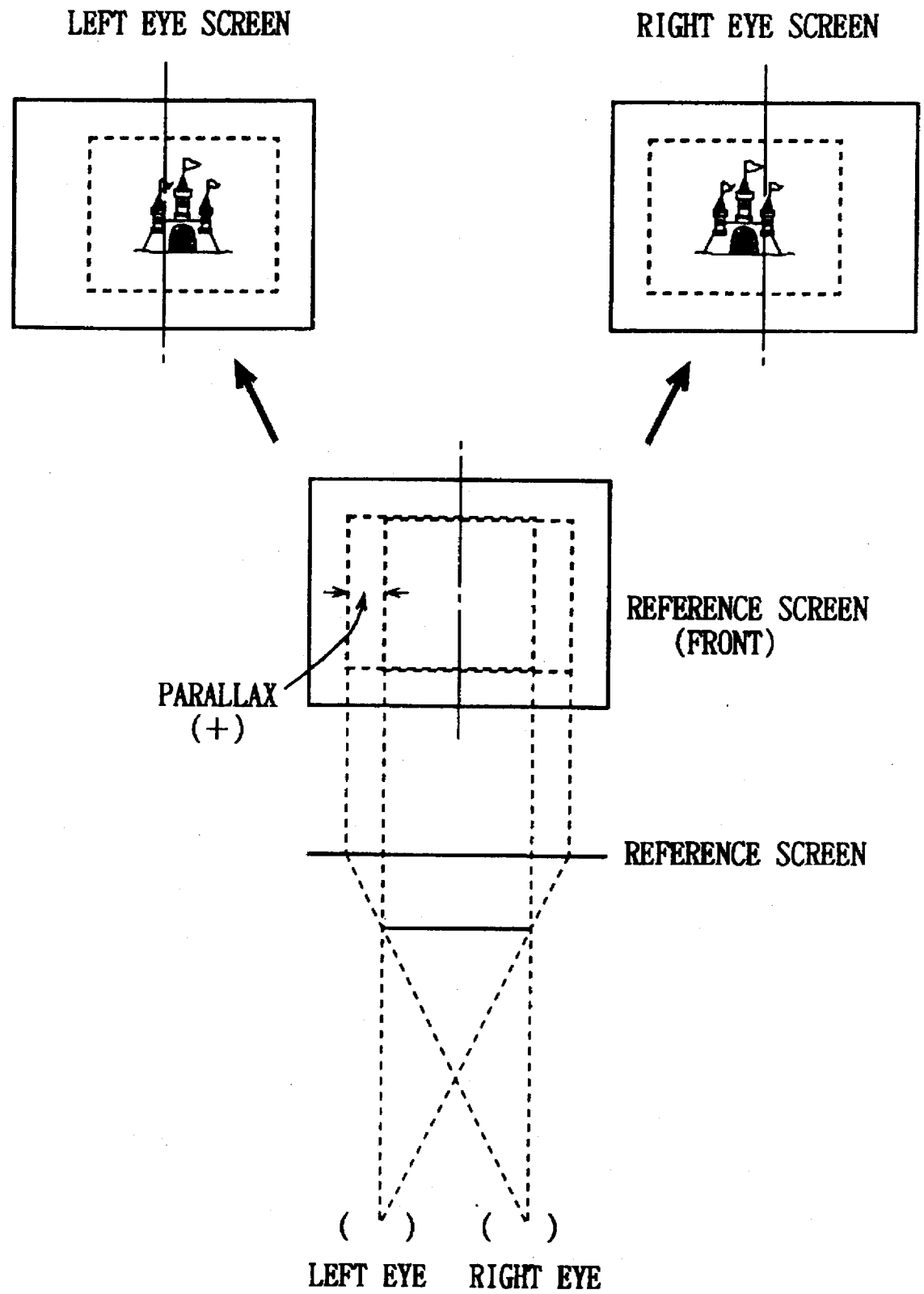
FIG. 25 is a diagram showing a BG displayed on the left and right screens when parallax on the screen is −.
Figure 26:
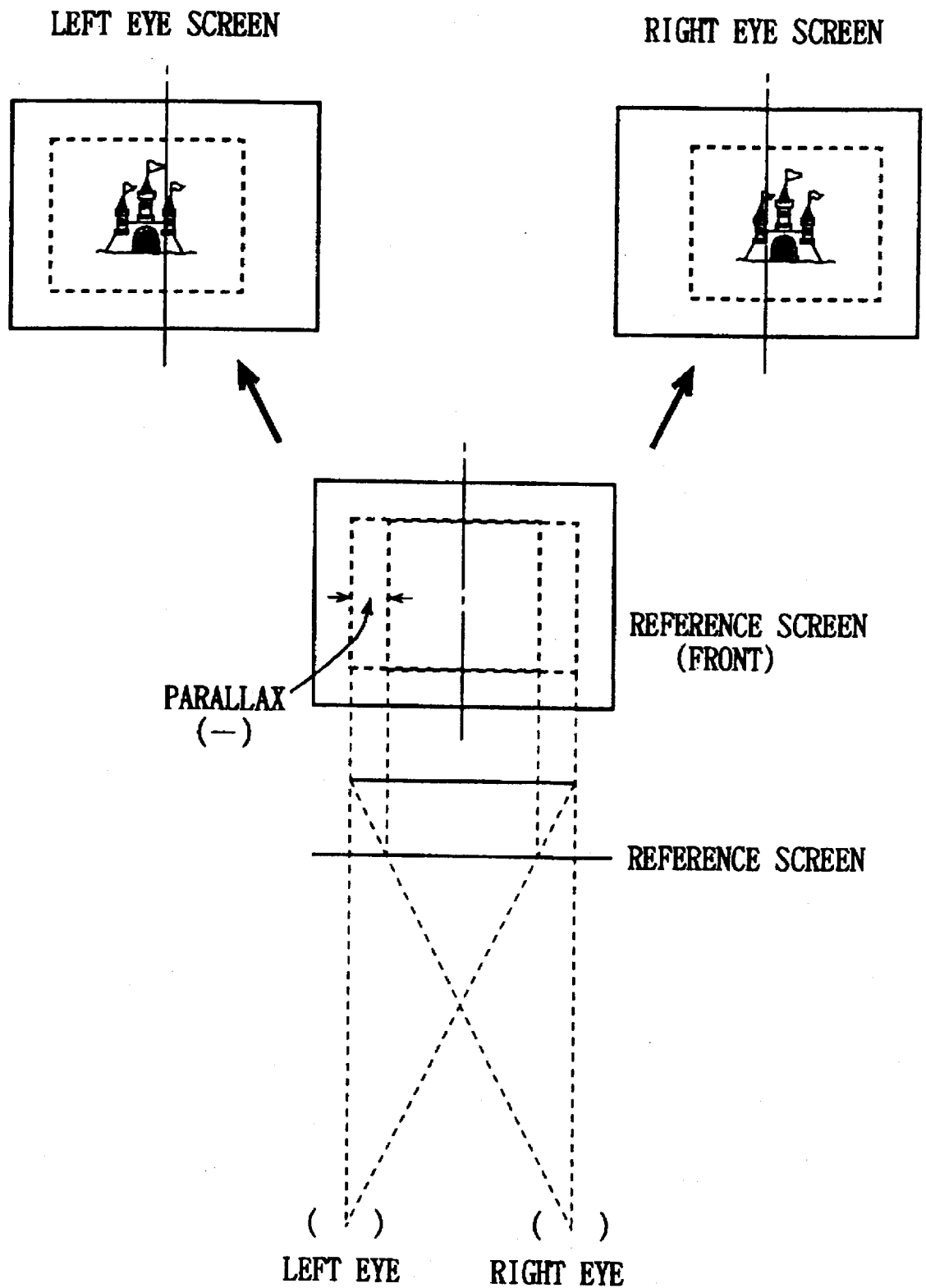
FIG. 26 is a diagram showing a BG displayed on the left and right screens when parallax on the screen is +.

Describing the relation between the quantity of parallax and the perspective in more detail, if the quantity of parallax is 0, a player will feel as if the OBJ exists on the reference screen, as shown in FIG. 24. If the quantity of parallax is positive, the player will feel as if the OBJ exists closer than the reference screen, as shown in FIG. 25. If the quantity of parallax is negative, the player will feel as if the OBJ exists deeper than the reference screen, as shown in FIG. 26. Accordingly, when displaying a close-range view, the parallax quantity (the amount of shift of left and right images) is made positive and the parallax quantity is increased. When displaying a distant view, the parallax quantity is made negative and the parallax quantity is decreased.

Next, the method of providing parallax for the BG will be described. In this embodiment, two kinds of parallax providing methods are used for the BG.

The first method of providing parallax to BG is the parallax providing method the same as that for the OBJ. That is to say, a picture cut out from an BG map is shifted by a distance corresponding to the quantity of parallax GP (refer to FIG. 17) in the opposite directions along the X axis (horizontal) and displayed on both screens, thereby providing the parallax.

The second parallax providing method for the BG is made according to an idea reverse to the first parallax providing method. That is to say, left and right pictures are cut out from a BG map while being shifted by a distance corresponding to the quantity of parallax MP in the opposite directions along the X axis and the cut out two pictures are displayed at the same positions on the left and right screens, thereby to provide parallax. (Refer to FIG. 27) In this case, the quantity of parallax GP on the screen may be set to 0. This second method of providing parallax is used to display a distant object seen through a window, for example. As shown in FIG. 27, the left eye and the right eye will see different areas when seeing a distant scene through a window. This second method of providing parallax is effective when the distant object seen through the window is larger than the size of the window frame, however, and the first method of shifting coordinates on the display side may be used when the displayed object is smaller than the size of the window frame. The second method of providing parallax is also effective when cutting out of a BG map and displaying a BG image with full size (384×224 dots) because the four ends of the display screen can be regarded as a window.

Figure 28:
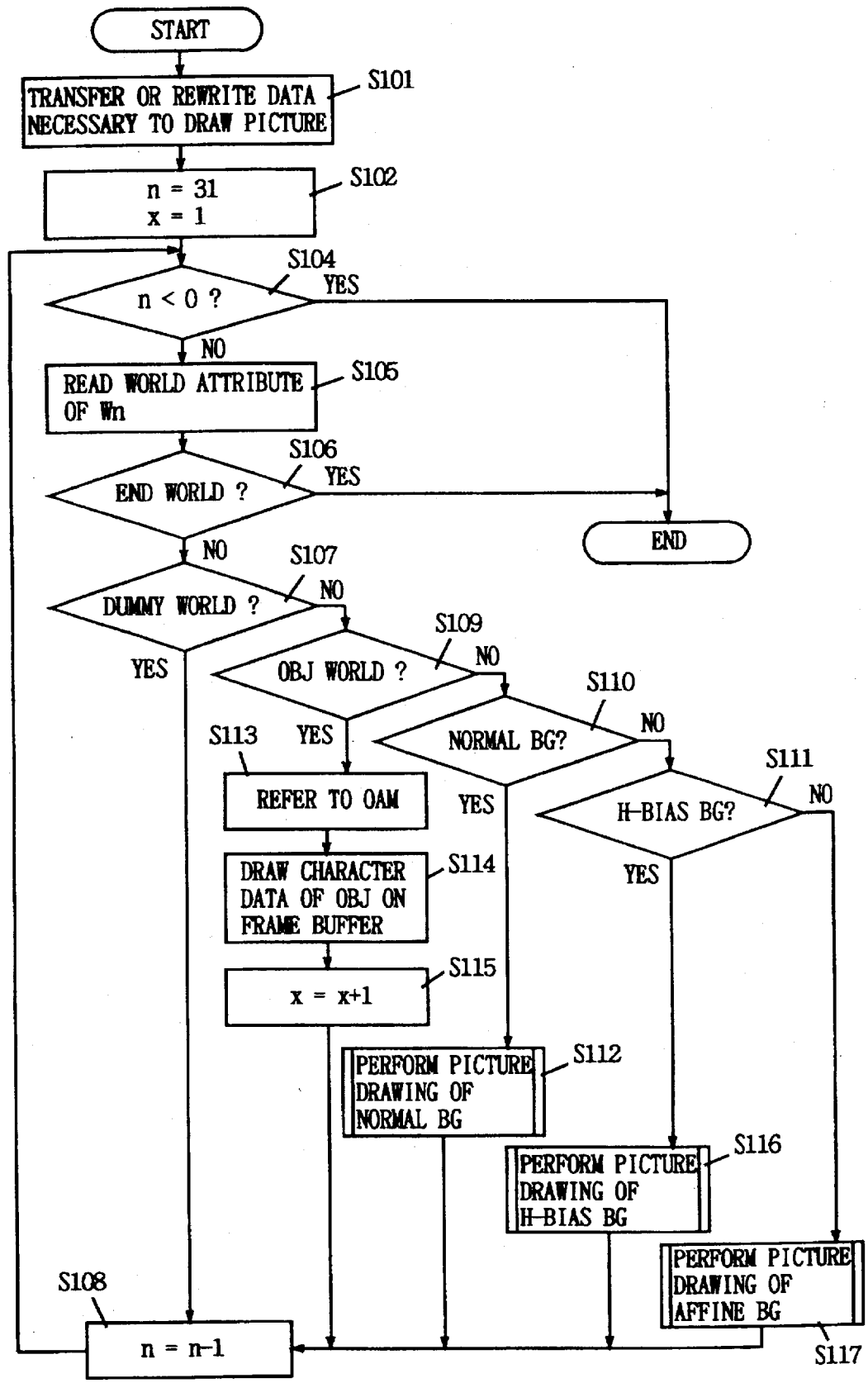
FIG. 28 is a flow chart showing the picture drawing operation in the embodiment of the present invention.
Figure 29:
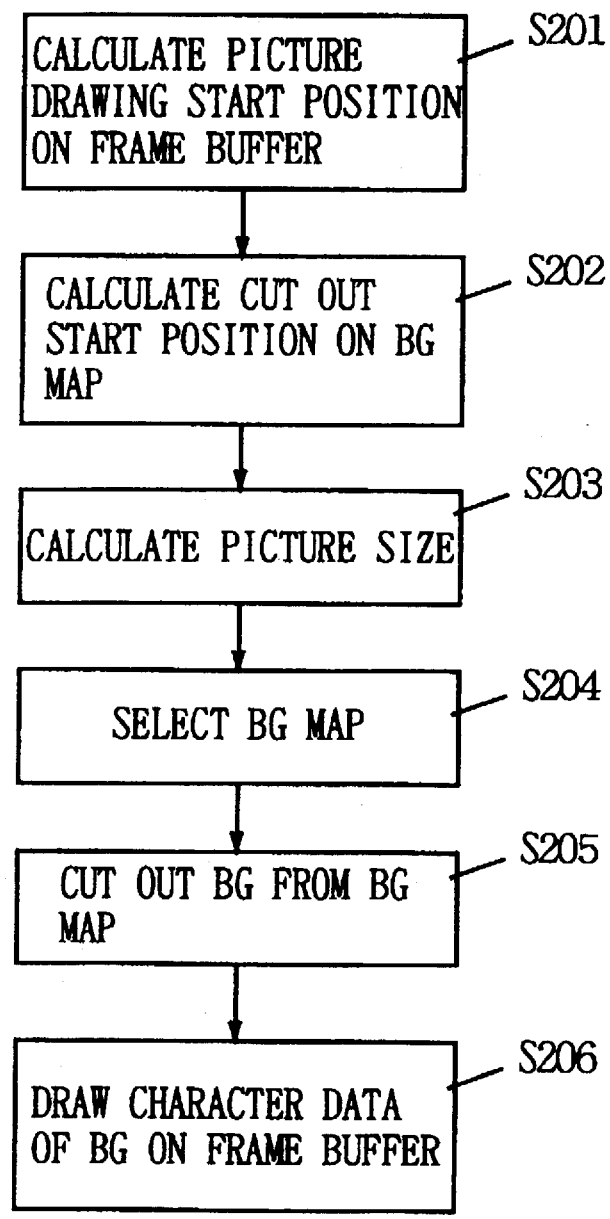
FIG. 29 is a flow chart showing details in the subroutine step S112 in FIG. 28.
Figure 30:
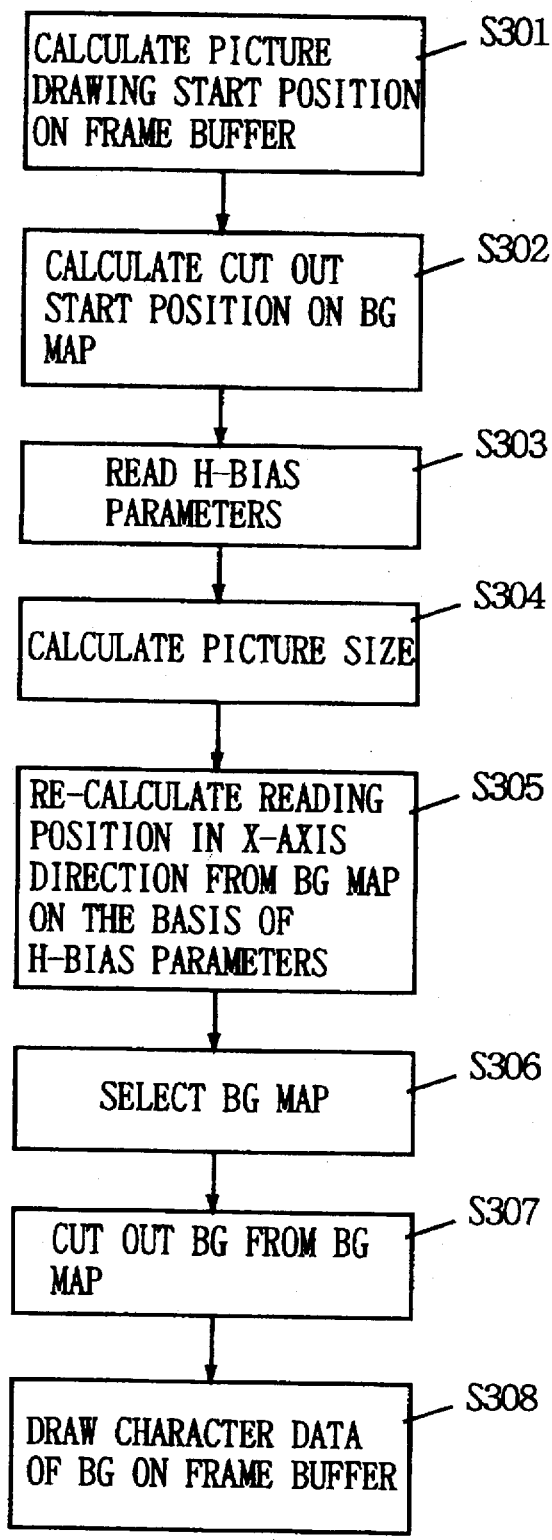
FIG. 30 is a flow chart showing details in the subroutine step S116 in FIG. 28.
Figure 31:
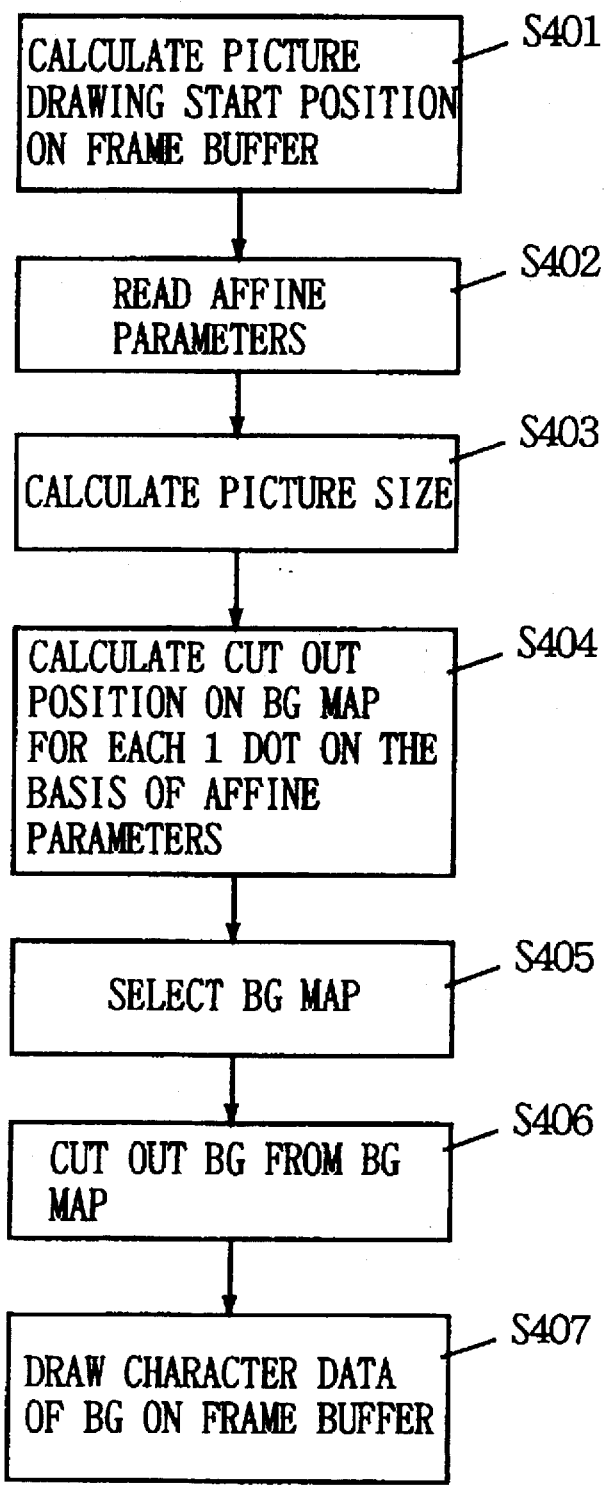
FIG. 31 is a flow chart showing details in the subroutine step S117 in FIG. 28.

Furthermore, the parallax may be provided using both the first parallax providing method and the second parallax providing method. Such a parallax providing method is used to display a distant object seen through a window and display also the window itself on the nearer or deeper side, for example, FIG. 28 is a flow chart showing picture drawing operation in this embodiment. FIGS. 29–31 are flow charts showing details of respective subroutine steps in FIG. 28. Referring to FIG. 28 to FIG. 31, the picture drawing operation performed in the image/sound processing device 22 of this embodiment will now be described.

First, the CPU 221 transfers or rewrites data necessary for picture drawing. (Step S101) That is to say, the CPU 221 refers to the memory 41 in the program cartridge 4 when the power-supply is turned on or when stages or scenes are switched where the displayed contents considerably change to transfer required BG maps, world attributes, H-bias parameters, affine parameters, etc. to the image work memory 225 and transfer required character data etc. to the image memory 224. When the displayed contents do not considerably change from the preceding image, the CPU 221 rewrites the world attributes, the OBJ attributes, the H-bias parameters, the affine parameters, etc. stored in the image work memory 225 according to the game program stored in the memory 41.

Next, the image processing IC 223 sets 31 in a counter n and sets 1 in a counter x. (Step S102) The counter n is a counter for counting numbers of worlds subject to the processing, which is configured to be able to count negative values. The counter x is a counter for counting the order of OBJ worlds subject to the processing. Next, the image processing IC 223 determines whether the counted value of the counter n is smaller than 0 or not. If the counted value of the counter n is 0 or above, the image processing IC 223 reads world attributes of a world Wn corresponding to the counted value of the counter n from the image work memory 225 (Step S105).

Next, the image processing IC 223 determines whether the world subject to processing this time is an end world or not (Step S106). This determination is made on the basis of the attribute information END (refer to FIG. 17) included in the world attributes. If the world Wn is not an end world, the image processing IC 223 makes a determination as to whether that world Wn is a dummy world (world where no display is made; LON=0, RON=0) or not (Step S107). If the world Wn is a dummy world, the image processing IC 223 reduces the counted value of the counter n by 1 (Step S108) and returns to the operation in the Step S104. If the world Wn is not an end world nor a dummy world, the image processing IC 223 determines whether that world Wn is an OBJ world, a normal BG world, or an H-bias BG world (Steps S109–S111). This determination is made on the basis of the attribute information BGM included in the world attributes.

First, processing when the world Wn is a normal BG world will be described. In this case, the image processing IC 223 performs picture drawing work of a normal BG on the basis of the various kinds of attribute information set in the world attributes (Step S112). Details in this subroutine processing in this Step S112 are shown in FIG. 29. FIG. 18 schematically shows the principle of this picture drawing work. Referring to FIG. 29 and FIG. 18, the image processing IC 223 calculates positions for starting picture drawing on the left and right frame buffers (refer to FIG. 9) on the basis of the attribute information GX, GY, GP (the X coordinate position, the Y coordinate position, the quantity of parallax on the display coordinate system of BG) set in the world attributes (Step S201), Next, the image processing IC 223 calculates a position for starting cutting out the BG from the BG map on the basis of the attribute information MX, MY, MP (the X-coordinate position, the Y-coordinate position and the quantity of parallax on the source coordinate system of BG) set in the world attributes (Step S202). Next, the image processing IC 223 calculates a cut-out size of the BG from the BG map on the basis of the attribute information W, H (the dot size in the X-axis direction and the dot size in the Y-axis direction on the source coordinate system of BG) set in the world attributes (Step S203). Next, the image processing IC 223 selects a necessary BG map from a plurality of BG maps in the BGMM 2251 (refer to FIG. 8) on the basis of the attribute information BGMAP__BASE set in the world attributes (Step S204). Next, the image processing IC 223 cuts out BG data (a character number in this stage) from a predetermined area (an area obtained by the calculations in Steps S202, S203) on the selected BG map (Step S205). Next, the image processing IC 223 reads the character data corresponding to the cut out character number from the character RAM 2246 (refer to FIG. 9) and draws picture in a predetermined area (the area with the picture drawing starting position calculated in Step S201) on the frame buffers 2241, 2243 (or 2242, 2244) (Step S206).

Next, a description is made on the processing when the world Wn is an OBJ world. In this case, the image processing IC 223 refers to OBJ attributes in a group corresponding to the counted value of the counter x in the OAM 2253 (refer to FIG. 8) (Step S113; refer to FIG. 14). Next, the image processing IC 223 reads corresponding character data from the character RAM 2246 on the basis of the character number JCA set in the referred OBJ attributes (refer to FIG. 15) and draws the read character data in a predetermined area (an area with the picture drawing starting position defined with JX, JY, JP) on the frame buffers 2241, 2243 (or 2242, 2244) (Step S114). Next, the image processing IC 223 adds 1 to the counted value of the counter x (Step S115).

Next, processing in the case where the world Wn is an H-bias BG world will be described. In this case, the image processing IC 223 performs picture drawing processing of the H-bias BG on the basis of the attribute information set in the world attributes and the H-bias parameters stored in the area 2255 in the image work memory 225 (Step S116). Details of the subroutine processing of this Step S116 are shown in FIG. 30. Referring to FIG. 30, the image processing IC 223 calculates picture drawing staring positions on the left and right frame buffers (refer to FIG. 9) on the basis of the attribute information GX, GY, GP set in the world attributes (Step S301). Next, the image processing IC 223 calculates the cut-out starting position of the BG from the BG map on the basis of the attribute information MX, MY, MP set in the world attributes (Step S302). Next, the image processing IC 223 reads necessary H-bias parameters from the area 2255 in the image work memory 225 on the basis of the attribute information PARAM_BASE set in the world attributes (Step S303). Next, the image processing IC 223 calculates a cut-out size of the BG from the BG map on the basis of the attribute information W, H set in the world attributes (Step S304).

Next, the image processing IC 223 re-calculates a read position in the X-axis direction from the BG map on the basis of the H-bias parameters read in Step S303 (Step S305). Here, if the X coordinates referred to when actually reading the source data of the BG map are taken as BGXL, BGXR, the H-bias parameters for the left screen are taken as HOFSTL and the H-bias parameters for the right screen are taken as HOFSTR, then the calculating processing of $$BGXL = MX - MP + HOFSTL$$

$$BGXR = MX + MP + HOFSTR$$

are performed in Step S305. The H-bias parameters HOFSTL and HOFSTR are 16-bit integers with signs (−512 to 511) indicating the quantity of offset in the X-axis direction. In this embodiment, as offset in each transverse line is possible, it is necessary to have the H-bias parameters for the lines in the horizontal direction of the BG. For example, when opening a full size BG, a parameter table as large as 224×2=448 words must be set in the area of the image work memory 225.

Next, the image processing IC 223 selects a required BG map from the plurality of BG maps in the BGMM 2251 (refer to FIG. 8) on the basis of the attribute information BGMAP_BASE set in the world attributes (Step S306). Next, the image processing IC 223 cuts out BG data (a character number in this stage) from a certain area (the area obtained by the calculations in the Steps S302, S304, S305) on the selected BG map (Step S307). At this time, the BG data are read from a position shifted from an original read position in the X-axis direction (MX±MP) by the values of HOFSTL, HOFSTR. Next, the image processing IC 223 reads character data corresponding to the cut out character number from the character RAM 2246 (refer to FIG. 9) and performs picture drawing processing in a certain area (an area with a picture drawing starting position calculated in the Step S301) on the frame buffers 2241 and 2243 (or 2242, 2244) (Step S308).

Next, processing in the case in which the world Wn is not an OBJ world, a normal BG world, nor an H-bias BG world, i.e. when it is an affine BG world will be described. In this case, the image processing IC 223 performs picture drawing work of the affine BG on the basis of the various kinds of attribute information set in the world attributes and the affine parameters stored in the area 225 of the image work memory 225 (Step S117). Details in a subroutine processing in this step S117 are shown in FIG. 31. Referring to FIG. 31, the image processing IC 223 calculates picture drawing starting positions on the left and right frame buffers on the basis of the attribute information GX, GY, GP set in the world attributes (Step S401). Next, the image processing IC 223 reads required affine parameters from the area 2255 of the image work memory 225 on the basis of the attribute information PARAM_BASE set in the world attributes (Step S402). Next, the image processing IC 223 calculates the display size of the BG from the BG map on the basis of the attribute information W, H set in the world attributes (Step S403). Next, the image processing IC 223 calculates a cut-out position on the BG map for each one dot on the basis of the read affine parameters (Step S404). Accordingly, the attribute information MX, MY, MP in the world attributes are not used in this affine BG picture drawing mode.

Next, the image processing IC 223 selects a required BG map from the plurality of BG maps in the BGMM 2251 on the basis of the attribute information BGMAP_BASE set in the world attributes (Step S405). Next, the image processing IC 223 cuts out BG data (a character number in this stage) from a certain area (the area obtained by the calculation in Step S404) on the selected BG map (Step S406). Next, the image processing IC 223 reads the character data corresponding to the cut out character number and draws picture in a certain area (the area determined in Step S403, with the picture drawing starting position calculated in Step S401) on the frame buffers 2241, 2243 (or 2242, 2244) (Step S407).

The character data is alternately drawn to the two sets of frame buffers (the set of 2241, 2243 and the set of 2242, 2244). While the character data is drawn to one set, the display image data stored in the other set is read, and provided to the LED units 212L and 212R through the SAM 2247 and displayed.

As has been stated hereinabove, this embodiment is directed to a dual scanner system (a system which is seen with both eyes), wherein one-dimensional LED arrays 214L, 214R (with LEDs arranged in a vertical column for 224 dots, respectively) are made to emit light at appropriate timing in synchronization with vibration of the mirrors 217L, 217R, which is seen by a player through the mirrors 217L, 217R. Thus, the player sees as if a piece of screen were formed on each side due to the after image effect of the eyes. To make the game stereoscopic, different images with parallax (images with different data on the left and the right) must be displayed on the left and right display systems. However, it is difficult from the point of processing ability to simultaneously transfer different image data to the display systems on both sides with a single image processing IC 223. Also, if different images are displayed at the same time on the left and right display systems, the peak consumption power increases to increase the maximum power consumption. Accordingly, in this embodiment, considering reduction of load on the image processing IC, distribution of the peak power consumption, etc.,the display periods on the left and right display systems are shifted from each other so that they do not overlap.

Figure 32:
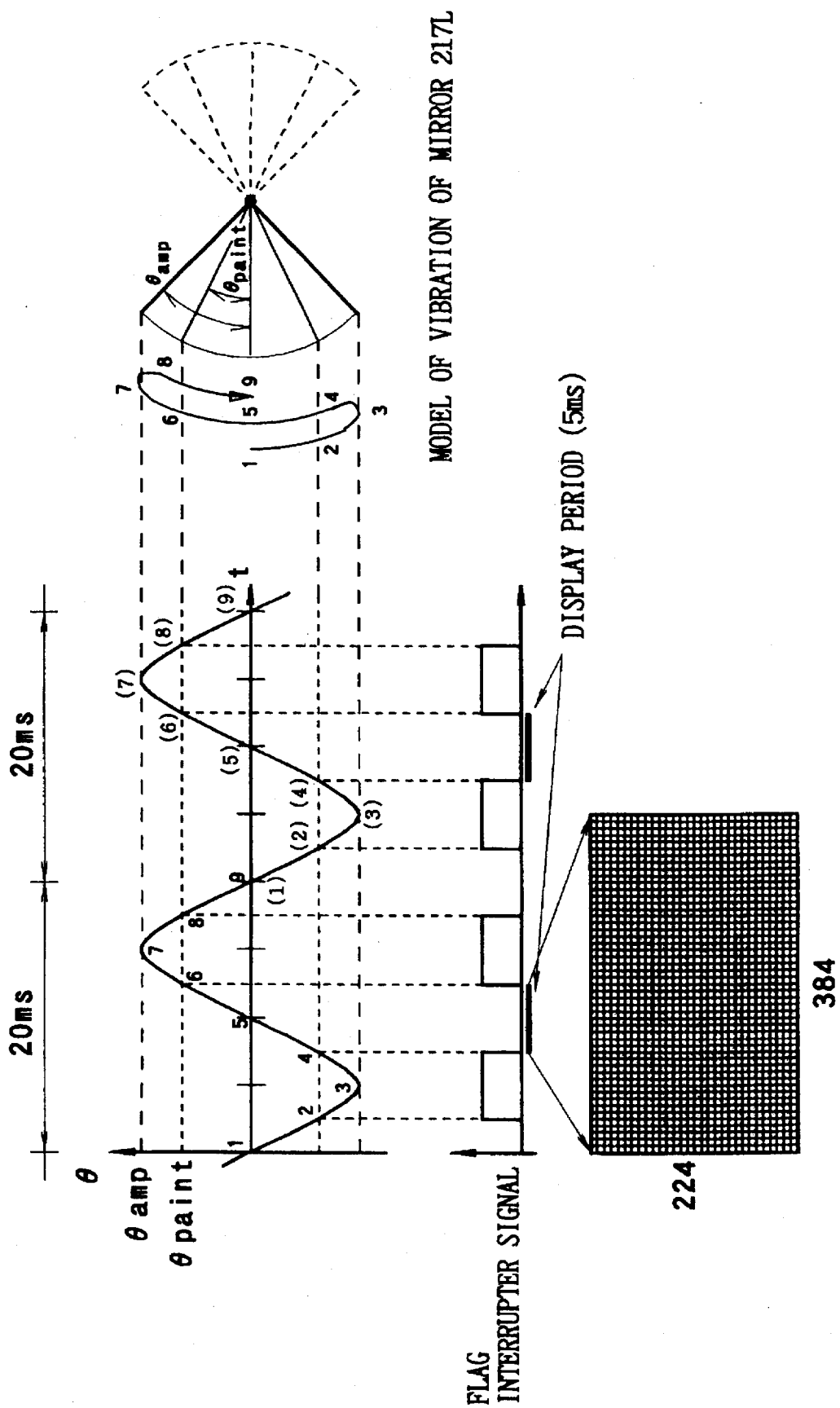
FIG. 32 is a diagram showing the relation between the vibration phase of the mirror and the display timing in the display system on the left side.
Figure 33:
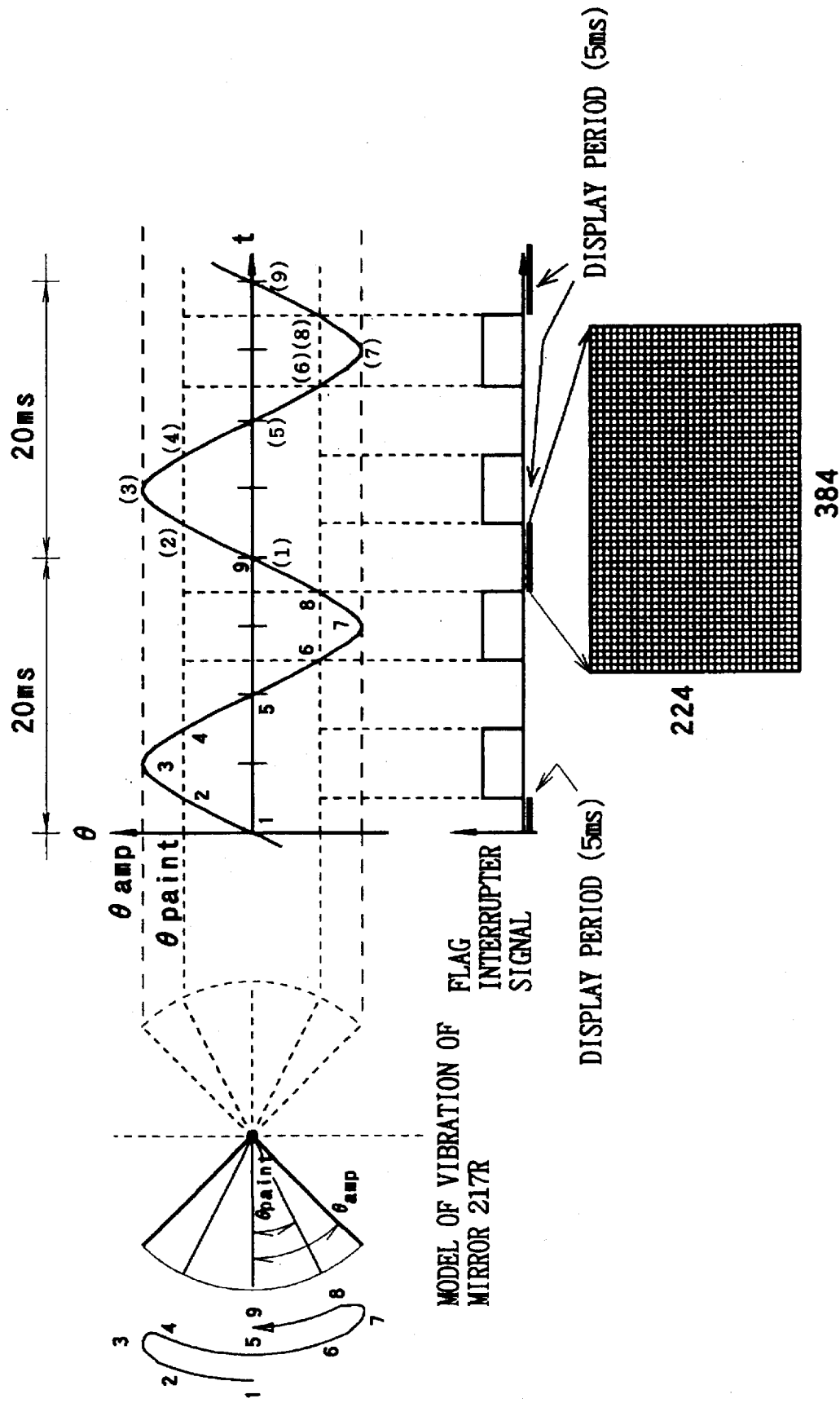
FIG. 33 is a diagram showing the relation between the vibration phase of the mirror and the display timing in the display system on the right side.

FIG. 32 and FIG. 33 show the relation between the vibration phase of the mirror and the display timing in the left and right display systems, respectively. If the vibration frequency of each mirror 217L and 217R is 50 Hz (one period is 20 ms), the abscissa shows a time and the ordinate shows the vibration angle, movements of the mirrors 217L and 217R are sine-wave vibrations shown in FIG. 32 and FIG. 33, respectively. The left and right mirrors vibrate in synchronization with each other, but their phases are shifted by 180° so that the left and right image display periods will not overlap. If one period 20 ms is equally divided into eight, the movement of the mirrors and the sine wave correspond as the numbers 1 to 9 in FIG. 32 and FIG. 33. When it vibrates repeating the movement from 1 to 9, the angular velocity of the mirror is not constant. However, when it moves from 4 to 6, or 8 to (2), the angular velocity is relatively stable. Display by the LED array is made in the period from 4 to 6 in the left display system, and in the period from 8 to (2) in the right display system to lessen distortion in the vicinity of left and right ends of the screen. The display period corresponds to ¼ of the period, which is about 5 ms. The number of dots of the LED array is 224. As the LED arrays 214L and 214R light 384 times with appropriate timing in the above display period, screens with transverse 384×vertical 224=86016 dots are formed in the left and right display systems. The screen is called an image screen.

Figure 34:
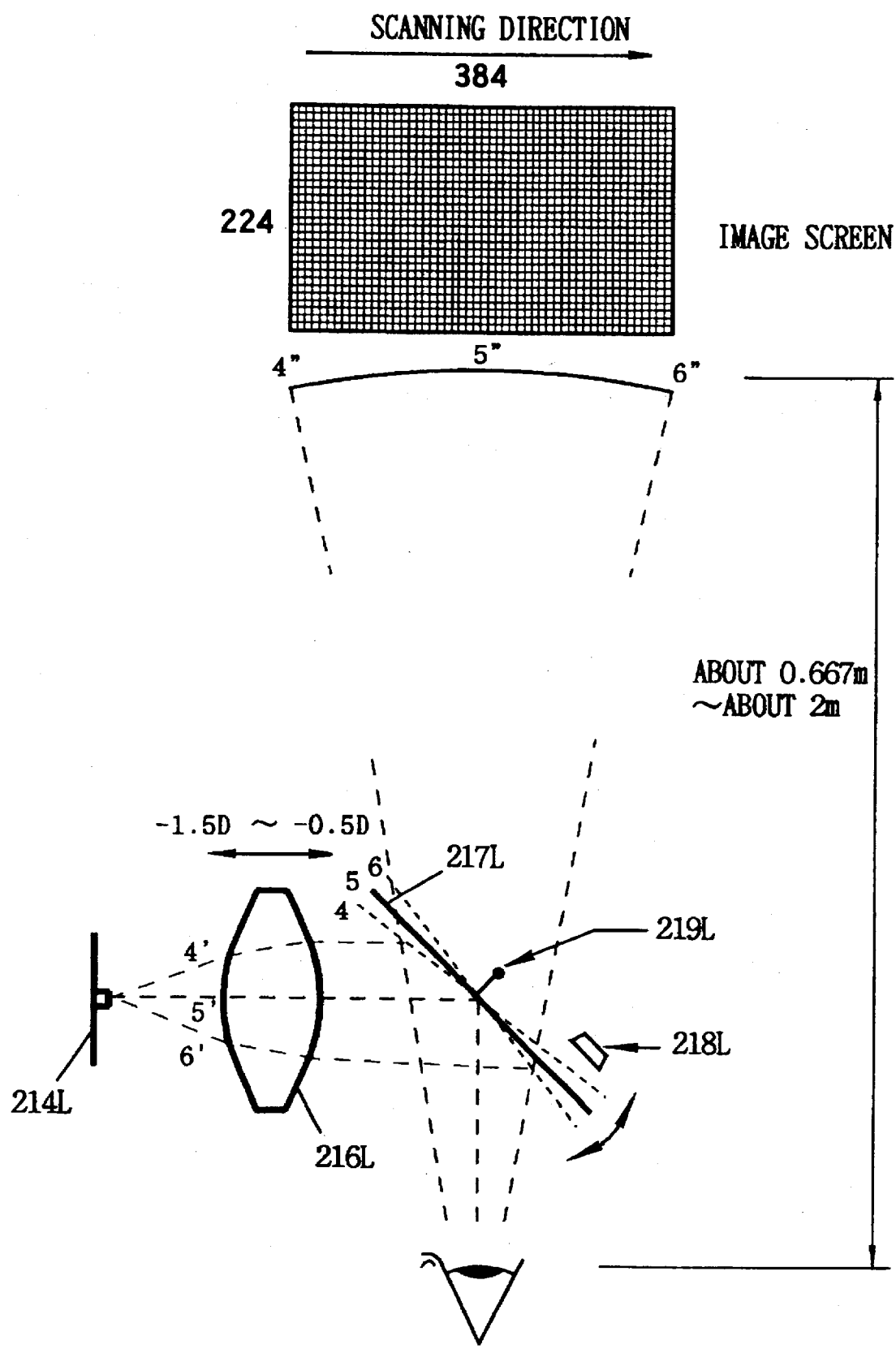
FIG. 34 is a diagram showing a position where the image screen is projected in the display system on the left side.

FIG. 34 shows a position where the image screen is projected in the left display system by way of example. In FIG. 34, numbers 4, 5 and 6 correspond to the position members in FIG. 32. The LED array 214L is turned on when the angular velocity of the mirror 217L is relatively stable, as stated above, so that the image screen will be scanned while the mirror 217L moves form 4 to 6. When the position of the mirror 217L is at 4, the light of the LED array 214L passes through the lens 216L at the position of 4' and draws an image screen at the position of 4". It is the same when the mirror 217L moves to the positions 5, 6, and it draws the image screen at 5", 6". Accordingly, the direction of scanning the screen is from the left to the right. Since human visibility (so called visual acuity) individually differs, it is necessary to move the lens 216L to focus upon the screen. This is referred to as visibility adjustment. Some kinds of positions of the lens for visibility adjustment are prepared. For example, if the lens 216L is moved to the position −1D, the image screen is seen about one meter distant. Although FIG. 34 shows the display system on the left side, it is the same in the display system on the right side, and the scanning direction of the screen is also from the left to the right.

Figure 35:
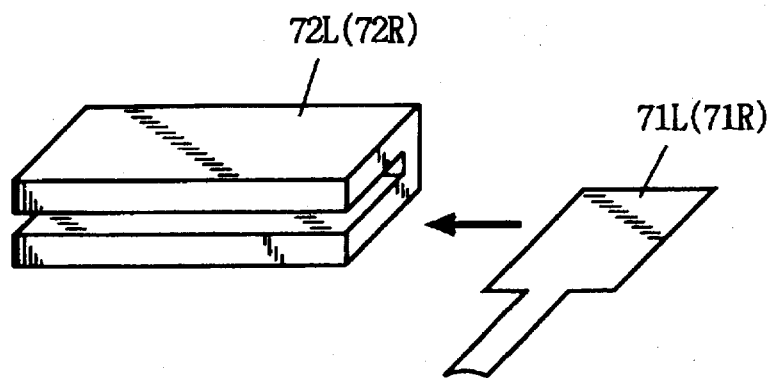
FIG. 35 is a diagram showing a photointerrupter and a flag.

The mirrors 217L, 217R are vibrated by the motor drive/ sensor circuits 215L, 215R, respectively. The periods, amplitudes, phase, offset, etc. of the vibration of the mirrors can be detected with signal output from the motor drive/ sensor circuits 215L and 215R. This signal is called a flag signal, which is generated by a flag 71L (or 71R) passing through a photointerrupter 72L (or 72R), as shown in FIG. 35. On the basis of the flag signal, the mirror control circuit 211 performs servo control for forming a stable screen (correction, stabilization of vibration of the mirrors) or informs the image processing IC 223 of timing for image display (in FIG. 32, the position of 4 is an image display start timing).

Figure 36:
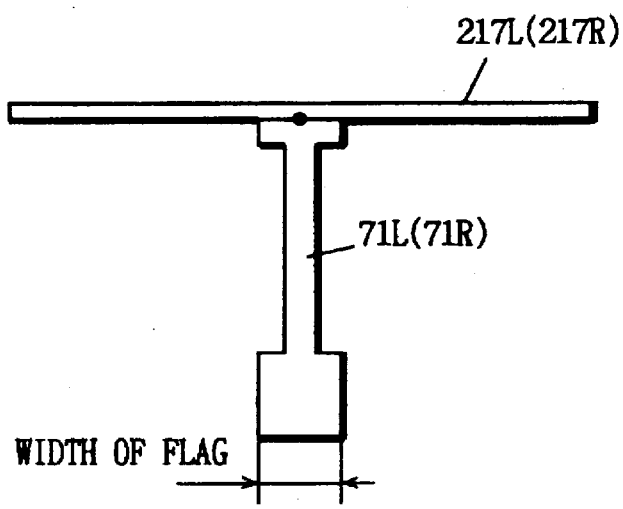
FIG. 36 is a diagram showing the flag attached to the mirror.

As shown in FIG. 36, the flag 71L (or 71R) is a small piece made of resin attached to the mirror 217L (or 217R) for light shielding of the photointerrupter. The width of the flag is selected so that the period in which the flag shields the photointerrupter and the image display period correspond to each other. Thus, the number of vibrations of the mirrors, disorder of the amplitude, offset, phases of the mirrors and the image display start timing can be detected from the output waveform of the photointerrupter.

Figure 37:
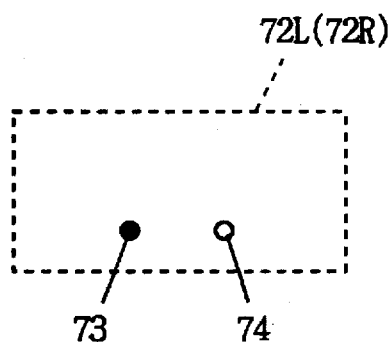
FIG. 37 is a diagram showing two interrupters provided in the photointerrupter.

The photointerrupter 72L (or 72R) has two sets of interrupters 73 and 74 inside, as shown in FIG. 37. Each interrupter includes a set of a light emitting element and a light receiving element disposed to face each other at a certain space, and passage of the flag between the light emitting element and the light receiving element shields the light receiving element and its output falls from a high level to a low level. Detection output of one interrupter (flag interrupter) 73 is used to detect a position of the flag, and detection output of the other interrupter (direction interrupter) 74 is used to detect a direction of movement of the flag. Accordingly, the space between the interrupters 73 and 74 is selected smaller than the width of the flag.

Figure 38:
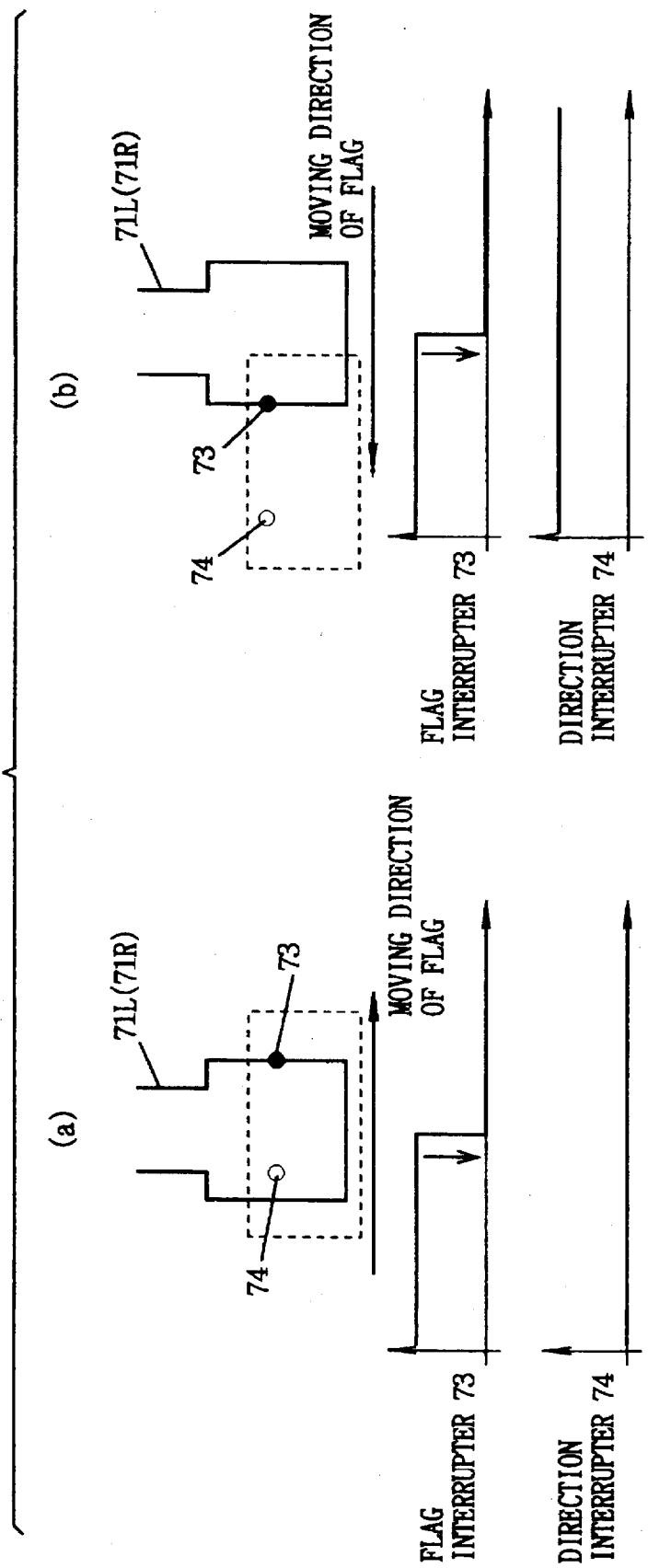
FIG. 38 is a diagram showing the relation between an output state of the photointerrupter and a moving direction of the flag when an output of the flag interrupter falls.
Figure 39:
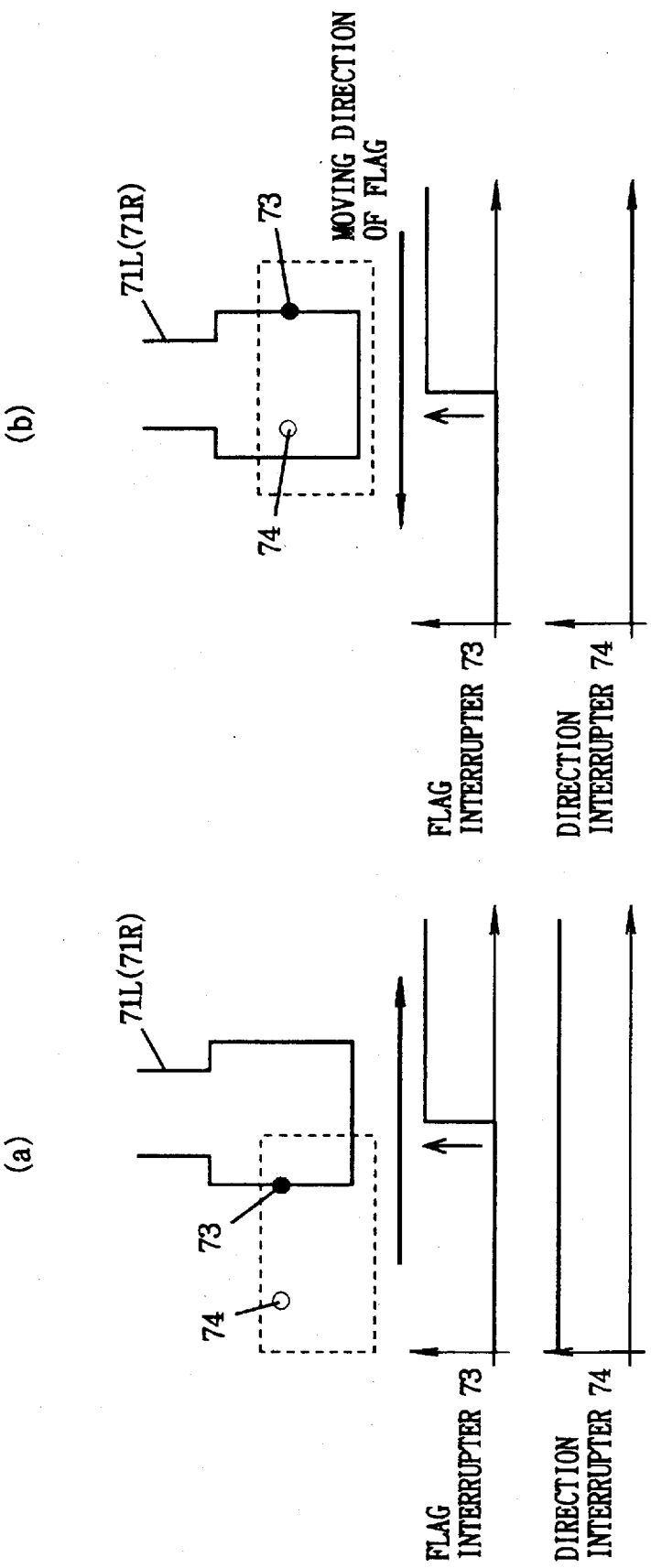
FIG. 39 is a diagram showing the relation between an output state of the photointerrupter and a moving direction of the flag when an output of the flag interrupter rises.

FIG. 38 and FIG. 39 show the relation between the output state of the photointerrupter and the direction of movement of the flag. FIG. 38 shows the direction detection when the output of the flag interrupter 73 falls, and FIG. 39 shows the direction detection when the output of the flag interrupter 73 rises. As shown in FIG. 38(a), if the output of the flag interrupter 73 falls when the output of the direction interrupter 74 is at a low level, it is determined that the moving direction of the flag is from the left to the right. As shown in FIG. 38(b), if the output of the flag interrupter 73 falls when the output of the direction interrupter 74 is at a high level, it its determined that the moving direction of the flag is from the right to the left. Also, as shown in FIG. 39(a), if the output of the flag interrupter 73 rises when the output of the direction interrupter 74 is at a high level, it is determined that the moving direction of the flag is from the left to the right. Further, as shown in FIG. 39(b), if the output of the flag interrupter 73 rises when the output of the direction interrupter 74 is at a low level, it is determined that the moving direction of the flag is from the right to the left.

As described above, screen display is made in a period in which the angular velocity of the mirrors is stable in this embodiment. More strictly, however, the angular velocity of the mirrors (scan speed) is not constant even in this period. Therefore, correction is needed.

Figure 40:
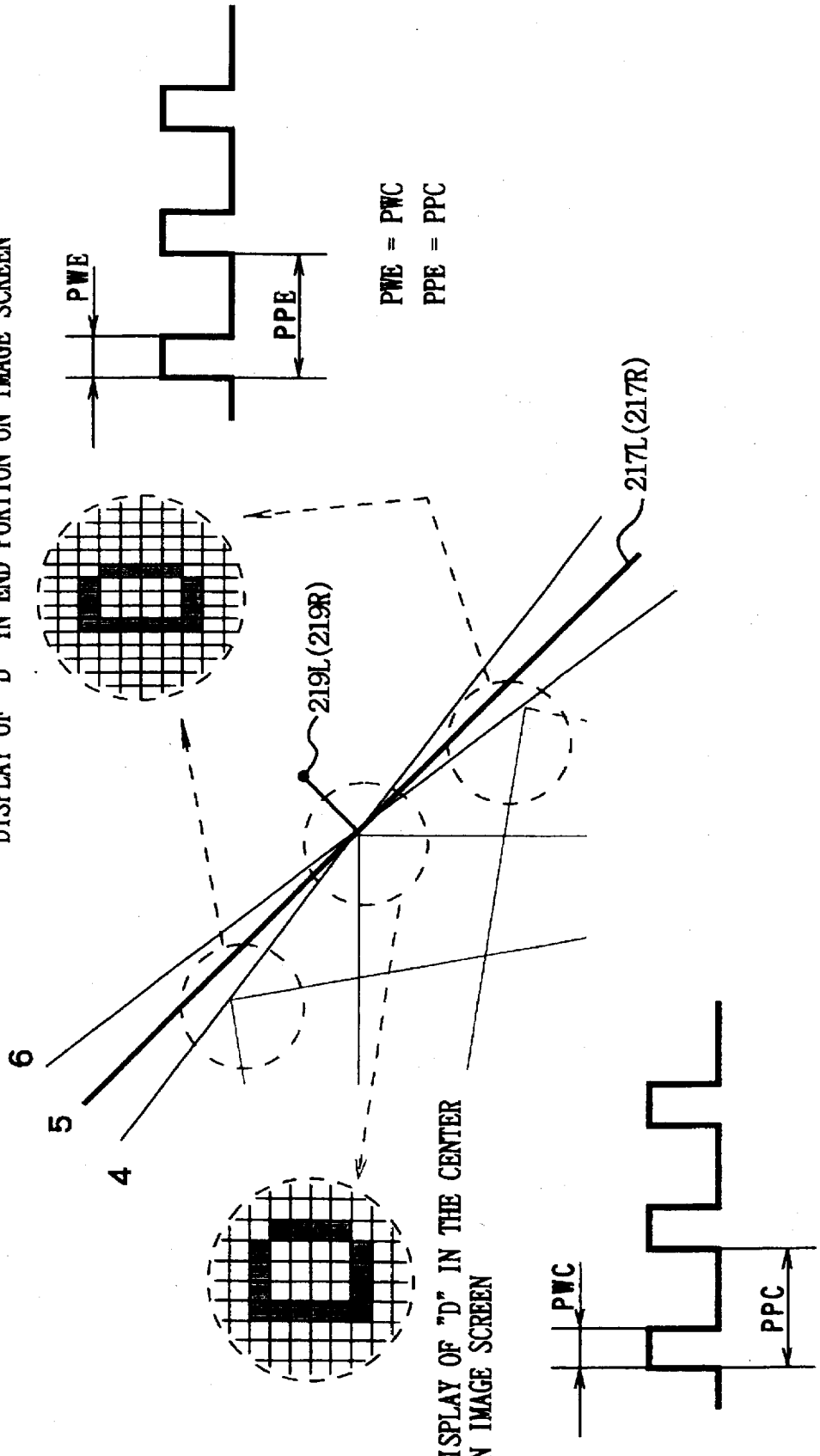
FIG. 40 is a diagram showing a letter "D" displayed in the center and in the end part on the image screen before correction.

A vertical line of the image screen is referred to as a column, and there are 384 columns in total. The column width (a space between vertical lines) on the image screen depends on the timing of lighting the LED. FIG. 40 shows a letter "D" displayed in the center and in an end portion on the image screen. If the timing pitch of lighting the LED array is the same in the center and the end on the image screen, it looks as if it were shrunken in the lateral direction in the end portion or, on the other hand, it looks as if it were elongated in the lateral direction in the center. This is due to the fact that the timing of turning on the LED is made with the same timing pitch, though the angular velocity (scan speed) of the mirror at 5 is faster than the angular velocity (scan speed) at 4, 6. That is to say, in FIG. 40, the timing pitch PPC of lighting the LED array in the center of the image screen is equal to the timing pitch PPE in the end portion.

Figure 41:
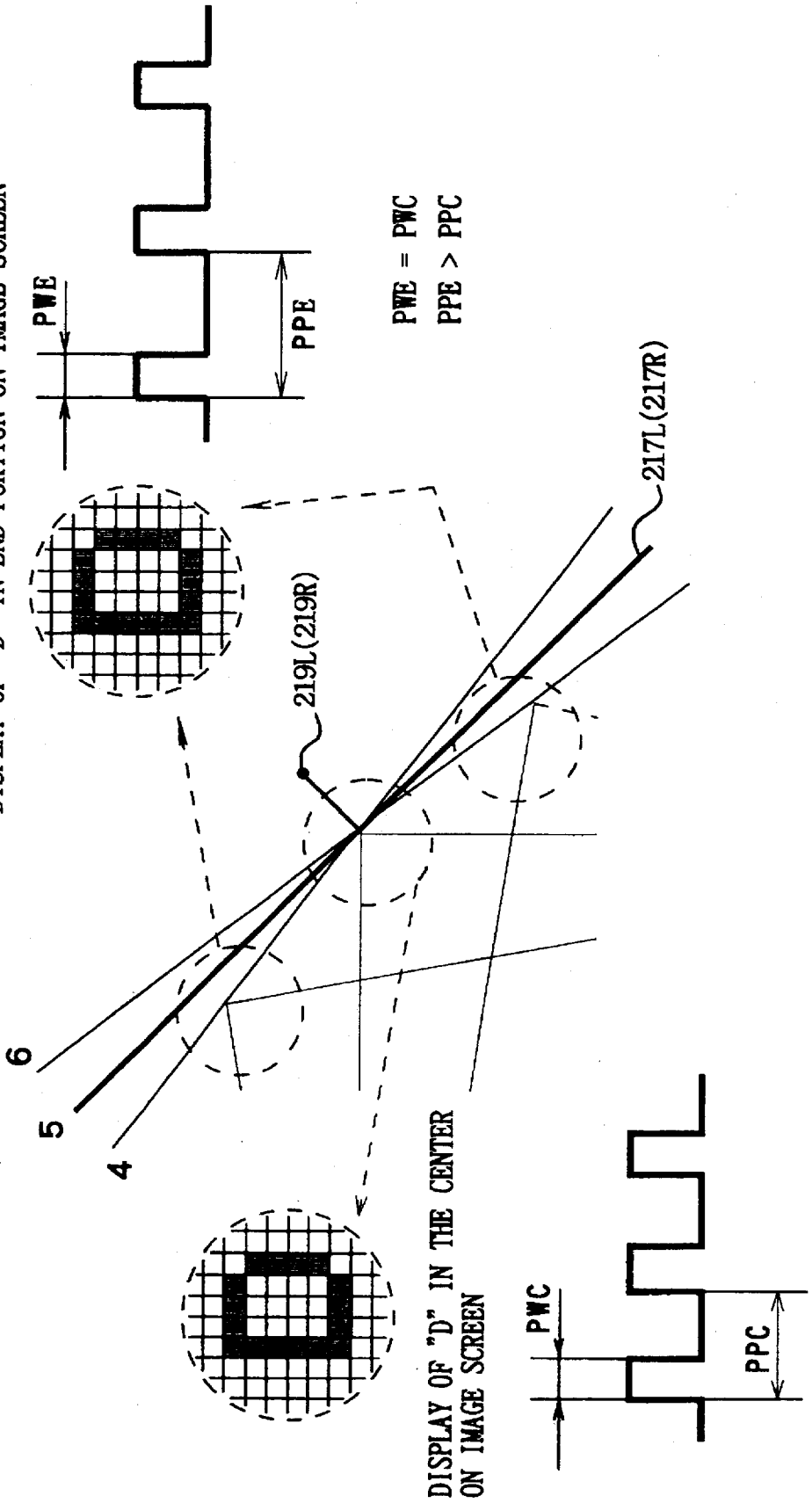
FIG. 41 is a diagram showing a letter "D" displayed in the center and in the end part on the image screen after correction.

It is necessary to change the LED light emitting timing pitch according to the scanning speed to display figures, letters, etc. without distortion with the same column width in the center and in the end portion on the image screen. That is to say, as shown in FIG. 41, correction is needed to make the LED light emitting timing pitch PPC shorter as it is closer to the center of the image screen and to make the timing pitch PPE longer as it gets closer to the end portion. This allows equal scan of widths of respective columns. The LED light emitting pulse width (PWC, PWE) is made constant in the case of the same luminance to make brightness in the end portion and in the center on the image screen uniform.

A table storing timing data for correcting the LED lighting timing pitch is called a column table. This column table is stored in the area 416 of the memory 41 (refer to FIG. 5), which is transferred to the area 2254 in the image work memory 225 in the body device according to the program when the power is turned on. The image processing IC 223 controls the LED lighting timing referring to the column table developed in the image work memory 225. The start address of the column table is transferred as 8-bit serial data from the mirror control circuit 211 which controls movement of the mirrors.

The column table includes extra timing data for about 68 columns ×2, supposing offset of the mirror, or external disorder, as well as the timing data for 384 columns. In this embodiment, the LED lighting timing pitch can be set for every 4 columns. Accordingly, if 4 columns are taken as 1 entry, the number of entries of the column table is 17+96+17=130 (=520 columns).

Figure 42:
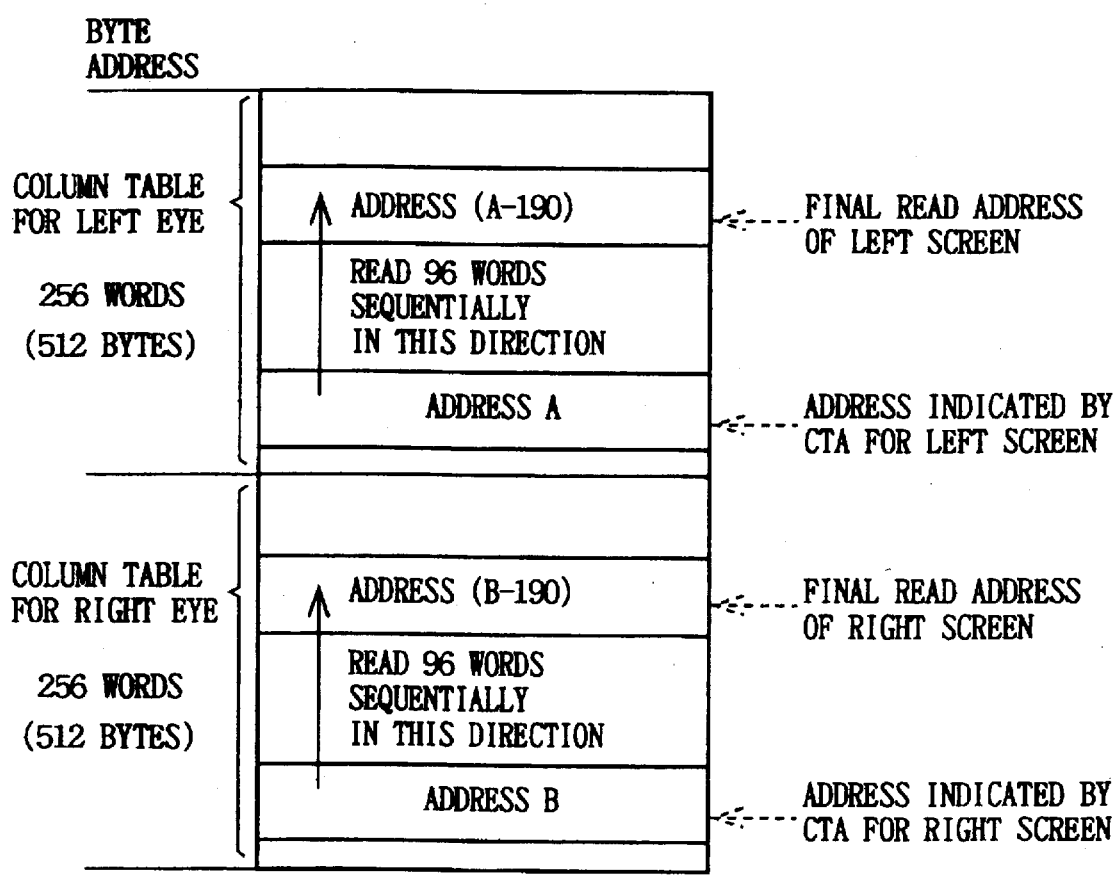
FIG. 42 is a diagram showing arrangement in a column table on the image work memory.

FIG. 42 shows arrangement in the column table on the image work memory 225. As shown in FIG. 42, the column table is allocated on the image work memory 225 as a 512-word data array. The image processing IC 223 receives the column table reference start address CTA from the mirror control circuit 211. This column table reference start address CTA is automatically transferred from the mirror control circuit 211 when display on the left screen is started (when L_SYNC rises) as 8-bit data corresponding to those for the left eye and the right eye. The transferred column table reference start address CTA is set in a register 223a in the image processing IC 223 (refer to FIG. 43). In FIG. 43, the CTA_L is a column table reference start address for the left and the CTA_R is a column table reference start address for the right. The image processing IC 223 reads the timing data COLUMN_LENGTH from a corresponding entry in the column table on the basis of the column table reference start address CTA set in the internal register 223a and sets it in the internal register 223b (refer to FIG. 44). The timing data COLUMN_LENGTH is a numerical value defining one column time with resolution of 200 ns. The reading of the timing data from the column table is made once for 4 columns. It is made 96 (=384/4) times respectively for the left eye and the right eye in one display frame period, 192 times in total.

In FIG. 42, for example, if the timing data is read from the address A in the column table for the left eye (an address indicated by the column table reference start address for the left CTA_L) when starting left screen display, and then, the timing data is read out in the order from addresses (A-2), (A-4), . . . in byte address. As stated above, this reading is made once for 4 column time, 96 (=384/4) times for the left eye and the right eye, respectively, in one display frame period. The final read address for the left screen is the address (A-95×2)=(A-190). Similarly, timing data of the address B - address (B-190) are read from the column table for the right eye.

This embodiment also has a function of special display, such as waving the display screen, by rewriting the timing data in the column table into special data string according to instructions from the game program.

Next, display operation in this embodiment will be described. When the power is turned on into the body device 2 through the controller 6, the CPU 221 activates the game program and transfers the column table stored in the memory 41 of the program cartridge 4 to the area 2254 in the image work memory 225. Now, if the game has already started, the left and right mirrors 217L and 217R are vibrating with the period of 20 ms in synchronization with the synchronous clock FCLK produced from an internal oscillator (not shown) in the mirror control circuit 211. At this time, the flags 71L and 71R pass in the photointerrupters 72L, 72R (refer to FIG. 35) and then 2-bit flag signals are provided from the photointerrupters 72L and 72R to the motor drive/sensor circuits 215L and 215R, respectively. In the 2-bit flag signal, one bit is an output signal of the flag interrupter 73, and the other bit is an output signal of the direction interrupter 74 (refer to FIG. 37). The motor drive/sensor circuits 215L and 215R shape the waveforms of the provided flag signals and then outputs them to the mirror control circuit 211.

The mirror control circuit 211 determines the moving direction of the flag on the basis of a combination of the logic states of the 2 bits included in the flag signal (Refer to FIG. 38 and FIG. 39). Further, considering the result of the determination, the mirror control circuit 211 detects timing of starting a display period of the left screen (refer to FIG. 32) and the timing of starting a display period of the right screen (refer to FIG. 33). At this time, the mirror control circuit 211 raises the left display start signal L_SYNC in response to the detection of the timing of starting the display period of the left screen and raises the right display start signal R_SYNC in response to the detection of the timing of starting the display period of the right screen. The mirror control circuit 211 also generates low order 8-bit data CTA (CTA_L and CTA_R) of the column table reference start address in response to the detection of the timing of starting the display period of the left and right screens.

Figure 45:
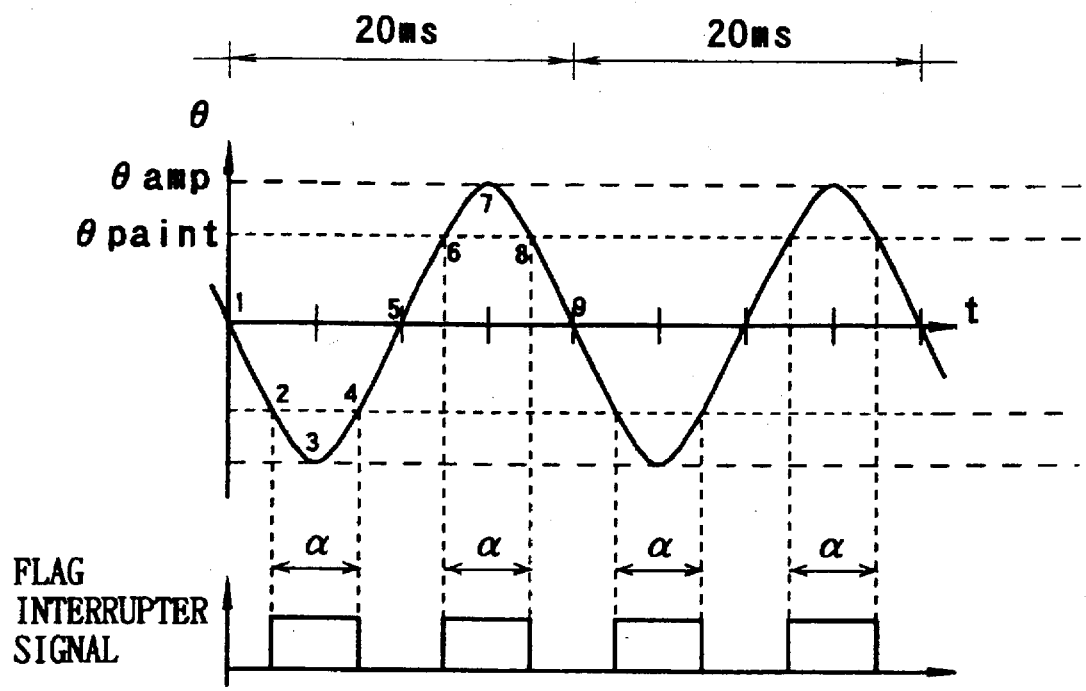
FIG. 45 is a diagram showing the relation between the vibration phase of the mirror and a flag interrupter signal when the mirror has no offset.
Figure 46:
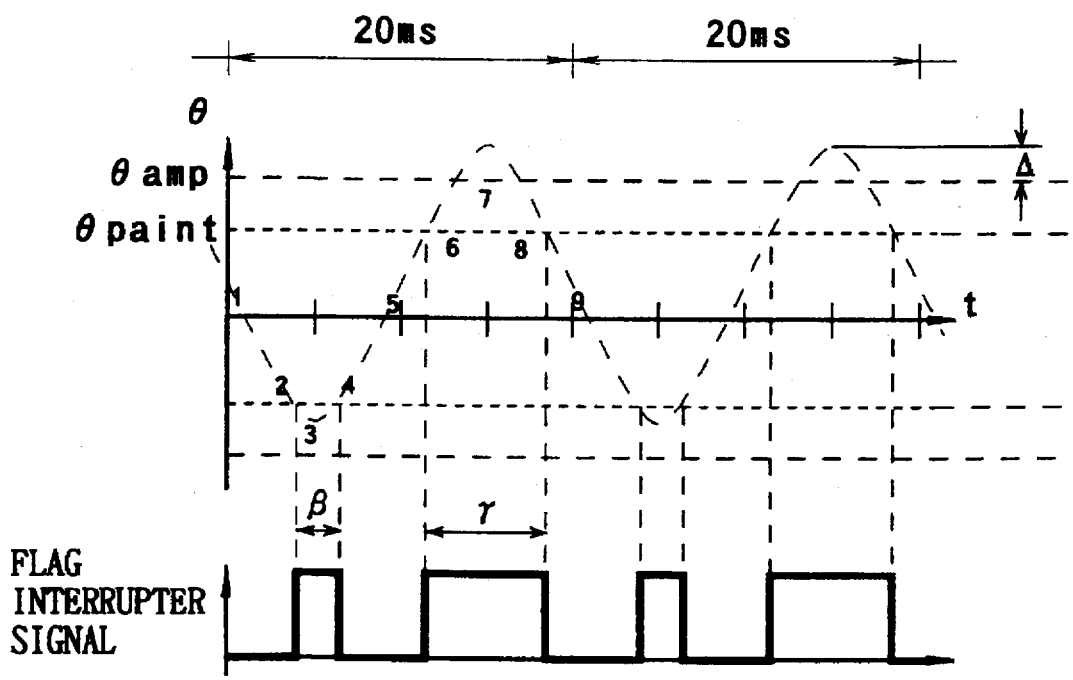
FIG. 46 is a diagram showing the relation between the vibration phase of the mirror and a flag interrupter signal when the mirror has offset.

Now, a method of generating the column table reference start address CTA will be described. FIG. 45 shows the relation between the vibration phase of the mirror without offset and the output signal of the flag interrupter 73 (refereed to as a flag interrupter signal, hereinafter). FIG. 46 shows the relation between the vibration phase of the mirror with offset and the flag interrupter signal. The offset of the mirror is caused by errors in assembling, external disorder, (for example, when the game device is used being inclined) ,etc. If the mirror has no offset, the pulse widths α of the high level portions of the flag interrupter signal are equal every time, as shown in FIG. 45. On the other hand, when the mirror has offset, the pulse widths of the high level portions of the flag interrupter signal have different values for the first and last pulse widths (the pulse width β from 2 to 4 and the pulse width γ from 6 to 8) in one period (20 ms), as shown in FIG. 46. Here, the ratio of the pulse widths of the high level portions in one period (β/γ) corresponds to the quantity of offset Δ of the mirror. The column table reference start address must be changed in accordance with this quantity of offset Δ. This is due to the fact that the vibration phase (angle range) of the mirror used to display images differs between when the mirror has offset and when it has no offset. Accordingly, the mirror control circuit 211 operates a ratio between pulse widths of the high level portions in the display period immediately before and obtains the column table reference start address CTA on the basis of the result of this operation. Conversion from the ratio of pulse widths into the column table reference start address CTA may be achieved by using a conversion table, or may be achieved by calculation.

The synchronous clock FCLK, the left display start signal L_SYNC and the right display start signal R_SYNC am provided from the mirror control circuit 211 to the image processing IC 223. Further, from the mirror control circuit 211 to the image processing IC 223, after the left display start signal L_SYNC is provided, the column table reference start address for the left, CTA_L, is provided, and then the column table reference start address CTA_R for the right is provided. The image processing IC 223 controls the left and right LED drivers 213L and 213R on the basis of these signals and column table reference start addresses provided from the mirror control circuit 211.

Figure 47:
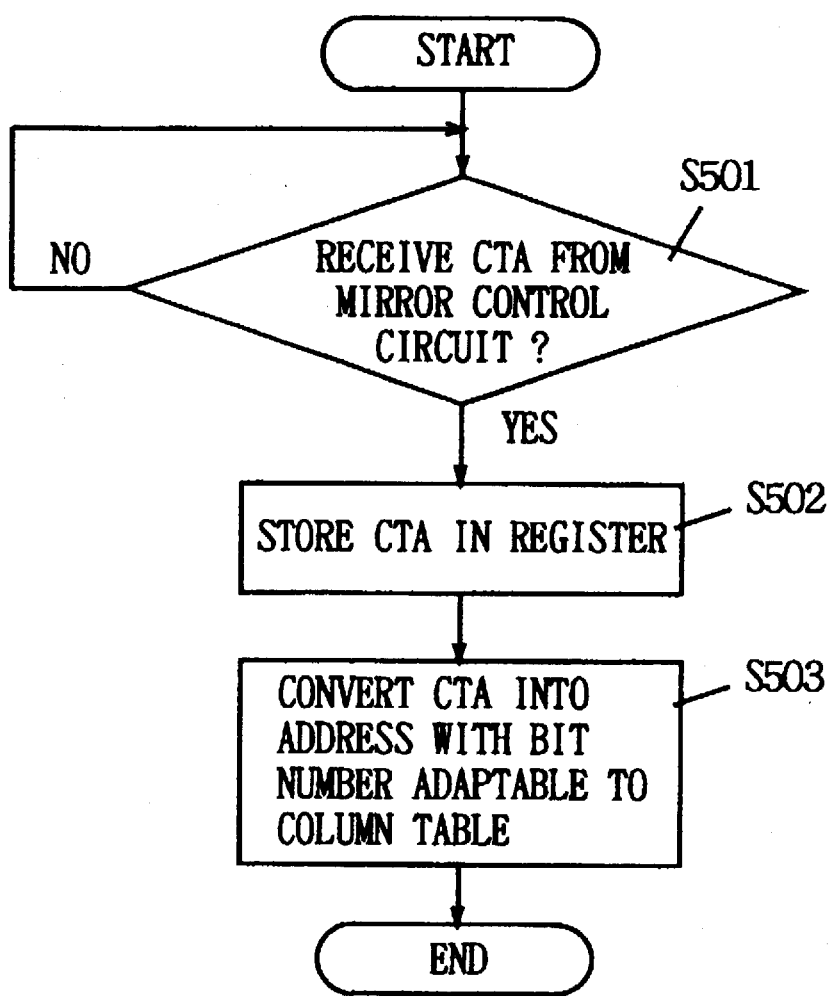
FIG. 47 is a flow chart showing the operation when the image processing IC receives serial data from the mirror control circuit.

FIG. 47 shows operation when the image processing IC 223 receives the serial data from the mirror control circuit 211. Referring to FIG. 47, receiving each 8-bit serial data, i.e. the column table reference start addresses CTA_L and CTA_R from the mirror control circuit 211 (Step S501), the image processing IC 223 stores the column table reference start addresses CTA_L and CTA_R into predetermined areas in the register 223a (refer to FIG. 43), respectively. (Step S502) Next, the image processing IC 223 adds a predetermined number of offset bits to the column table reference start address CTA_L or CTA_R stored in the register 223a to convert the column table reference start address CTA_L or CTA_R into an address with the number of bits adaptable to the addressing of the column table (Step S503).

Figure 48:
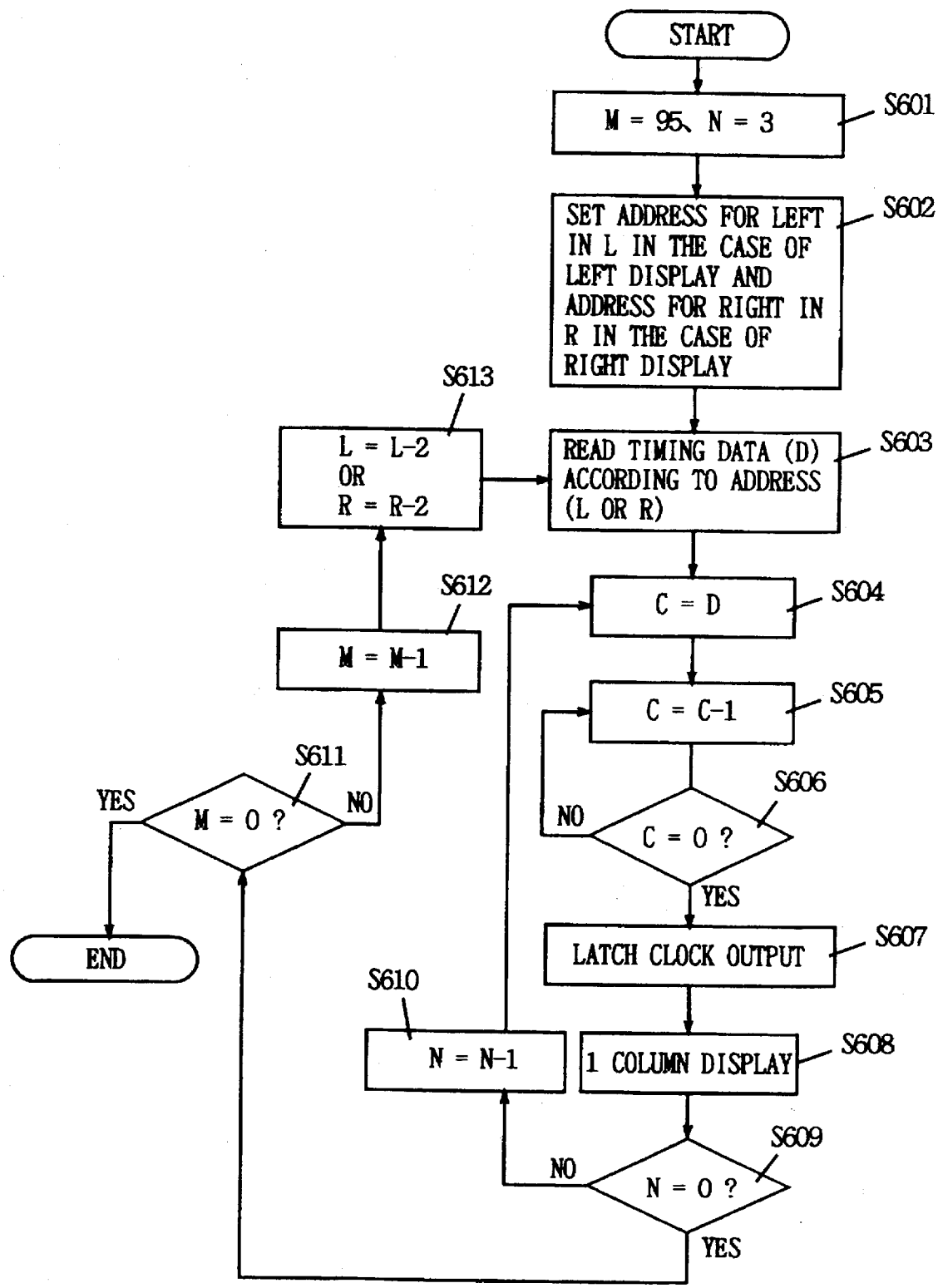
FIG. 48 is a flow chart showing the operation when the image processing IC reads timing data from the column table and displays image data.

The image processing IC 223 starts reading the timing data from the column table according to the column table reference start address for the left or the right obtained in the step S503. FIG. 48 shows the operation when the image processing IC 223 reads the timing data from the column table. Referring to FIG. 48, the image processing IC 223 first sets initial values in the counters M and N (Step S601). The counter M is a counter for counting columns of 384 on the screen for every four columns, and the initial value set therein is 95. This initial value 95 is based on 384/4=96. The counter N is a counter for counting four columns corresponding to one count value of the counter M, and the initial value set therein is 3. Next, the image processing IC 223 sets the column table reference start address for the left or the right obtained in the Step S503 into an internal register L or R (not shown) (Step S602). That is to say, the image processing IC 223 sets the column table reference start address for the left into the register L when displaying a left image (when the left display start signal L_SYNC rises) and sets the column table reference start address for the right into the register R when displaying a right image (when the right display start signal R_SYNC rises).

Next, the image processing IC 223 reads timing data D from a corresponding address in the column table (stored in the area 2254 in the image work memory 225) according to the column table reference start address set in the register L or R (Step S603). Next, the image processing IC 223 sets the read timing data D into a down counter C (Step S604). Next, the image processing IC 223 decrements the down counter C by 1 (Step S605). Decrement of the down counter C is made periodically, which is made every 200 ns in this embodiment. When the count value of the down counter C becomes 0 by decremented, i.e. when a carry signal is outputted from the down counter C, the image processing IC 223 outputs a latch clock (Step S607). This latch clock is provided to the LED driver 212L or 21 2R.

Figure 49:
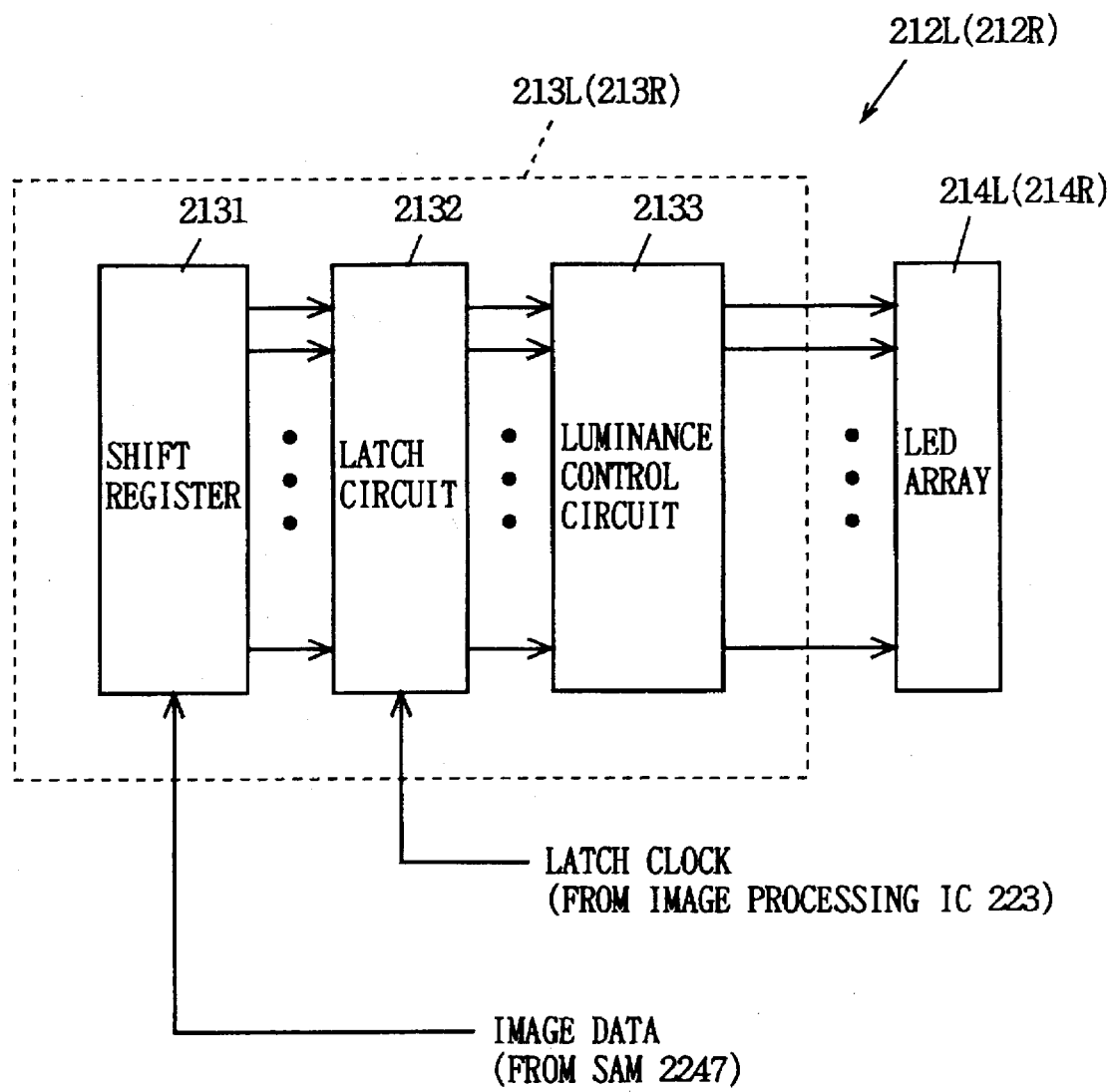
FIG. 49 is a block diagram showing more detailed structure of the LED unit.

Now, the LED drivers 212L and 21 2R include a shift register 2131, a latch circuit 2132 and a luminance control circuit 2133, as shown in FIG. 49. The shift register 2131 can accumulate image data transferred from the SAM 2247 (refer to FIG. 9) for one column (for 224 dots; 224×2=448 bits). The latch circuit 2132 latches the accumulated data of the shift register 2131 in response to the latch clock from the image processing IC 223. The luminance control circuit 2133 controls ON and OFF, and luminance of each LED in the LED array 214L or 214R on the basis of the image data latched in the latch circuit 2132.

The latch clock from the image processing IC 223 is provided to the LED driver 212L or 212R, and then the image data for 1 column accumulated in the shift register 2131 is latched in the latch circuit 2132 and the LED array 214L or 214R is turned on by the luminance control circuit 2133. As a result, display for vertical one column is made on the left or right screen (Step S608). At this time, the image processing IC 223 causes image data for the next column to be transferred from the SAM 2247 to the shift register 2131.

Next, the image processing IC 223 determines whether the count value of the counter N is 0 or not (Step S609). If the count value of the counter N is not 0, as display of image data for four columns has not been finished, the image processing IC 223 decrements the counter N by 1. (Step S610) Then, the image processing IC 223 repeats the operations in Steps S604 to S610. When display of image data for 4 columns has been finished and the count value of the counter N becomes 0, the image processing IC 223 determines whether the count value of the counter M is 0 or not (Step S611 ). If the count value of the counter M is not 0, as display of image data for one screen has not been finished, the image processing IC 223 decrements the counter M by 1 (Step S612). Next, the image processing IC 223 decrements the column table reference start address for the left or the right stored in the register L or R by 2 addresses in byte address (Step S613). Thus, timing data for the next column in the column table becomes an object of reading. Subsequently, the image processing IC 223 repeats the operations in the Steps S603 to S613. When display for one screen is finished, the count value of the counter M becomes 0 and the image processing IC 223 finishes reading timing data from the column table.

Figure 50:
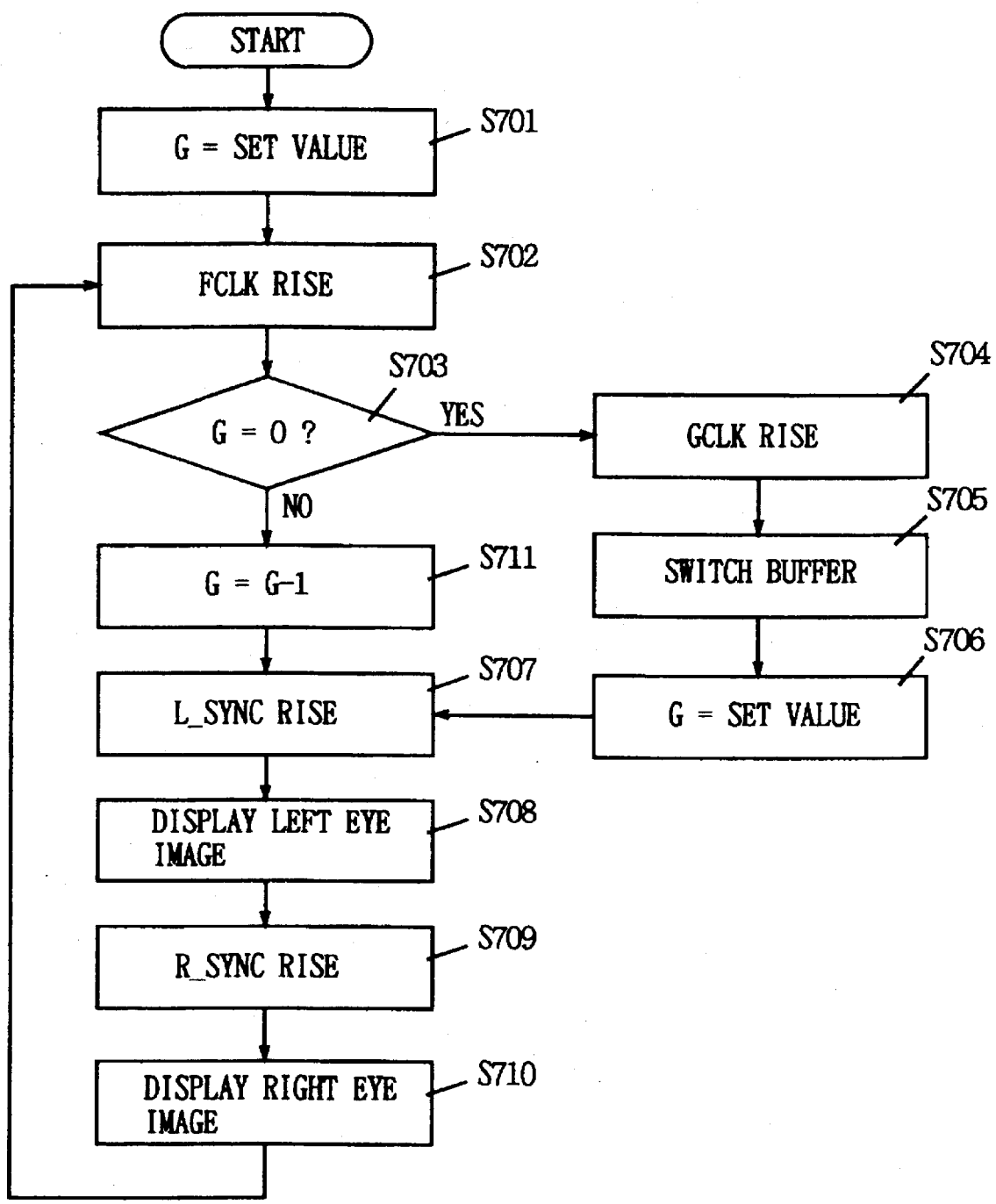
FIG. 50 is a flow chart showing the operation of the entire display system.

Next, referring to the flow chart in FIG. 50, and the timing charts in FIG. 51 and FIG. 52, operation of the entire display system will be described. First, the image processing IC 223 sets an initial value in the counter G (Step S701 in FIG. 50). The set value in the counter G corresponds to the number of display frames included in one game frame. At the initial setting, a value determined in correspondence with the initial screen (0, for example) is set in the counter G. Next, the synchronous clock FCLK from the mirror control circuit 211 rises (Step S702). Accordingly, the image processing IC 223 determines whether the count value of the counter G is 0 or not (Step S703). Now, if the count value of the counter G is 0, the image processing IC 223 raises the game clock GCLK (Step S704). Next, the image processing IC 223 switches a frame buffer subject to display (Step S705). For example, if the frame buffers 2241, 2243 were selected and image data accumulated therein were transferred to the image display unit 21 and displayed in the previous time, the image processing IC 223 selects the frame buffers 2242, 2244 as objects of display in this time. Conversely, if the frame buffers 2242, 2244 were selected as objects of display in the previous time, the image processing IC 223 selects the frame buffers 2241, 2243 as objects of display this time. First, frame buffers determined by default (the frame buffers 2241, 2243, for example) are selected. Next, the image processing IC 223 sets a certain value in the counter G (Step S706). Usually, 0 is set in the counter G. When picture drawing work with heavy load is made in the next game frame, a value of 1 or above is set in the counter G according to the degree of the load. The determination as to whether the load of picture drawing is heavy or not depends on the game program, and it follows instructions from the CPU 221.

Next, the left display start signal L_SYNC from the mirror control circuit 211 rises (Step S707). Then, the image processing IC 223 performs display processing for the left eye image (Step S708). That is to say, the image processing IC 223 reads the column table reference start address CTA_L for the left transmitted from the mirror control circuit 211 (refer to FIG. 47), and reads timing data in order from a corresponding address in the column table (refer to FIG. 48). At this time, latch pulse is outputted from the image processing IC 223 at time intervals defined by each read timing data. Accordingly, the width of each column displayed in the LED unit 212L is changed according to the timing data described in the column table and correction is made so that each column has a uniform width. In this embodiment, however, correction of the column width is made for every four columns to reduce the load on processing by the image processing IC 223. Next, the right display start signal R_SYNC from the mirror control circuit 211 rises (Step S709), and then display processing for the right eye image is performed by the image processing IC 223 (Step S710). In this display processing of the image for the right eye, almost the same processing as the display processing of the image for the left eye in Step S708 is performed.

Figure 51:
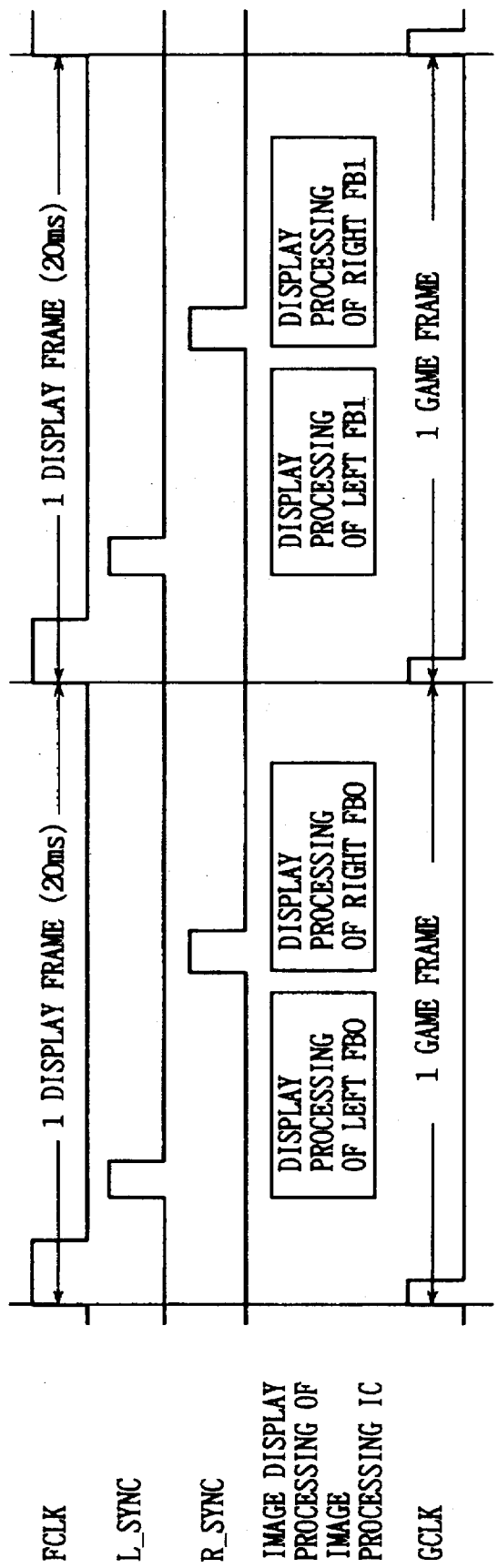
FIG. 51 is a timing chart showing the operation of the entire display system when one display frame is included in one game frame.
Figure 52:
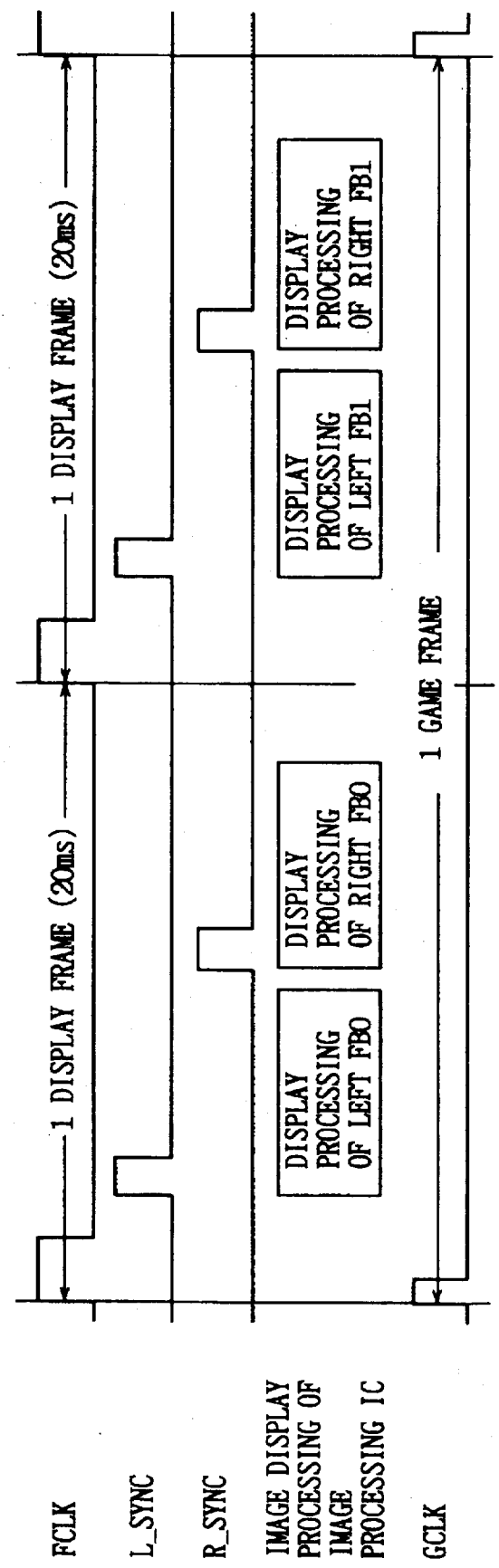
FIG. 52 is a timing chart showing the operation of the entire display system when a plurality of display frames are included in one game frame.

As is clear from the description above, also as shown in FIG. 51, the display processing for the left eye image and the display processing for the right eye image are performed while being shifted in time in one display frame. Therefore, the load on the image processing IC 223 is reduced. Also, the peak power consumption is distributed and the maximum power consumption is reduced. Hence, as permission ability for current and voltage can be set low, designing is easy and the cost can be reduced.

Subsequently, the image processing IC 223 returns to the operation in the Step S702. When the next display frame comes and the synchronous clock FCLK rises (Step S702), the image processing IC 223 determines whether the count value of the counter G is 0 or not (Step S703). If the count value of the counter G is 0, the image processing IC 223 performs the operations in and after the Step S704 again. On the other hand, if the count value of the counter G is not 0, the image processing IC 223 decrements the counter G by 1 (Step S711). Subsequently, the image processing IC 223 repeats the operations in and after the Step S707. At this time, as the frame buffer which is an object to display is not switched, the same picture as the previous time is displayed in the left and right display systems. That is to say, in this embodiment, as shown in FIG. 52, if a plurality of display frames are included in one game frame (defined by the game clock GCLK), the same picture is displayed in respective display frames. This is due to the fact that the picture drawing processing by the image processing IC 223 may not finish in one display frame when drawing an image with heavy load (with a large amount of data), as stated hereinbefore. Subsequently, the image processing IC 223 circulatively repeats the operations in Steps S702–S711.

Now, in this embodiment, the CPU 221 can rewrite the column table in the image work memory 225 in the course of the game in accordance with instructions from the game program. This enables display of a special picture, such as waving, in the image display unit 21. Data for rewriting the column table may be stored in the program memory in advance, or the CPU 221 may rewrite the data in the column table by calculation on the basis of calculation expressions provided on the game program. In this way, in this embodiment, it is possible to process a picture into a special picture according to instructions from the game soft while using usual picture data as they are, so that the variation of representable pictures can be increased without increasing the amount of data.

Although the above embodiment has been described as an electronic game device, the stereoscopic image display device of the present invention is not restricted to the same, but can widely be applied to devices with display, such as training devices, educational equipment, guiding devices, etc.

Although the display units are disposed in the vicinity of both eyes of a player in the above-described embodiment, left and right images provided with parallax may be displayed or projected on a television receiver or a screen with shifted timing. In this case, a player will watch the displayed image wearing glasses with a shutter mechanism (e.g. a liquid crystal shutter) which performs alternate ON/OFF operation of left and right lenses in synchronization with switching timing of left and right images on the television receiver. The left and right images may be displayed with different colors. That is to say, the left image may be displayed with either one of three RGB electron beams and the right image may be displayed with one of the remaining two. In this case, a player will watch the displayed image wearing glasses equipped with different filters on the left and right lenses. Furthermore, the left and right images may by displayed with different polarization angles and then the player will watch while wearing polarization glasses. Embodiments will now be described in which left and right images with parallax are displayed or projected on a television receiver or a screen.

Figure 53:
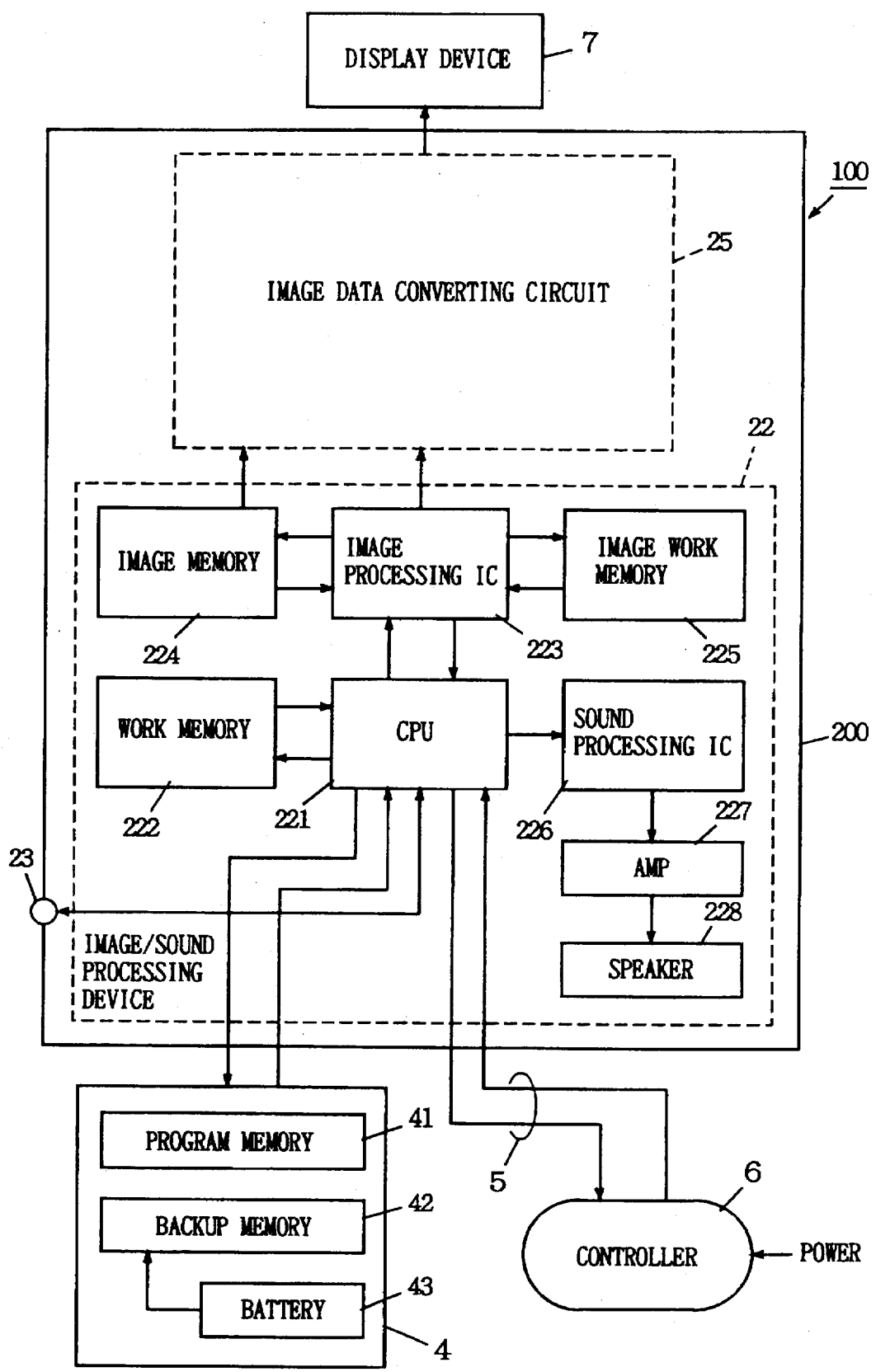
FIG. 53 is a block diagram showing the electric structure of an electronic game device according to another embodiment of the present invention.

FIG. 53 is a block diagram showing the electric structure of an electronic game device according to another embodiment of the present invention. In FIG. 53, an electronic game device 100 of this embodiment includes a body device 200, a program cartridge 4 attachably/detachably connected to the body device 200 and a controller 6 connected to the body device 200 through a cord 5. The structures of the program cartridge; 4 and the controller 6 are the same as those in the above-described first embodiment (refer to FIG. 2.)

The body device 200 includes an image/sound processing device 22, a transfer port 23 and an image data converting circuit 25. The structures of the image/sound processing device 22 and the transfer port 23 are the same as those in the above-described first embodiment (refer to FIG. 2). The image data converting circuit 25 generates display signals and outputs to a display device 7 on the basis of image data obtained from the image memory 224 and the image processing IC 223 and the clock pulse for gradation control. The display device 7 is a display device having a CRT display, a liquid crystal display or a screen projecting device, with which a plurality of people can visually recognize displayed contents at the same time.

The electronic game device according to the first embodiment discussed above which includes display units disposed adjacent to the both eyes allowed only one player to play. On the other hand, the electronic game device of the second embodiment shown in FIG. 53 is configured so that a plurality of persons can play, or watch and listen to at the same time. That is to say, the electronic game device according to the second embodiment is mainly used in a game center. However, since the display units provided in the above-described first embodiment and the display unit 7 used in the second embodiment are based on different principles of display methods, providing the image data generated in the image/sound processing device 22 in the first embodiment unchanged to the display unit 7 does not enable normal display operation. Accordingly, in the second embodiment, the image data converting circuit 25 is provided to convert the image data produced in the image/sound processing device 22 into display signals displayable in the display unit 7 used in the second embodiment. Providing such an image data converting circuit 25 realizes an electronic game device which a large number of persons can join without considerably changing the structure of the electronic game device of the first embodiment and without changing the program at all.

Figure 54:
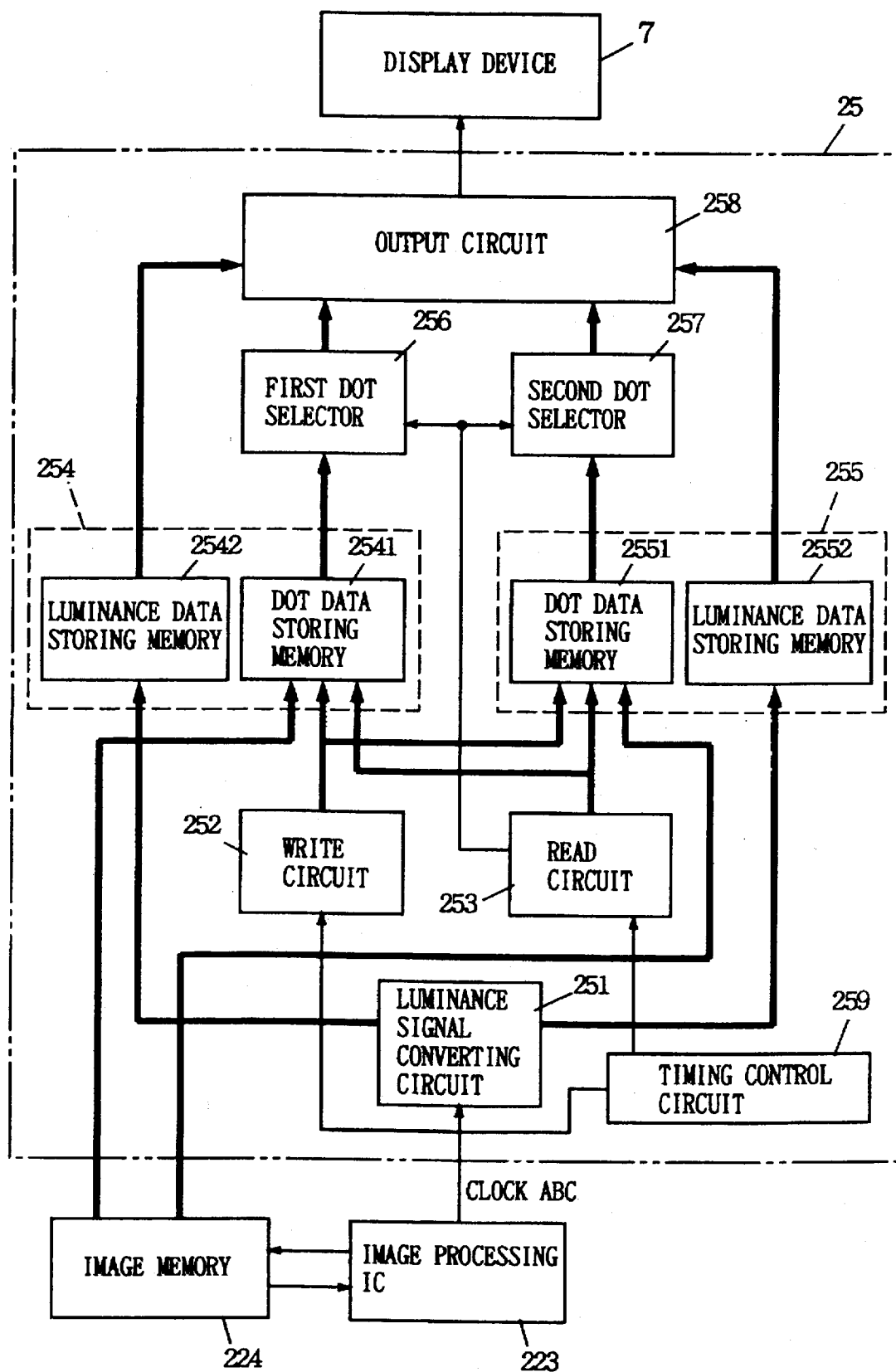
FIG. 54 is a block diagram showing more detailed structure of the image data converting circuit 25 shown in FIG. 53.

FIG. 54 is a block diagram showing the structure of the image data converting circuit 25 of FIG. 53 in more detail. In FIG. 54, the image data converting circuit 25 includes a luminance signal converting circuit 251, a writing circuit 252, a reading circuit 253, first and second memory units 254 and 255, first and second dot selectors 256 and 257, an output circuit 256, and a timing control circuit 259. The first memory unit 254 includes a dot data storing memory 2541 and a luminance data storing memory 2542, and in the same way, the second memory unit 255 includes a dot data storing memory 2551 and a luminance data storing memory 2552.

Figure 55:
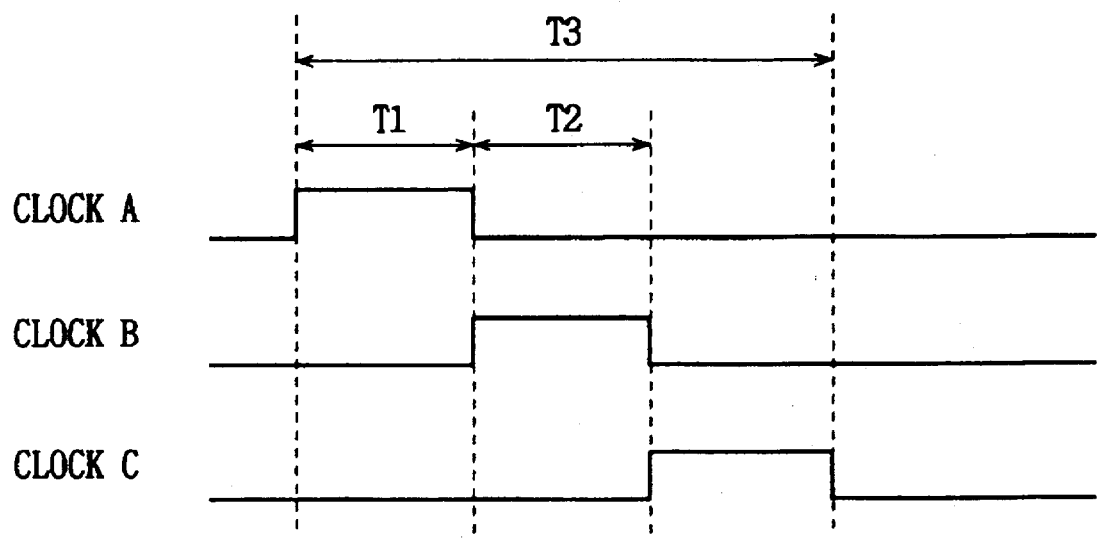
FIG. 55 is a timing chart showing the clock pulses for controlling gradation outputted from the image processing IC 223 of FIG. 53.
Figure 56:
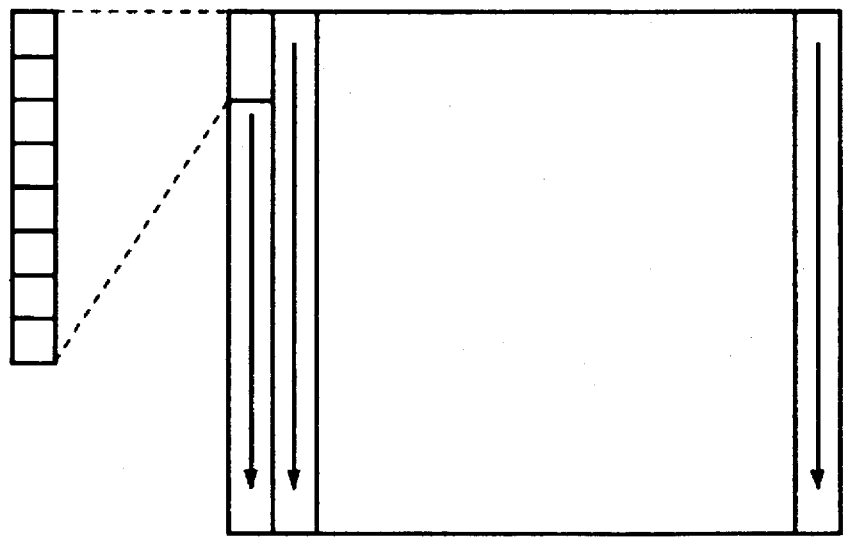
FIG. 56 is a diagram for illustrating the way of writing image data into the dot data storing memories 2541 and 2551 of FIG. 54.
Figure 57:
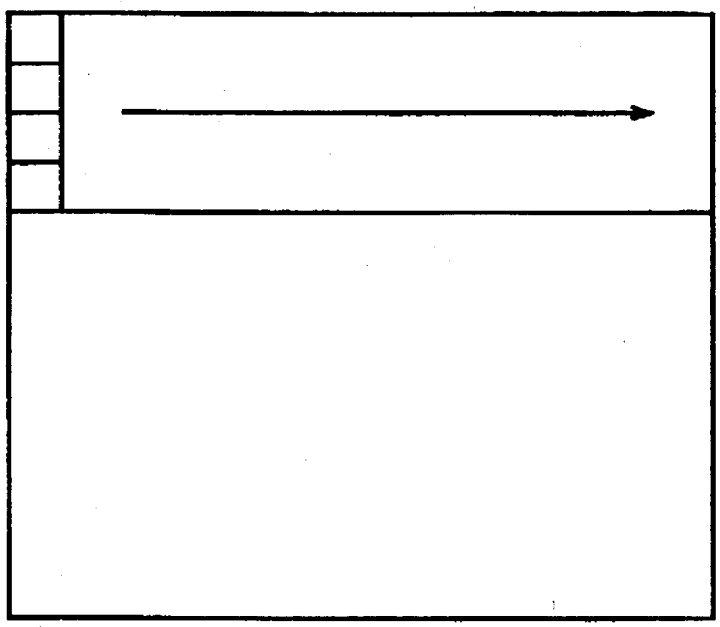
FIG. 57 is a diagram for illustrating the way of reading the image data from the dot data storing memories 2541 and 2551 of FIG. 54.

FIG. 55 is a timing chart showing clock pulses A, B, C for gradation control outputted from the image processing IC 223. FIG. 56 is a diagram for illustrating how the image data are written into the dot data storing memories 2541 and 2551. FIG. 57 is a diagram for illustrating how the image data are read from the dot data storing memories 2541 and 2551. Now, referring to FIG. 55 to FIG. 57, the operation of the electronic game device shown in FIG. 54 will be described.

As has been described in the first embodiment before, the image memory 224 outputs image data for two, left and right image pictures with parallax in units of 16 bits (8 dots). The image data for 8 dots outputted from the image memory 224 is provided to the dot data storing memories 2542 and 2552 and written in the address specified by the write address outputted from the writing circuit 252. Accordingly, as shown in FIG. 56, image data are written into the dot data storing memories 2542 and 2552 for every vertical 8 dots and sequentially for columns.

The image processing IC 223, though not stated in the first embodiment before, outputs clock pulses A, B, C for gradation control as shown in FIG. 55. The clock pulses A, B and C are provided to the luminance signal converting circuit 251. The luminance signal converting circuit 251 converts the pulse width T1 of the clock pulse A, the pulse width T2 of the clock pulse B and the total pulse width T3 of the clock pulses A, B and C into digital values, respectively, and outputs them as luminance data to the luminance data storing memories 2542 and 2552. The luminance data storing memories 2542 and 2552 store the provided luminance data.

The image data stored in the dot data storing memories 2541 and 2551 are read sequentially for four rows according to the read address outputted from the reading circuit 253. At this time, as shown in FIG. 57, the image data for four rows are read in units of 4 dots (8 bits) in order from the leftmost column.

The first and second dot selectors 256 and 257 are provided with low order 2 bits of the read address from the reading circuit 253. The first and second dot selectors 256 and 257 thus select one dot of the image data of four dots read from the dot data storing memories 2541 and 2551, respectively. The image data of 1 dot selected by the first and second dot selectors 256 and 257 are provided to the output circuit 258. Reading of image data for 4 rows from the dot data storing memories 2541 and 2551 is repeated four times each. This results in image data provided to the output circuit 258 in a 1 dot sequential manner in the lateral direction. That is to say, in this embodiment, image data written in the dot data storing memories 2541 and 2551 in a column sequential manner is read out in a row sequential manner and provided to the output circuit 258. Such vertical/horizontal conversion obtains signals capable of display in the display device 7 which performs raster scanning.

The luminance data stored in the luminance data storing memories 2542 and 2552 (including the first digital value corresponding to the pulse width T1 of the clock pulse A, the second digital value corresponding to the pulse width T2 of the clock pulse B, and the third digital value corresponding to the total pulse width T3 of the clock pulses A, B, C) are read out in synchronization with the image data from the dot data storing memories 2541 and 2552 and provided to the output circuit 258. The output circuit 258 selects one of the first through third digital values under conditions for selection of a gradation value of each dot data (four gradations represented with 2 bits) provided from the first and second dot selectors 256 and 257. For example, the output circuit 258 selects the first digital value when the dot data is 01, selects the second digital value when the dot data is 10, and selects the third digital value when the dot data is 11. Then the output circuit 258 converts the selected digital value into an analogue signal and outputs it as a display signal to the display device 7. Thus, the gradation value of each dot of the image data has been converted into the luminance value defined by the pulse widths of the clock pulses A, B and C.

The display device 7 displays display signals of left and right images with parallax provided from the output circuit 258 with different colors, or with light beams having different polarization angles. A player sees it through glasses equipped with filters of different colors on the left and right in the former case, or sees it through glasses equipped with polarization filters which differ on the left and right in the latter case to separately see the left and right images with parallax with left and right eyes. A stereoscopic image is thus obtained.

Now, the operations of the writing circuit 252 and the reading circuit 253 are controlled by timing signal outputted from the timing control circuit 259. At this time, the timing control circuit 259 controls the operations of the writing circuit 252 and the reading circuit 253 so that the first and second memory units 254 and 255 will perform so-called toggle operation. Hence, when one of the first and second memory units 254 and 255 is carrying out the writing operation, the other carries out the reading operation. As a result, capturing of image data and displaying of the image can be achieved at the same time, enabling high speed operation.

The CPU 221 can arbitrarily change each pulse width of the clock pulses A, B, C outputted from the image processing IC 223 according to the game program described in the memory 41. As has been described before, in this embodiment in which the gradation value of each dot of image data is converted into a luminance value defined by the pulse widths of the clock pulses A, B, C and provided to the display device 7, changing each pulse width of the clock pulses A, B, C considerably increases the substantial number of gradations of the image displayed in the display device 7.

While the invention has been described in detail, the foregoing description is in all aspects illustrative and not restrictive. It is understood that numerous other modifications and variations can be devised without departing from the scope of the invention.

I claim:

1. A stereoscopic image display device for displaying a stereoscopic image with parallax in a display device, comprising:

an image data memory for storing source image data on which a plurality of pictures are based to produce a planar image having no parallax;

a writable/readable first temporary memory including at least a storage area for storing data indicative of dots corresponding to the number of pixels for one picture of said display device for temporarily storing first display image data for displaying a first display image for the left eye, a writable/readable second temporary memory including at least a storage area for storing data indicative of dots corresponding to the number of pixels for one picture of said display device for temporarily storing second display image data for displaying a second display image for the right eye;

a parallax information store for storing parallax information for specifying an amount of shifting said first and second display images in a lateral direction with each other;

writing control circuitry for converting planar image data for one picture in said source image data into the first and second display image data and writing the first display image data into said first temporary memory and writing the second display image data into said second temporary memory on the basis of said parallax information so that the first and second display images are shifted by the number of dots corresponding to the parallax in the lateral direction with each other when the first and second display images are displayed by said display device;

reading control circuitry for reading the first or second display image data temporarily stored in said first or second temporary memory when said writing control circuitry is not performing a writing operation to said first or second temporary memory; and supply circuitry for supplying said first and second display image data read by said reading control circuitry to said display device.

2. The stereoscopic image display device according to claim 1, wherein said writing control circuitry controls writing of said first and second display image data on the basis of said parallax information so that at least one of the first and second display images is shifted in the lateral direction when the first and second display images are displayed by said display device.

3. The stereoscopic image display device according to claim 1, wherein said image data memory stores image data in an area larger in left and right directions than a display area in the left and right directions of one of the first and second display images displayed by said display device as image data for one picture in said source image data, and said writing control circuitry cuts out image data in a certain area from the image data for one picture in the area larger in the left and right directions stored in said image data memory on the basis of said parallax information and writes the data into said first temporary memory as the first display image data, and cuts out image data in an area shifted in the lateral direction from that cut-out area and writes the data into said second temporary memory as the second display image data.

4. The stereoscopic image display device according to claim 1, wherein said image data memory is operable for storing the source image data in character units and storing the source image data for a plurality of pictures with a plurality of characters, and said parallax information store stores parallax information in character units as an amount of shifting said first and second display images in the lateral direction with each other to vary the shifted amount in said character units.

5. The stereoscopic image display device according to claim 1, wherein said image data memory stores the source image data in character units and stores the source image data of background for a plurality of pictures by combining a plurality of characters, said parallax information store stores the parallax information so that the amount of shifting the first and second display image data written in said first and second memory in the lateral direction with each other varies for a distant view image and for a close-range view image, and on the basis of said parallax information, in the case of distant view image data, said writing control circuitry writes the first display image data for a distant view into said first temporary memory and writes the second display image data for the distant view into said second temporary memory so that the shifted amount is decreased, and in the case of close-range view image data, writes the first display image data for a close-range view into said first temporary memory and writes the second display image data for the close-range view into said second temporary memory so that the shifted amount is increased.

6. The stereoscopic image display device according to claim 1, wherein said image data memory stores motion picture characters and background characters in character units as source image data and stores source image data of background for a plurality of pictures by combining a plurality of characters, said parallax information store stores motion picture parallax information in character units with respect to the motion picture characters and stores background parallax information to differ in a distant view image and a close-range view image with respect to the background image, as an amount of shifting said first and second display image data in the lateral direction with each other, said writing control circuitry, on the basis of said background parallax information, writes the first display image data for a distant view into said first temporary memory and writes the second display image data for a distant view into said second temporary memory so that the shifted amount is decreased in the case of distant view image data, and in the case of close-range view image data, writes the first display image data for a close-range view into said first temporary memory and writes the second display image data for a close-range view into said second temporary memory so that the shifted amount is increased, and varies the shifting amount when writing said image data of the motion picture character into said first and second temporary memory on the basis of said motion picture parallax information.

7. The stereoscopic image display device according to claim 1, wherein said display devices includes two sets of, left and right, display units used adjacent to a face, each said display unit including display elements with a plurality of dots arranged in a column in the vertical direction and a mirror reflecting display of each display element and turned in a certain angle range, and said supply circuitry supplies data for one column in the vertical direction in said first display image data to the plurality of display elements included in said left display unit and supplies data for one column in the vertical direction in said second display image data to the plurality of display elements included in said right display unit, the supplied data for one column in the vertical direction being shifted by every one column in the lateral direction in a time sequential manner.

8. The stereoscopic image display device according to claim 1, wherein said display device is a raster scan type display which scans first and second electron beams in the horizontal direction and repeats the scanning in the horizontal direction, sequentially shifting line by line in the vertical direction, and said supply circuitry supplies said first display image data for generation of said first electron beam and supplies said second display image data for generation of said second electron beam.

9. A storage device for use in a stereoscopic image display device including a first and second temporary memory, writing control circuitry, reading control circuitry, and supply circuitry for displaying a stereoscopic image with parallax in the display device, and configured to be attachable/detachable to and from the stereoscopic image display device, wherein said first temporary store includes at least a storage area for storing data indicative of dots corresponding to the number of pixels for one picture of display device and which temporarily stores first display image data for displaying a first display image for the left eye, and configured to be writable/readable, said second temporary store includes at least a storage area for storing data indicative of dots corresponding to the number of pixels for one picture of said display device and which temporarily stores second display image data for displaying a second display image for the right eye, and configured to be writable/readable, said writing control circuitry is configured to write said first display image data into said first temporary store and write the second display image data into said second temporary store, said reading control circuitry is configured to read the first or second display image data temporarily stored in said first or second temporary store when said writing control circuitry is not operating to write into said first or second temporary store, and said supply circuitry is configured to supply the first and second display image data read by said reading control circuitry to said display device, said storage device comprising, an image data memory for storing source image data for a plurality of pictures to generate a planar image having no parallax, a parallax information store storing parallax information for specifying an amount of shifting said first and second display images in a lateral direction with each other, and a display control program store providing said parallax information to said writing control circuitry and storing a display control program for specifying display coordinate positions of said first and second display images, whereby said writing control circuitry converts planar image data for one picture in the source image data stored in said image data memory into the first and second display image data on the basis of said display control program and writes the first display image data into said first temporary store, and writes the second display image data into said second temporary store on the basis of said parallax information so that the first and second display images are shifted by the number of bits corresponding to the parallax in the lateral direction with each other when the first and second display images are displayed by said display device.

10. The storage device used in the stereoscopic image display device according to claim 9, wherein said image data memory stores motion picture characters and background characters in character units as source image data and stores source image data for background display for a plurality of pictures by combining a plurality of background characters as background image, said parallax information store stores motion picture parallax information in character units about the motion picture characters, and stores background parallax information set to change for a distant view image and a close-range view image about the background image as an amount for shifting said first and second display images in a lateral direction with respect to each other, and with the display control program stored in said display control program store, said writing control circuitry on the basis of said background parallax information, writes the distant view first display image data into said first temporary store and writes the distant view second display image data into said second temporary store so that the shifted amount is decreased in the case of the distant view image data, writes the close-range view first display image data into said first temporary store and writes the close-range view second display image data into said second temporary store so that the shifted amount is increased in the case of the close-range view image data, and when writing the image data of said motion picture character into said first and second temporary store with varied shifted amounts on the basis of said motion picture parallax information, priority data for determining priority order of the motion picture character and the background image is provided, and writes the image data with higher priority order.

* * * * *